US012076993B2

(12) United States Patent
Cruz-Uribe et al.

(10) Patent No.: US 12,076,993 B2
(45) Date of Patent: Sep. 3, 2024

(54) NOZZLE ARRANGEMENTS FOR DROPLET EJECTION DEVICES

(71) Applicant: Xaar Technology Limited, Huntingdon (GB)

(72) Inventors: Tony Cruz-Uribe, Huntingdon (GB); Lukasz Kuban, Huntingdon (GB); Peter Boltryk, Huntingdon (GB)

(73) Assignee: Xaar Technology Limited, Huntingdon (GB)

( * ) Notice: Subject to any disclaimer, the term of this patent is extended or adjusted under 35 U.S.C. 154(b) by 118 days.

(21) Appl. No.: 17/620,045

(22) PCT Filed: Jul. 31, 2020

(86) PCT No.: PCT/GB2020/051840
§ 371 (c)(1),
(2) Date: Dec. 16, 2021

(87) PCT Pub. No.: WO2021/023975
PCT Pub. Date: Feb. 11, 2021

(65) Prior Publication Data

US 2022/0305784 A1 Sep. 29, 2022

(30) Foreign Application Priority Data

Aug. 6, 2019 (GB) ........................................ 1911217

(51) Int. Cl.
*B41J 2/14* (2006.01)
*B41J 2/045* (2006.01)
*B41J 2/155* (2006.01)

(52) U.S. Cl.
CPC ......... *B41J 2/1433* (2013.01); *B41J 2/04586* (2013.01); *B41J 2/155* (2013.01); *B41J 2202/12* (2013.01)

(58) Field of Classification Search
CPC ...... B41J 2/1433; B41J 2/04586; B41J 2/155; B41J 2202/12
See application file for complete search history.

(56) References Cited

U.S. PATENT DOCUMENTS 6,779,871 B1 * 8/2004 Seto ........................ B41J 2/155 347/47
2004/0119780 A1 6/2004 Usui et al.
(Continued)

FOREIGN PATENT DOCUMENTS

CN 1579771 A 2/2005
CN 101772419 A 7/2010
(Continued)

*Primary Examiner* — Jason S Uhlenhake
(74) *Attorney, Agent, or Firm* — Honigman LLP; Eric J. Sosenko; Jonathan P. O'Brien

(57) ABSTRACT

A nozzle plate for a droplet ejection head, the nozzle plate comprising a first row of nozzles arranged to deposit droplets onto a deposition media; wherein the first row of nozzles extends in a row direction and comprises two or more nozzle clusters, each nozzle cluster being arranged along the row direction for a cluster length c, and extending along a cluster depth direction perpendicular to the row direction by a cluster depth d; wherein each nozzle cluster comprises a plurality of nozzles of which one or more nozzles within each nozzle cluster define the cluster length c and two or more nozzles within each nozzle cluster define the cluster depth d; wherein each nozzle cluster is spaced apart from an adjacent nozzle cluster along the row direction by a cluster spacing a such that an air flow path is created for forced air to pass through the row of nozzles in a controlled manner; and wherein, when the first row is projected in a transverse direction onto the row direction, a transition region between adjacent nozzle clusters comprises two or more nozzles from a first cluster and two or more nozzles from a second cluster, the second cluster being adjacent to the first cluster, and the (Continued)

nozzles in the transition region being equidistantly spaced from one another by a projected nozzle spacing.

19 Claims, 26 Drawing Sheets

(56) References Cited

U.S. PATENT DOCUMENTS

| | | | |
|---|---|---|---|
| 2005/0140722 | A1 | 6/2005 | Shibata et al. |
| 2005/0185019 | A1 | 8/2005 | Goto et al. |
| 2007/0024676 | A1 | 2/2007 | Kachi et al. |
| 2008/0136854 | A1 | 6/2008 | Yamaguchi et al. |
| 2009/0231393 | A1 | 9/2009 | Mizoguchi |
| 2012/0306968 | A1 | 12/2012 | Benjamin et al. |
| 2013/0016146 | A1 | 1/2013 | Hashiguchi |
| 2014/0055513 | A1 | 2/2014 | Usui |
| 2017/0239946 | A1 | 8/2017 | Nakagawa |

FOREIGN PATENT DOCUMENTS

| | | | |
|---|---|---|---|
| CN | 102673170 | A | 9/2012 |
| CN | 104582970 | A | 9/2012 |
| CN | 105150687 | A | 12/2015 |
| EP | 0659562 | A2 | 6/1995 |
| EP | 0914950 | A2 | 5/1999 |
| EP | 1582352 | A2 | 10/2005 |
| EP | 1970199 | A1 | 9/2008 |
| JP | 2004-209964 | A | 7/2004 |
| JP | 2007-209964 | A | 7/2004 |
| JP | 2005-199696 | A | 7/2005 |
| JP | 2005-306012 | A | 11/2005 |
| JP | 2006256147 | A | 9/2006 |
| JP | 2011-240701 | A | 12/2011 |
| JP | 2014156021 | A | 8/2014 |
| JP | 2016-159530 | A | 9/2016 |
| JP | 2017-144699 | A | 8/2017 |
| JP | 2018-034316 | A | 3/2018 |
| JP | 2019-536654 | A | 12/2019 |
| TW | 200726653 | A | 7/2007 |
| WO | 01567898 | A | 8/2001 |
| WO | 2018051051 | A1 | 3/2018 |

* cited by examiner

NOZZLE ARRANGEMENTS FOR DROPLET EJECTION DEVICES

CROSS-REFERENCE TO RELATED APPLICATIONS

This application is the U.S. national phase of PCT Application No. PCT/GB2020/051840, filed Jul. 31, 2020, which claims priority to GB 1911217.6, filed Aug. 6, 2019, the disclosures of which are incorporated, in their entirety, by reference herein.

FIELD OF INVENTION

The present disclosure relates to a nozzle plate for a droplet ejection device, a method of droplet ejection using such a nozzle plate, and a droplet ejection apparatus comprising a droplet ejection device using such a nozzle plate. The nozzle plate may be used with particular benefit in applications that require printing a high resolution image onto a textured or flexible surface at high speeds.

BACKGROUND

Droplet ejection apparatuses are now in widespread usage, whether in more traditional applications, such as inkjet printing, or in 3D printing, or other rapid prototyping techniques. Amongst other things, droplet ejection devices, or inkjet printheads, have been developed that are capable of depositing ink directly onto paper, card, ceramic tiles and other deposition media, with high reliability and throughput. In other applications, droplet ejection heads may be used to form elements such as colour filters in LCD or OLED displays used in flat-screen television manufacturing.

Droplet ejection apparatuses and their components continue to evolve so as to meet the requirements of ever more challenging applications, generally improving resolution and throughput at high print quality.

SUMMARY

Aspects of the invention are set out in the appended independent claims, while particular embodiments of the invention are set out in the appended dependent claims.

The following disclosure describes, in one aspect, a nozzle plate for a droplet ejection head, the nozzle plate comprising a first row of nozzles arranged to deposit droplets onto a deposition media; wherein the first row of nozzles extends in a row direction and comprises one or more nozzle clusters, each nozzle cluster being arranged along the row direction for a cluster length c, and extending along a cluster depth direction perpendicular to the row direction by a cluster depth d; wherein each nozzle cluster comprises a plurality of nozzles of which one or more nozzles within each nozzle cluster define the cluster length c and two or more nozzles within each nozzle cluster define the cluster depth d; wherein each nozzle cluster is spaced apart from an adjacent nozzle cluster along the row direction by a cluster spacing a such that an air flow path is created for forced air to pass through the row of nozzles in a controlled manner; and wherein at least a majority of nozzles of the first row, when projected in a transverse direction onto the row direction, are equidistantly spaced from one another by a projected nozzle spacing.

In one exemplary embodiment the first row of nozzles comprises a first set of subrows comprising first and second subrows that extend alongside one another in respective subrow directions, the first and second subrows extending parallel to the row direction; wherein the first and second subrows are spaced apart by a first subrow spacing b in the transverse direction, perpendicular to the row direction; and wherein each of the first and second subrows comprises the one or more nozzle clusters; wherein each nozzle cluster within a subrow is spaced apart from a neighbouring nozzle cluster by the cluster spacing a; and wherein each projected nozzle cluster of the first and second subrows is spaced apart from an adjacent projected nozzle cluster by the projected nozzle spacing.

In another exemplary embodiment each nozzle cluster is spaced apart from an adjacent nozzle cluster along the row direction by a cluster spacing a greater than a nozzle spacing ns between adjacent nozzles of a nozzle cluster.

A method of depositing droplets (e.g. printing) using such a nozzle plate, a drive signal controller operable to carry out such a method, a droplet ejection device (e.g. printhead) comprising such a nozzle plate, and a droplet ejection apparatus (e.g. printer) comprising such a nozzle plate, are also provided.

BRIEF DESCRIPTION OF THE DRAWINGS

Embodiments of the invention will now be described, by way of example only, and with reference to the drawings in which.

In the Figures, like elements are indicated by like reference numerals throughout.

DETAILED DESCRIPTION

To highlight the functionality of the embodiments and their various implementations that will be described with respect to FIGS. 2-22, reference is initially made to a known test apparatus in FIG. 1A.

Figure 1A:
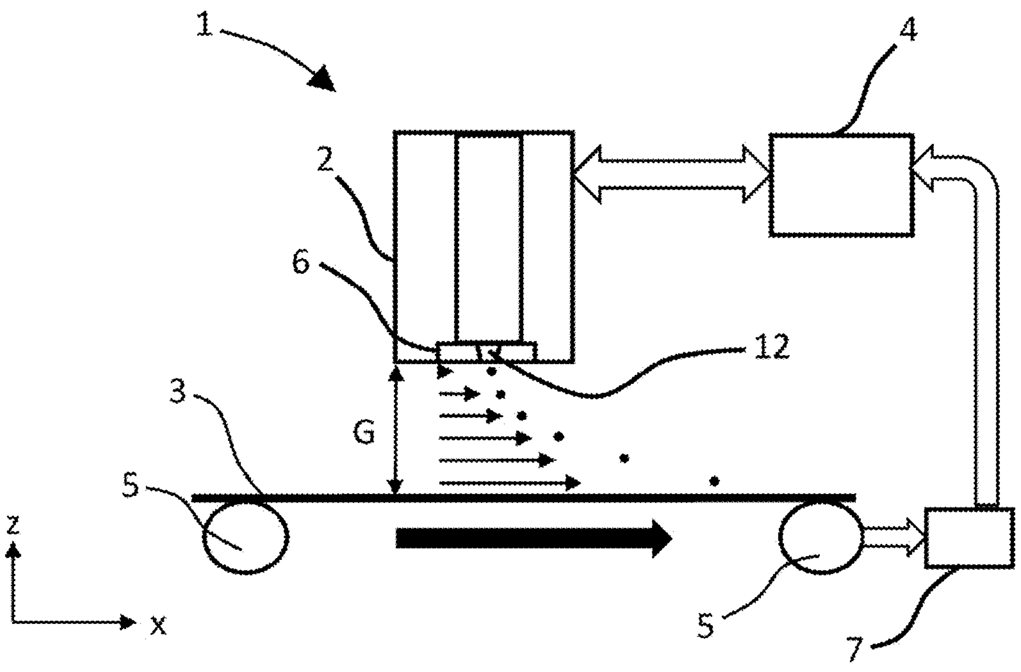
Fig. 1A (Prior Art)
FIG. 1A is a schematic drawing of a test apparatus.

FIG. 1A shows a droplet ejection apparatus 1 comprising a droplet ejection device, such as a droplet ejection head 2, mounted above a deposition media 3 movable by a transport mechanism 5. The droplet ejection head 2 comprises a nozzle plate 6 having a nozzle 12 for ejecting droplets onto the deposition media in response to signals sent by a controller 4. The droplet ejection head 2 is mounted such that there is a gap G between the deposition media 3 and the droplet ejection head 2.

Figure 1B:
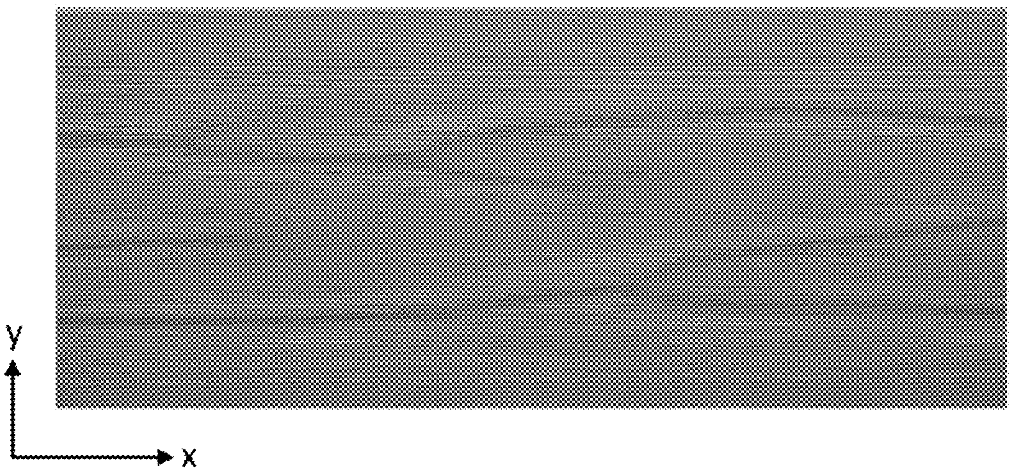
FIG. 1B is a printed image printed by the test apparatus of FIG. 1A.
Figure 1C:
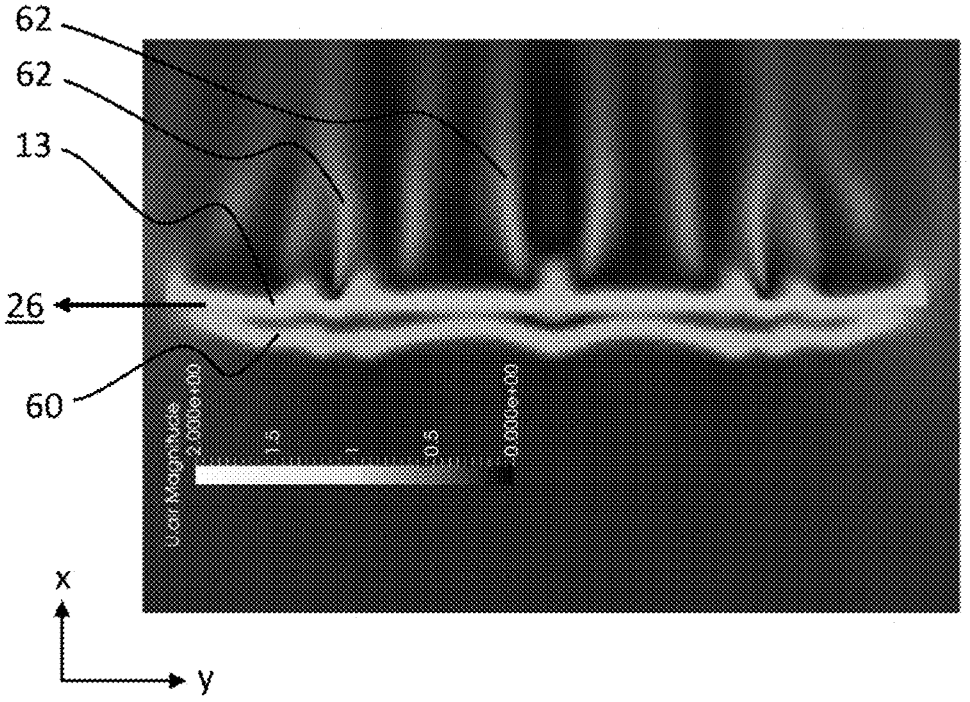
FIG. 1C is a simulation of air flow magnitudes of forced air for the test apparatus of FIG. 1A during operation.
Figure 1D:
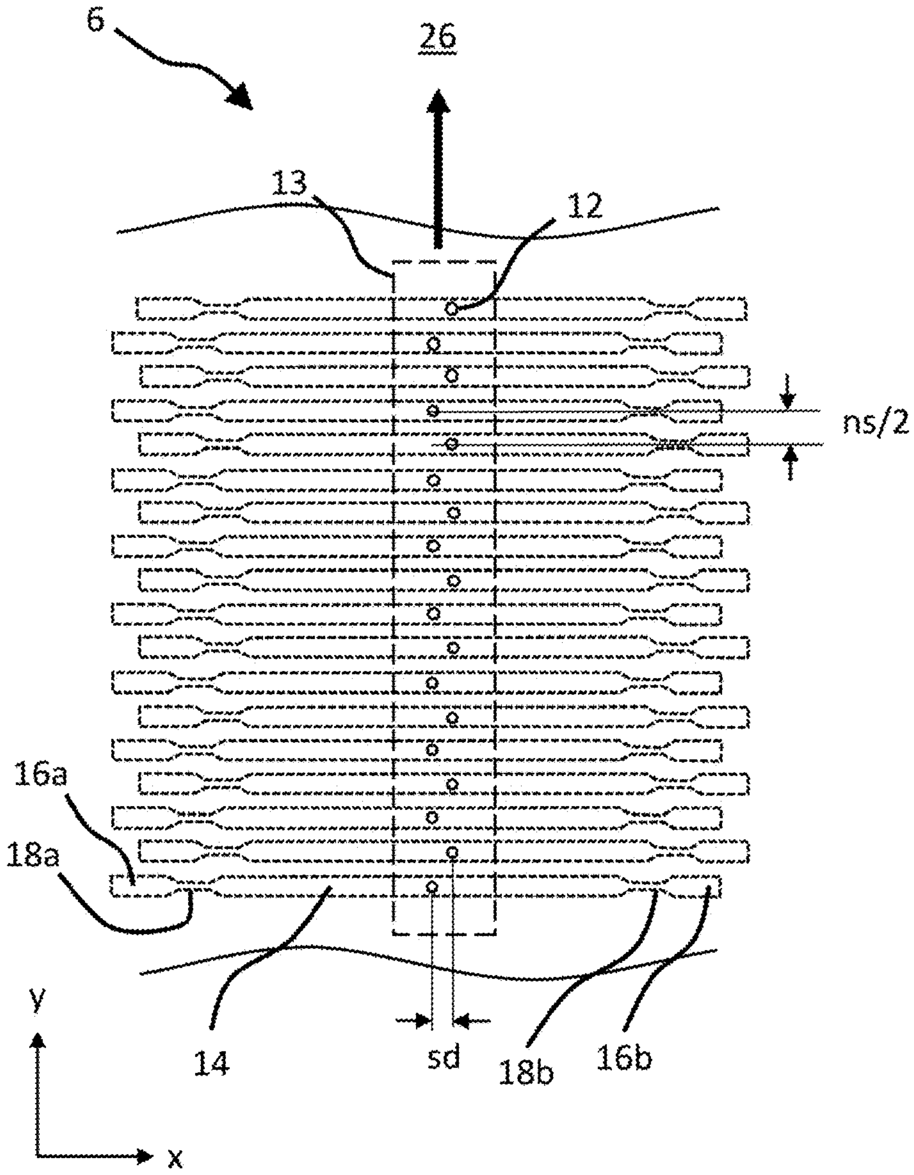
Fig. 1D (Prior Art)
FIG. 1D is a schematic plan view of a test nozzle plate used in FIGS. 1A-1C

Details of typical patterns of nozzles 12 are shown in plan view in FIG. 1D. FIG. 1D shows a section of a plan view of the nozzle plate 6 comprised within an inkjet printhead 2. Part of a row 13 of nozzles 12 is shown in relation to fluid channels (dashed lines) configured behind the nozzle plate 6, and comprising pressure chambers 14 in fluidic communication with restrictors 18*a*, 18*b* and ink ports 16*a*, 16*b*. In FIG. 1D, the example printhead with fluid path as indicated behind the nozzle plate is one having recirculation past each nozzle 12, where one of the ink ports 16*a* supplies a pressure chamber 14 with ink via the restrictor 18*a* from one end, and any ink not ejected from the nozzle 12 is returned to the ink flow path via the restrictor 18*b* and ink port 16*b* at the opposite end.

In FIG. 1D, the pressure chambers 14 have an elongate shape and are arranged in a corresponding relationship with the nozzles 12 located centrally in each pressure chamber 14 along the direction of chamber elongation. Each nozzle 12 is spaced from the nozzle in the adjacent chamber by a nozzle distance ns/2 along the row direction 26 (the y-direction).

In FIG. 1D, the nozzles 12 are arranged in a typical configuration that reduces or prevents fluidic and/or mechanical 'cross talk', which is caused by the droplet ejection from one nozzle affecting the meniscus of a neighbouring nozzle. The pattern is that of a staggered nozzle configuration, whereby each alternate nozzle 12 is offset from its neighbour by a stagger distance sd along a direction which is orthogonal to the row direction 26 (the x-direction). The row direction 26 is defined by the general direction along which the staggered nozzles extend. The nozzles are spaced from the nearest adjacent nozzle having the same stagger offset by a nozzle spacing ns.

The stagger offset distance is related to a combination of mechanical, electrical and fluidic considerations, and is typically determined empirically. The offset distances in FIG. 1D and any subsequent Figures are illustrative only with respect to a general concept of nozzle offsets to mitigate crosstalk. In other apparatus in which the fluidic path is designed differently, such offset may not be necessary and nozzles are instead arranged in a non-offset row. The presence or absence of cross talk is not essential with respect to the various embodiments and implementations that will be described.

In some circumstances when using a conventional nozzle arrangement of FIG. 1D, a "woodgrain" effect may be experienced when operating the test apparatus 1 using the nozzle plate 6 in a droplet ejection head 2. As used herein, the "woodgrain" effect is an unwanted printing artefact thought to be the result of induced, or forced, air flow into the gap between the nozzle plate 6 of a droplet ejection head 2 and a deposition media 3 that is being printed upon, due to the relative motion between the droplet ejection head 2 and the deposition media 3. The forced air flow can cause significant and uncontrollable deviation in the trajectory of the ejected droplets, altering their landing position, as well as causing mist and satellites to accumulate in unpredictable locations on the deposition media as well as on the portions of the droplet ejection head 2 surrounding the nozzles 12. One visual effect may be that of an undulating "woodgrain" pattern, but the effect may result in other irregular patterns appearing visibly in the printed image. Woodgraining may be particularly experienced in applications that require a higher gap distance G, for example where the surface of the deposition media 3 is rough, flexible or textured, such as textiles or cartons.

An illustration of a typical woodgrain pattern is shown in the test print sample in FIG. 1B. The test print sample was achieved by ejecting at full duty (all nozzles printing) using the head arrangement of FIG. 1A, with a nozzle spacing of 84.7 μm (300 nozzles per inch) and a gap G distance of 3 mm. The media speed for this sample was 80 m/min and the measured drop velocity at 1 mm distance from the nozzle plate was 6.1 m/s. The pattern that might be expected in the absence of the woodgrain effect would be one of uniform coverage. The actual pattern is that caused by main droplet deviation (where the "main droplet" signifies a droplet of or near a desired target volume), resulting in dark "veins" forming an irregular, branching and undulating pattern across the image along the media transport direction x, and resembling a woodgrain pattern. Woodgraining may not only be due to a deviation of the main droplet. The various flows can also give rise to mist or satellites and cause these to form visible variations in density perceived as "woodgrain".

In some applications, it is desirable to use a droplet ejection apparatus 1, such as that shown in FIG. 1A, in which the droplet ejection head 2 is rigidly mounted and the deposition media 3 to be printed is passed underneath it. This is often referred to as single pass printing. In this apparatus set up, the moving deposition media 3 creates the forced air flow in the gap G, with a velocity profile that is characteristic to the single pass printing situation.

An alternative arrangement is that of a scanning droplet ejection apparatus, in which the droplet ejection head 2 is moved back and forth in the y-direction orthogonally to the media transport direction x. In this arrangement, the droplet ejection head 2 travels at high speed relative to the surrounding (stationary) air, causing the air to flow around the droplet ejection head 2. As part of this flow of air around the droplet ejection head 2, some air flow is forced into the gap between the deposition media 3 and the nozzle plate of the droplet ejection head 2, with a velocity profile characteristic to the scanning application. The conditions of air flow in such an arrangement differs from that of the single pass set up, but drop deviation and woodgrain patterns still may occur.

More generally, whether the droplet ejection head 2 is moved with respect to the deposition media 3, or the deposition media 3 is moved with respect to the droplet ejection head 2, a velocity difference exists between the droplet ejection head 2 and the deposition media 3, which gives rise to forced air flow around the droplet ejection head 2, and/or in the gap G between the head droplet ejection 2 and the deposition media 3. Particularly in high gap distance applications, in which the gap G may measure several millimetres, and which may additionally require high resolution nozzle density and/or high throughput (high relative speed between the droplet ejection head and the deposition media) and/or high print frequency, the forced air flow needs to be carefully managed to maintain high print quality.

The inventors have found that the effect of woodgrain can be reduced or removed by providing a modified nozzle arrangement in a nozzle plate 10 that will now be described with respect to FIGS. 2 to 22.

Overview

Figure 2:
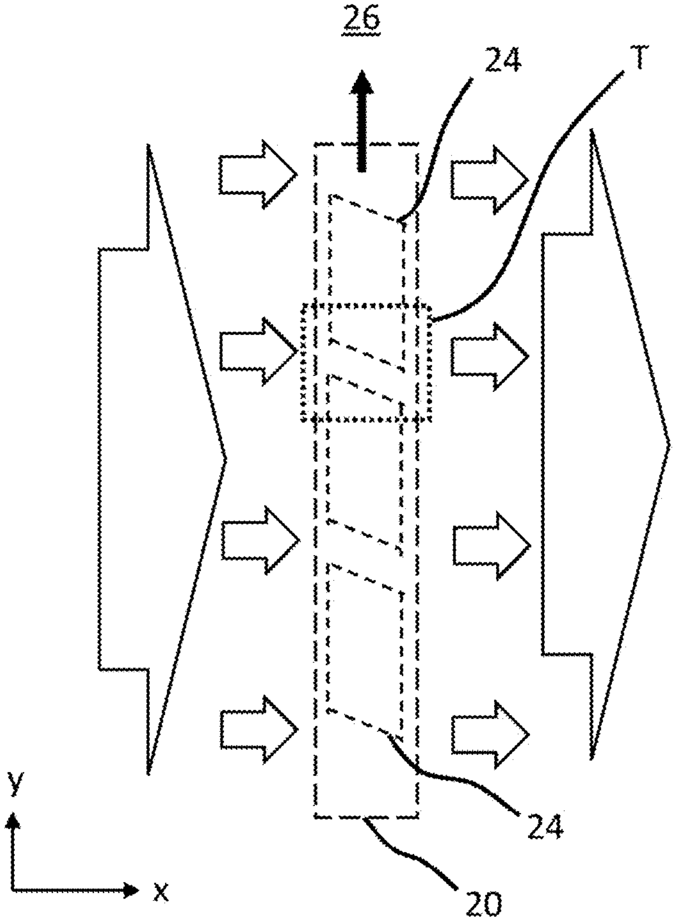
FIG. 2 is a schematic plan view showing an air flow path through a nozzle row according to embodiments of the present invention.

FIG. 2 is a block diagram illustrating the principle followed by the embodiments that will be described. The row 20 of nozzles is arranged so that all nozzles are grouped in distinct clusters 24. The nozzles within the clusters may be arranged in an (x, y) array. The clusters are spaced apart from one another along the row direction 26 by a cluster spacing. In this way, between the clusters 24, air flow paths are provided by the cluster spacing so that forced air, indicated by a large arrow arriving in front of the row, may pass through the row of clusters in a controlled manner, indicated by small arrows, and combine again afterwards, such that the woodgrain effect is reduced. The nozzles of such a row 20 still present the same nozzle spacing along the row as a conventional row according to for example FIG. 1D. In other words, when viewed in a projection direction along x, the nozzles in a transition region T between two adjacent clusters 24 are equidistantly spaced. This may be achieved according to the embodiments described below, and their various implementations.

In general, the present embodiments of a nozzle plate for a droplet ejection head employ an overarching principle in which the nozzle plate comprises a first row of nozzles arranged to deposit droplets onto a deposition media, wherein the first row of nozzles extends in a row direction and comprises two or more nozzle clusters. Each nozzle cluster is arranged along the row direction for a cluster length c, and extends along a cluster depth direction perpendicular to the row direction by a cluster depth d. Each nozzle cluster comprises a plurality of nozzles of which one or more nozzles within each nozzle cluster define the cluster length c and two or more nozzles within each nozzle cluster define the cluster depth d. Each nozzle cluster is spaced apart from an adjacent nozzle cluster along the row direction by a cluster spacing a such that an air flow path is created for forced air to pass through the row of nozzles in a controlled manner; and wherein at least a majority of nozzles of the first row, when projected in a transverse direction onto the row direction, are equidistantly spaced from one another by a projected nozzle spacing. In other words, when the first row is projected in a transverse direction onto the row direction, a transition region between adjacent nozzle clusters comprises two or more nozzles from a first cluster and two or more nozzles from a second cluster, the second cluster being adjacent to the first cluster, and the nozzles in the transition region being equidistantly spaced from one another by a projected nozzle spacing.

In a first embodiment, the first row of nozzles comprises a first set of subrows comprising first and second subrows that extend alongside one another in respective subrow directions, the first and second subrows extending parallel to the row direction. The first and second subrows are spaced apart by a first subrow spacing b in a transverse direction perpendicular to the row direction, and each of the first and second subrows comprises the one or more nozzle clusters. Each nozzle cluster within a subrow is spaced apart from a neighbouring nozzle cluster by the cluster spacing a; wherein the two or more nozzles from the first cluster and two or more nozzles from the adjacent, second cluster comprised within the transition region are comprised within the first and second subrows, respectively, and each projected nozzle cluster of the first and second subrows is spaced apart from an adjacent projected nozzle cluster by the projected nozzle spacing.

In some variants, the cluster depth d may be the same as the stagger offset distance sd. In other words, the cluster depth may be the depth of one subrow.

Optionally, the first set of subrows may further comprise a third subrow, wherein one or more nozzle clusters of each of the first, second and third subrows define a first subrow spacing between the first and second subrows and a second subrow spacing between the first and third subrows. The first and second subrow spacings may be the same as one another, or they may be different from one another.

Optionally, the nozzle plate may have a second row of nozzles extending in a second row direction, the second row direction being parallel to the first row direction. The second row of nozzles comprises a second set of subrows comprising first and second subrows that extend alongside one another in respective subrow directions, the first and second subrows of the second set of subrows extending parallel to the second row direction. The first and second subrows of the second set of subrows are spaced apart by a third subrow spacing b in a transverse direction, perpendicular to the second row direction. Each of the first and second subrows of the second set of subrows comprises one or more nozzle clusters, each nozzle cluster comprising a plurality of nozzles extending along the respective subrow direction for a cluster length c. Each nozzle cluster within a subrow of the second set of subrows is spaced apart from a neighbouring nozzle cluster by a cluster spacing a. At least a majority of nozzles of the first and second subrows of the second set of subrows, when projected in the transverse direction onto the second row direction, are equidistantly spaced from one another by a second projected nozzle spacing, and each projected nozzle cluster of the first and second subrows of the second set of subrows is spaced apart from an adjacent projected nozzle cluster by the second projected nozzle spacing. In other words, a second transition region between adjacent nozzle clusters of the first and second subrow of the second set of subrows comprises two or more nozzles from the first subrow and two or more nozzles from the second subrow of the second set of subrows, and the nozzles in the second transition region are equidistantly spaced from one another by a second projected nozzle spacing. The air flow path is created by the cluster spacings a so as to create a flow path for forced air to pass through the second row of nozzles in a controlled manner.

At least a majority of nozzles of the first and second sets of subrows, when projected in the transverse direction onto the row direction, may be equidistantly spaced from one another by a third projected nozzle spacing, the third projected nozzle spacing being less than the first projected nozzle spacing. In other words, when projected in the transverse direction onto the row direction, in an overlap region of the first and second transition regions, the projected consecutive nozzles are equidistantly spaced from one another by a third projected nozzle spacing, the third projected nozzle spacing being less than the first projected nozzle spacing.

Optionally, the one or more nozzle clusters of the first subrow of the first set of subrows has a cluster length different from the cluster length of one or more nozzle clusters of the second subrow of the first set of subrows.

Optionally, one of the subrows comprises first and second subsets of nozzle clusters, the cluster length of the first subset of nozzle clusters being different to the cluster length of the second subset of nozzle clusters.

The first subrow spacing b may be greater than 150 μm, optionally greater than 300 μm, and more further optionally greater than 500 μm.

It will be appreciated that, in embodiments having subrows, the air flow path is created by the cluster spacing a in combination with the subrow spacing b.

In a second embodiment, each nozzle cluster may be spaced apart from an adjacent nozzle cluster along the row direction by a cluster spacing a greater than a nozzle spacing ns between adjacent nozzles of a nozzle cluster.

Optionally, each projected nozzle cluster of the first row may be spaced apart from an adjacent projected nozzle cluster by the projected nozzle spacing.

Additionally or instead, in some variants one or more of the plurality of nozzle clusters may comprise two or more subclusters of nozzles extending substantially along the row direction, wherein the subclusters are arranged parallel to one another so as to form a matrix of nozzles, and wherein each nozzle cluster is arranged so as to overlap with an adjacent nozzle cluster along the row direction and along a direction perpendicular to the row direction.

Additionally or instead, in some variants the nozzle clusters may be arranged in one or more of a parallelogram, trapezoidal or triangular shape.

In some hybrid variants, the nozzle clusters of variants according to the first embodiment that are located adjacent one another along the row direction may be offset from one another along the cluster depth direction. In other words, two subrows of clusters may be created, each subrow extending parallel to the row direction, the subrows spaced apart from another by a subrow spacing b in a transverse direction, the transverse direction being perpendicular to the row direction.

In some variants of either embodiment, the one or more of the plurality of nozzle clusters may comprise two or more subclusters of nozzles extending substantially along the row direction, wherein the subclusters are arranged parallel to one another so as to form a matrix of nozzles. The subclusters may be offset from one another in a direction perpendicular to the row direction by a stagger offset distance sd.

Figure 3A:
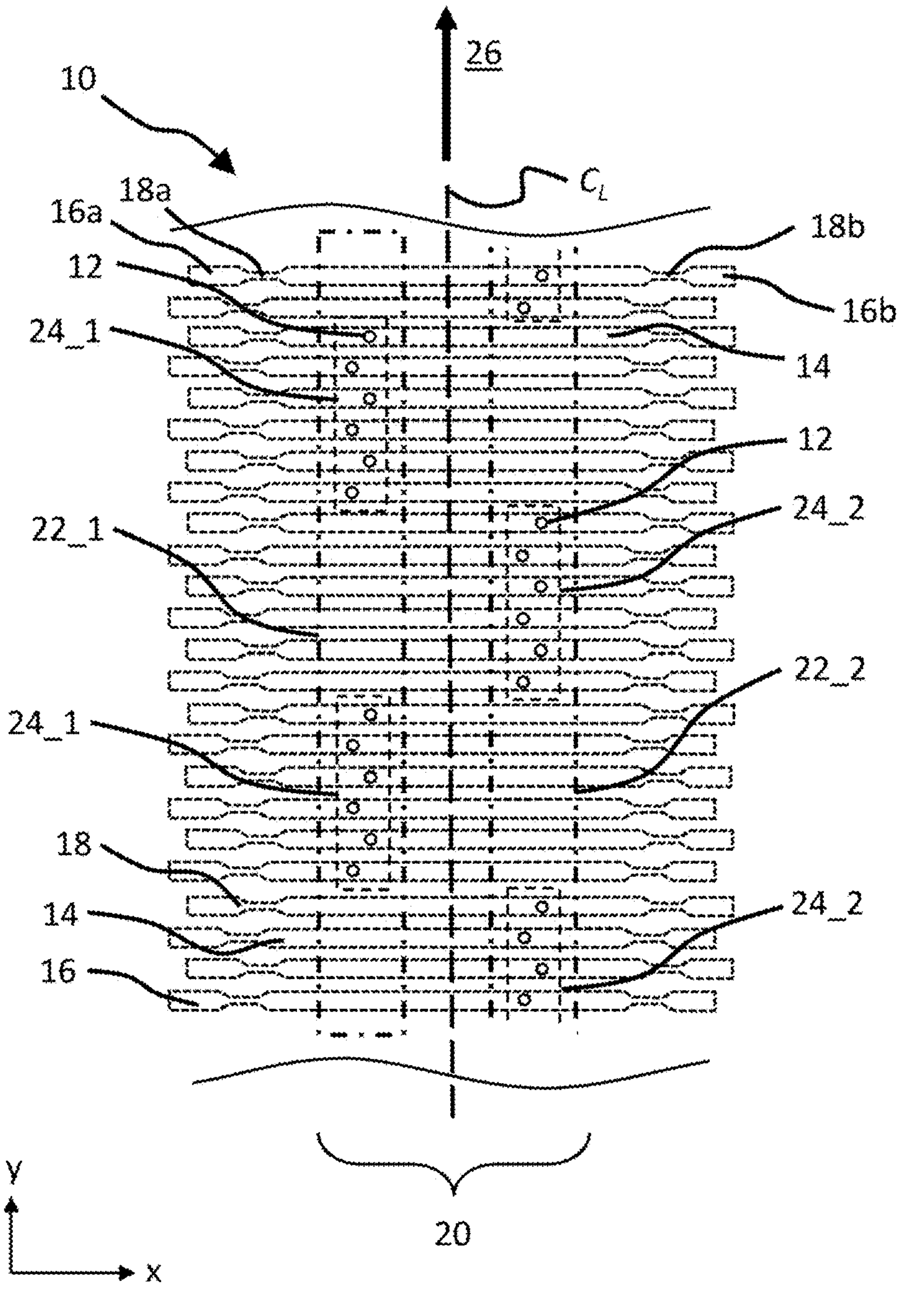
FIG. 3A is a schematic plan view of a nozzle plate showing nozzle clusters according to a first embodiment and showing an arrangement of pressure chambers.

First Embodiment of the Nozzle Plate FIG. 3A shows a section of a plan view of a nozzle plate 10 according to a first illustrative embodiment, comprised within a droplet ejection head 2. Part of a row 20 of nozzles 12 is shown in relation to fluid channels (dashed lines) comprising pressure chambers 14 in communication with restrictors 18 and ink ports 16 that may be configured behind the nozzle plate 10 in order to supply ink to the nozzles. The row 20 of nozzles 12 extends in a row direction 26.

In contrast to FIG. 1D, the nozzles 12 are arranged in a clustered configuration, whereby alternate nozzle clusters 24 comprising a plurality of nozzles 12 are offset from one another along a direction orthogonal to the row direction 26 (along the x-direction). This nozzle arrangement produces first and second subrows 22_1 and 22_2, where the first subrow 22_1 is defined by nozzle clusters 24_1 and the second subrow 22_2 is defined by nozzle clusters 24_2.

The first and second subrows 22_1 and 22_2 extend parallel to one another in respective subrow directions, and the subrow directions in turn extend parallel to the general row direction 26 of row 20. The first and second subrows are therefore spaced apart by a subrow spacing b, which in FIG. 3B and in FIGS. 7 to 11 is the shortest distance between the inner nozzles of the two subrows, i.e. along the orthogonal to the row direction 26, and representing a spacing not occupied by nozzles.

Figure 3B:
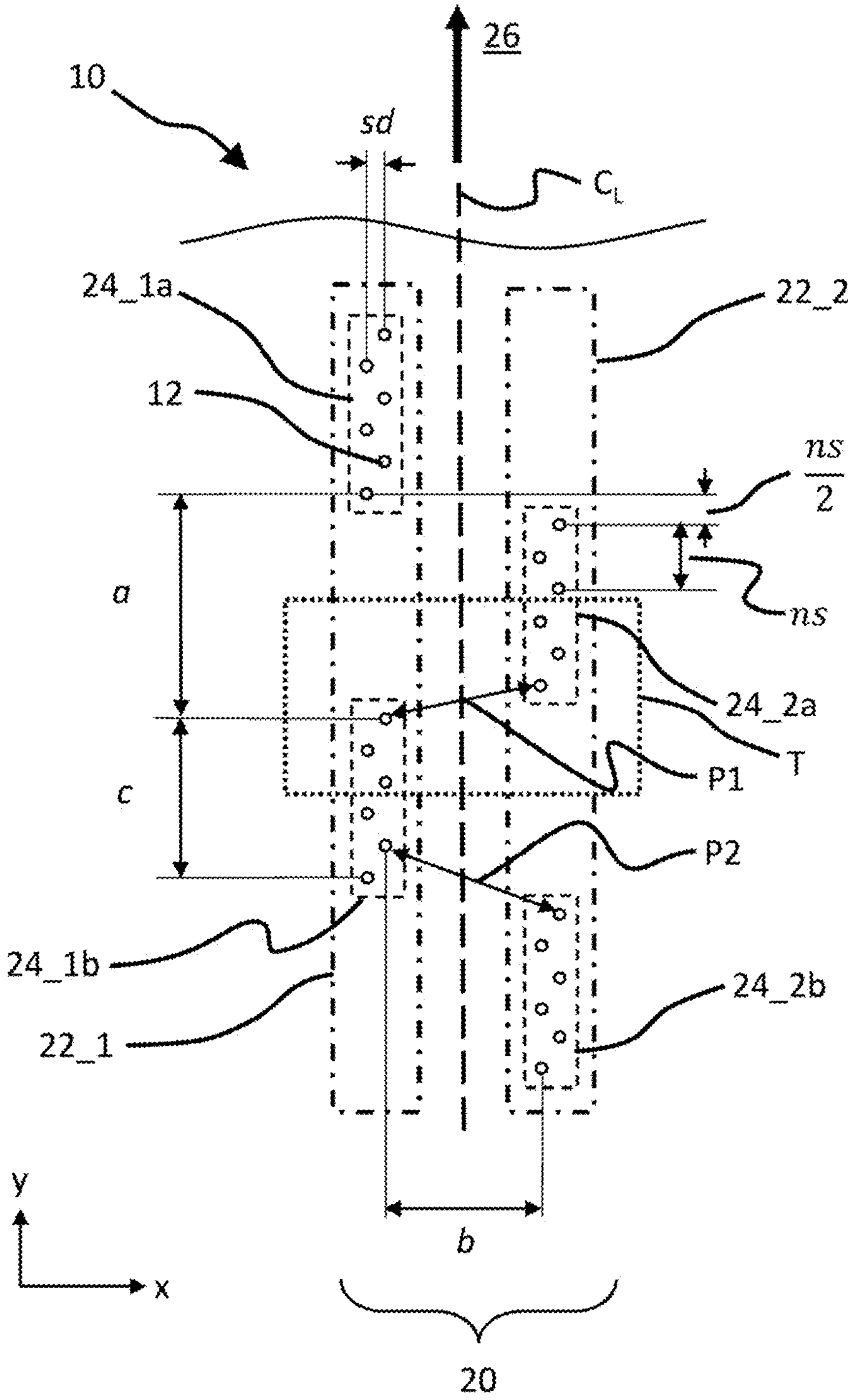
FIG. 3B is a further schematic plan view of the nozzle plate of FIG. 3A.

This is further illustrated in FIG. 3B, which shows in greater detail the arrangement of the nozzles 12 of the nozzle plate 10 of FIG. 3A. Specifically, in an extract of the nozzle plate 10, each subrow 22_1 and 22_2 of row 20 has two nozzle clusters each: subrow 22_1 is shown to have at least nozzle clusters 24_1*a* and 24_1*b* arranged adjacent each other in a respective subrow direction, and subrow 22_2 has at least nozzle clusters 24_2*a* and 24_2*b* arranged adjacent each other in a respective subrow direction.

Nozzles 12 of each nozzle cluster 24_1*a*, 24_1*b*, 24_2*a* and 24_2*b* extend over a cluster length c along the respective subrow direction, which in FIGS. 3A and 3B and FIGS. 7 to 11 is presented as the distance between the outermost nozzles in each cluster as measured along the respective subrow direction.

Cluster 24_1*a* is spaced from adjacent cluster 24_1*b* by a cluster spacing a in the respective subrow direction. In FIGS. 3A and 3B and in FIGS. 7 to 11, the cluster spacing a is presented as the distance between the outermost nozzles of adjacent clusters in the same subrow, as measured along the respective subrow direction, representing a spacing not occupied by nozzles.

Cluster 24_2*a* is also spaced from adjacent cluster 24_2*b* by a cluster spacing a in the respective subrow direction. Nozzle clusters 24_1*a* and 24_1*b* define subrow 22_1 and nozzle clusters 24_2*a* and 24_2*b* define subrow 22_2, where subrow 22_1 extends parallel to subrow 22_2 and at a subrow spacing b to subrow 22_2.

In this embodiment therefore, a nozzle plate 10 for a droplet ejection head 2 is provided, the nozzle plate 10 comprising at least a first row 20 of nozzles 12 arranged to deposit droplets onto a deposition media. The first row of nozzles extends in a row direction 26, and comprises a first set of first and second (or more) subrows 22 extending alongside one another in respective subrow directions, where the subrow directions extend parallel to the row direction 26. The first and second subrows 22 are spaced apart by a first subrow spacing b in a transverse direction, perpendicular to the row direction 26, wherein each subrow comprises one or more nozzle clusters 24. Each nozzle cluster 24 comprises a plurality of nozzles 12 which extend along the respective subrow direction for a cluster length c, wherein each nozzle cluster 24 within a subrow 22 is spaced apart from an adjacent nozzle cluster by a cluster spacing a. Preferably the first subrow spacing b is greater than 300 μm. The nozzles 12 of the first set of subrows, when projected in the transverse direction onto the row direction 26, are equidistantly spaced apart from adjacent projected nozzles by a projected nozzle spacing, and each projected nozzle cluster of the first and second subrows 22 is spaced apart from an adjacent projected nozzle cluster by the projected nozzle spacing. In some implementations, the subrow spacing may be smaller than 900 μm. Alternatively, the subrow spacing may be greater than 400 μm, or greater than 500 μm.

In the illustrative embodiment of FIG. 3A, the nozzles within a cluster are shown in a pattern of a staggered nozzle configuration as in FIG. 1D, whereby alternate nozzles 12 are offset from their neighbours by a stagger distance sd along a direction orthogonal to the row direction (along the x-direction). The nozzles 12 are spaced from their nearest neighbour of the same stagger offset by a nozzle spacing ns (along the y-direction), as indicated in FIG. 3B. This is however not essential; in some droplet ejection heads it may be possible to avoid crosstalk in different ways, for example by providing fluidic dampers in the fluid path or by sufficient separation between the fluid paths of adjacent pressure chambers 14, and nozzles 12 may not be offset by a stagger distance sd. The subrow spacing b may be at least 300 μm or at least 400 μm. In some implementations the subrow spacing b may be of a similar size as the cluster spacing a. For example where clusters comprise four nozzles each and where ns/2=84.67 μm for example, the cluster spacing a may be 423.35 μm, the cluster length may be 254 μm, and the subrow spacing b may be a=b=423.35 μm.

In the example embodiment of FIGS. 3A and 3B, the first and second subrows 22_1 and 22_2 defined by nozzle clusters 24_1*a, b* and 24_2*a, b*, respectively, define a complete row 20 in the sense of the row 13 shown in FIG. 1D. This means that the row 20 of nozzles 12 is used to deposit droplets into the same "line pixel" on the deposition media 3 according to image data. Furthermore, when viewed along a transverse projection direction of one subrow onto the other, along the x-direction in FIG. 3A, the nozzles 12 in a transition region T, shown in dotted outline in FIG. 3B, and that comprises a plurality of nozzles from each nozzle cluster 24 (as shown for example three nozzle each from clusters 24_1*b* and 24_2*a*) are spaced equidistantly and without overlap between nozzles, achieving a constant nozzle spacing ns/2 in the transition region, similarly as for the row 13 in FIG. 1D where all nozzles 12 are spaced apart by a nozzle spacing ns/2. In the example shown in FIG. 3B, all nozzle clusters 24 define a complete row 20 without overlap between nozzle clusters 24, similarly as for the row 13 in FIG. 1D, and where all nozzles 12 are spaced apart by a nozzle spacing ns/2. This is to be distinguished from a transition between nozzle plates comprising individual rows of nozzles, where the rows of nozzles of one nozzle plate typically partially overlap the rows of nozzles of the other nozzle plate to create some redundancy in the overlap region, such that an optimal transition from one nozzle plate to the next may be chosen. In such an arrangement, the projected nozzle spacing is not constant as a result of misalignment between nozzle plates, where the nozzle plates may be individual silicon die mounted to a common frame.

The two subrows shown in FIG. 3B may be part of a first set of subrows that define the complete row, as will be described later.

The specific fluid arrangement behind the nozzle plate indicated in FIG. 3A is not important and merely serves to illustrate how the nozzles 12 may be supplied with fluid. The nozzles 12 in the illustrative embodiment of FIG. 3A are shown to be arranged along the elongate direction of pressure chambers 14 so as to define clusters of nozzle arranged along a subrow direction, while the pressure chambers are not contributing to the definition of the two subrows. Ink ports 16*a*, 16*b* in fluidic communication with the pressure chamber 14 via a restrictor 18*a*, 18*b*. This arrangement enables, for example, recirculation past the nozzle or fluid supply at both ends of the pressure chamber. For recirculation, one of the ink ports 16*a* supplies a respective pressure chamber 14 with ink via a corresponding restrictor 18*a* from one end of the pressure chamber, and any ink not ejected from the nozzle 12 is returned via the restrictor 18*b* at the other end of the pressure chamber 14 to a corresponding ink port 16*b*. The pressure chambers 14 are shown to have one nozzle each, however this is not essential. Each pressure chamber may have two nozzles side by side, for example.

Returning to FIG. 1A, this illustrates the effect of forced gas flow caused by movement of the deposition media 3 on droplet landing position in the absence of mitigation of the woodgrain effect. The forced air flow, or couette flow, in the gap G that is created by the deposition media 3 moving in the media transport direction x is indicated by a series of parallel arrows of different lengths, with longer arrows indicating faster air flow than shorter arrows. As can be seen, the droplets ejected from the nozzle plate 6 are, as a result of the forced air flow, displaced in time from the position immediately beneath the nozzle 12 upon ejection to the landing position on the deposition media 3 after travelling across the gap G.

The droplet displacement caused by the forced air flow, from here on referred to as primary flow, is considered to be uniform across the drop ejection head 2. This part of the droplet displacement can be managed by knowledge of the media speed and coordinating the timing of ejection accordingly.

Meanwhile, secondary air flows and their interaction with the primary flow can lead to an additional unpredictable displacement of the droplet in the direction of media transport, x, or in the row direction. This part of the deviation is not possible to control by conventional measures, e.g. through timing.

One example of secondary air flow is that thought to be caused by the ejection of droplets from the nozzles 12. Each droplet, moving for example at 6 m/s, drags air downwards with it, causing a downward columnar air flow. Such air columns may combine along the row direction to form a "curtain" of air flow around a group of neighbouring nozzles 12. This may particularly be the case for high resolution droplet ejection heads, which have smaller nozzle spacings and the columns are more densely packed.

The "air curtain" and its associated flow may be stronger the faster the droplets are and the higher the frequency at which the droplets are ejected. The forced flow induced by the droplets impinging on the deposition media 3, and the interaction of the air curtain with the forced flow leads to the formation of circulating eddies. This is schematically shown in FIG. 1C. The strength and the extent, in the droplet ejection direction, of these eddies is thought to depend on droplet velocity and volume (weight).

It is thought by the inventors that the forced air flow may break through the "air curtain" set up by the droplet curtain, and, upon passing the droplet curtain, will form eddies with a circulating motion crossing the media transport direction. This may occur at particular at weak points or gaps in the droplet curtain. Weaknesses in the droplet curtain, and therefore gaps in the barrier presented by the "air curtain", may occur due to non-uniformities across a row of nozzles, for example due to some nozzles producing lower droplet volumes and/or slower droplets compared to their neighbours, due to some nozzles not ejecting droplets coaxially with the nozzle axis, or due to nozzles that are non-active due to image information.

Taken alone or in combination, the different sources of eddies or vortices introduce flow components in the gap G that cross the media transport direction x and are antiparallel to the droplet ejection direction, and it is these components that cause the perceived "woodgrain" pattern shown in FIG. 1B. The generation of this pattern and the effect of arranging the nozzles in clusters was further confirmed by simulations.

Considering first a conventional nozzle row 13 according to FIG. 1D, FIG. 1C is a contour plot of the magnitude of velocity of air between the nozzle plate 6 and the deposition media 3. The aspect of the view is downwards in a direction perpendicular from the nozzle plate 6. The velocity magnitude is assessed on a plane halfway between, and parallel to, the nozzle plate 6 and the deposition media 3, and is the maximum magnitude of air velocity at a particular location irrespective of flow direction. Thus, for a gap of 3 mm, the plane is located 1.5 mm away from the deposition media 3 on which velocity magnitude contours are plotted. The simulations were set up with a drop size of 3 pl; a print frequency of 20 kHz and a media speed of 0.416 m/s, leading to a resolution of 1200 dpi (dots per inch) in the print direction (i.e. along the x-direction in FIG. 1C).

The dark areas in FIG. 1C represent low velocity magnitudes (close to zero) and the light regions represent velocity magnitudes of about 1.5 m/s. The row 13 of nozzles is located along the upper horizontal line of high velocity and further indicated by the row direction (arrow) 26 in FIG. 1C. The couette flow direction in FIG. 1C is along the direction of motion of the deposition media 3, i.e. along the x-direction. At the start of printing, a forced air flow is created in direction perpendicular to the row direction 26, along the direction of travel of the deposition media (along the x-direction). In addition, a droplet curtain is being created which blocks the forced air. This forced air flow creates vortex 60 in front of the droplet curtain. This vortex 60 is continuously energised by the moving substrate, causing it to break through and penetrate the droplet curtain and create downstream air flows 62 behind the nozzles. Those downstream air flows 62 create displacements in droplet landing positions that can produce a visual woodgrain effect. The locations at which the vortex 60 breaks through the droplet curtain change dynamically and unpredictably in time, so that the downstream air flows 62 change continuously and produce a woodgrain pattern that evolves along the image.

The inventors propose that by providing nozzle clusters 24, the vortex 60 caused by the forced air flow, instead of uncontrollably breaking through the droplet curtain of a conventional nozzle row 13 of FIG. 1D, is allowed to controllably dissipate energy through the droplet curtain such that print quality can be maintained.

Figure 4A:
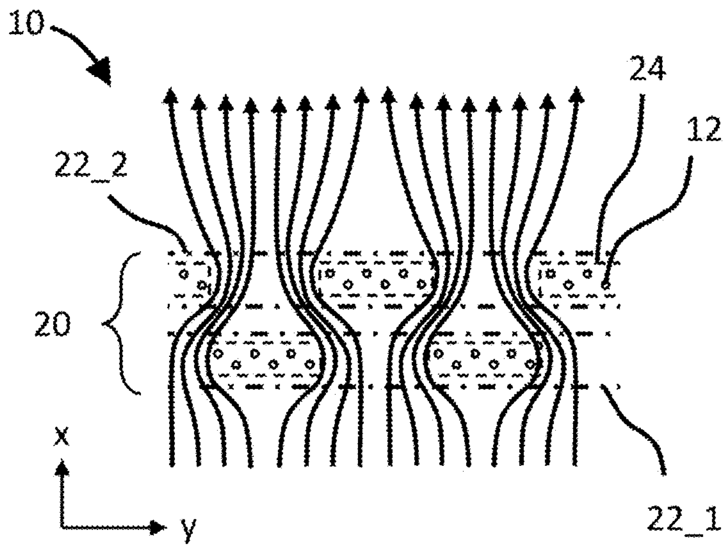
FIG. 4A is an illustration of forced air flow lines passing through the nozzle clusters of the nozzle plate of FIG. 3A.
Figure 4B:
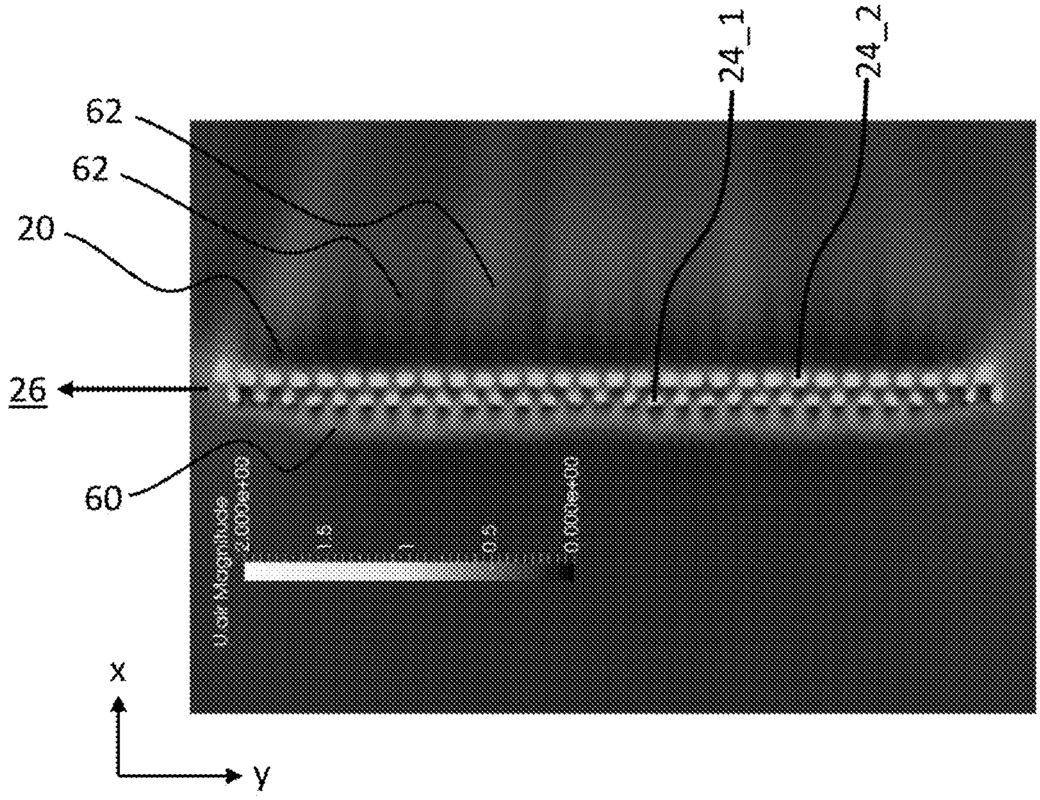
FIG. 4B is a simulation of air flow magnitudes of forced air passing through the nozzle clusters of the nozzle plate of FIG. 3A.

Illustrating this proposal, FIG. 4A shows flow lines of forced air passing through the row 20 of nozzle clusters 24 of nozzles 12 along the path provided by the nozzle spacing between adjacent clusters of the same subrow 22_1, 22_2, and by the subrow spacing between subrows 22_1 and 22_2 define by nozzle clusters 24. The simulation of FIG. 1C was repeated with the nozzle arrangement of nozzle plate 10 according to the arrangement in FIG. 3B, for clusters comprising 6 staggered nozzles each arranged at ns/2=84.67 μm and stagger distance sd=84.67 μm, a cluster spacing a=592.67 μm and a subrow spacing of 677.33 μm. Using the same process conditions and gap distance as those used for the simulation in FIG. 1C for the conventional nozzle row 13, a resulting snapshot of velocity magnitude of air flows in the evolution of printing is shown in FIG. 4B. The high velocity locations can now only be observed at the location of the clusters 24_1 and 24_2 for subrows 22_1 and 22_2 (all nozzles printing). The inventors propose that these high velocity magnitudes ahead of the clusters are not created by the moving deposition media but rather by the droplet curtain. The velocity magnitude ahead of the row 20 is significantly reduced compared to that in the plot of FIG. 1C; the inventors believe that this suggests the vortex 60 is not being created in front of curtain since it has opportunity to easily penetrate the curtain between the gaps of the clusters. Importantly, the downstream air flows 62, as well as being much smaller in magnitude compared to those in FIG. 1C, are now uniformly distributed in an unchanging pattern contrary to the dynamic pattern in FIG. 1C. FIG. 4B therefore shows how the presence of nozzle clusters 24 provides paths through the droplet curtain for the forced air flow to pass in a controlled manner. The unchanging pattern of controlled downstream air flows 62 can be adjusted by changing the droplet volume and/or velocity (by 'trimming') to account for droplet deviations along the row direction, since these deviations are constant over time.

To assess different cluster designs, simulations were performed for droplet landing positions using an adapted MPPICFoam solver (OpenFOAM software). The simulations were performed on a rectangular box with the following dimensions: 7.5 cm in the print direction (x-direction), 9 cm in the width direction (y-direction) and the height of the domain was constrained by the gap distance G. The top wall of the domain was constrained as a fixed wall with zero-velocity condition. The bottom wall simulated the moving deposition media for which adequate velocity conditions were imposed. The nozzles were located 3 cm downstream (in direction of media transport) from the inlet into the gap G. The total length of the row of nozzles 20 was equal to 3 cm, so that with respect to the 9 cm domain width the flow was allowed to flow around the ends of the droplet curtain. A velocity profile for the couette flow was imposed at the inlet and a zero pressure boundary at the outlet. All the simulations were timed to create 12 cm long images in the print direction (along the x-direction).

In the simulations, three types of nozzle clusters 24 were assessed: 4, 6 and 8 nozzles per nozzle cluster. The nozzles 12 were staggered by a stagger distance sd=84.67 μm and spaced at a nozzle spacing ns/2=84.67 μm according to the same spacing definitions as shown in FIG. 3. Gap distances G of 3 mm and 4 mm between nozzle plate 10 and deposition media 3 were tested, for droplet volumes of 3 pl and an initial drop velocity to 8 m/s, where the density of droplets was 1100 kg/m$^2$. Two print frequencies were assessed: 20 kHz and 60 kHz, corresponding to media speeds of 1.248 m/s and 3.744 m/s, to provide a resolution of 1200 dpi.

Figure 5:
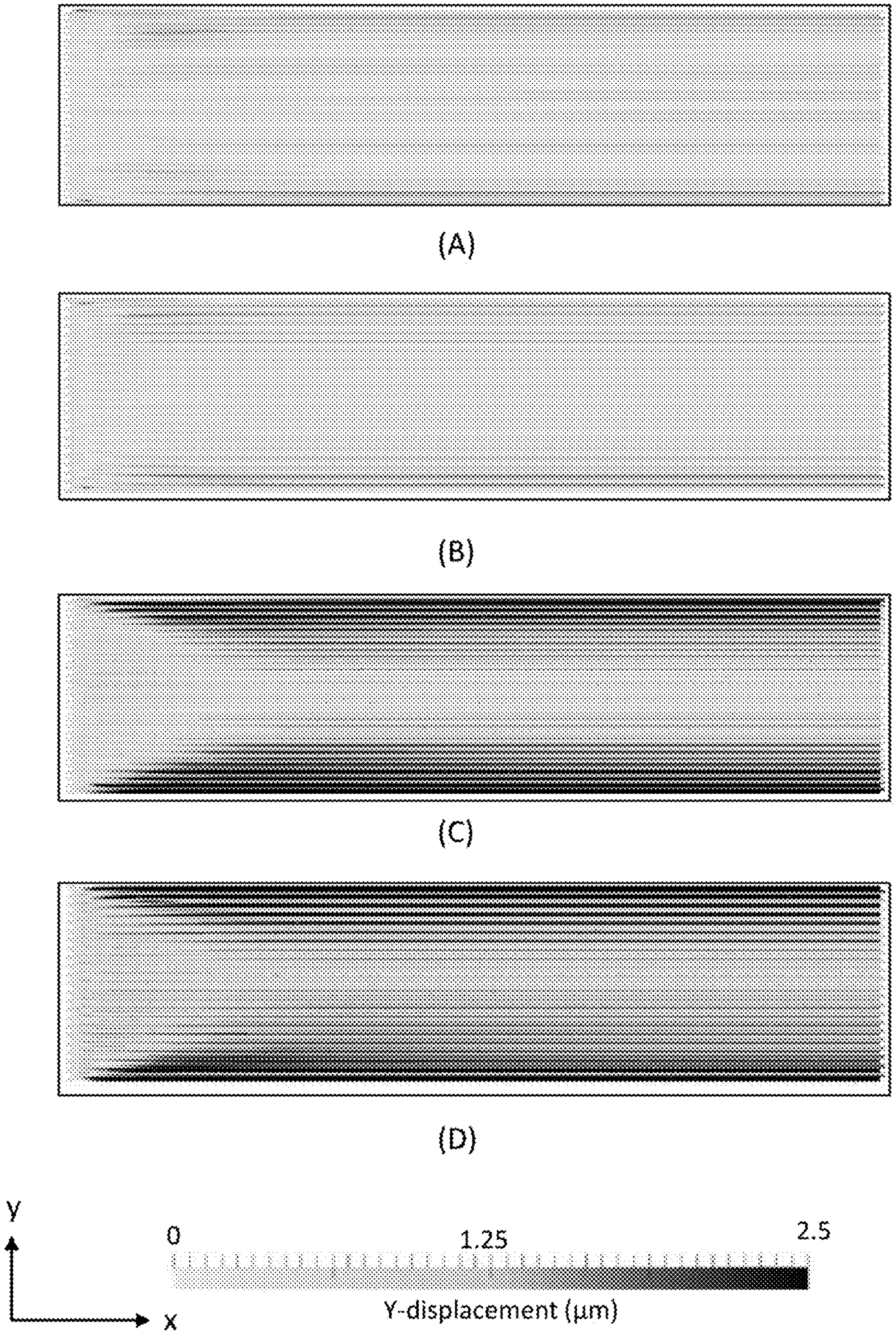
FIGS. 5A and 5B are printed image simulations for a 3 mm gap for 6×6 and 8×8 nozzle clusters respectively and printing at 20 kHz.
FIGS. 5C and 5D are printed image simulations for a 3 mm gap for 6×6 and 8×8 nozzle clusters respectively and printing at 60 kHz.
Figure 6:
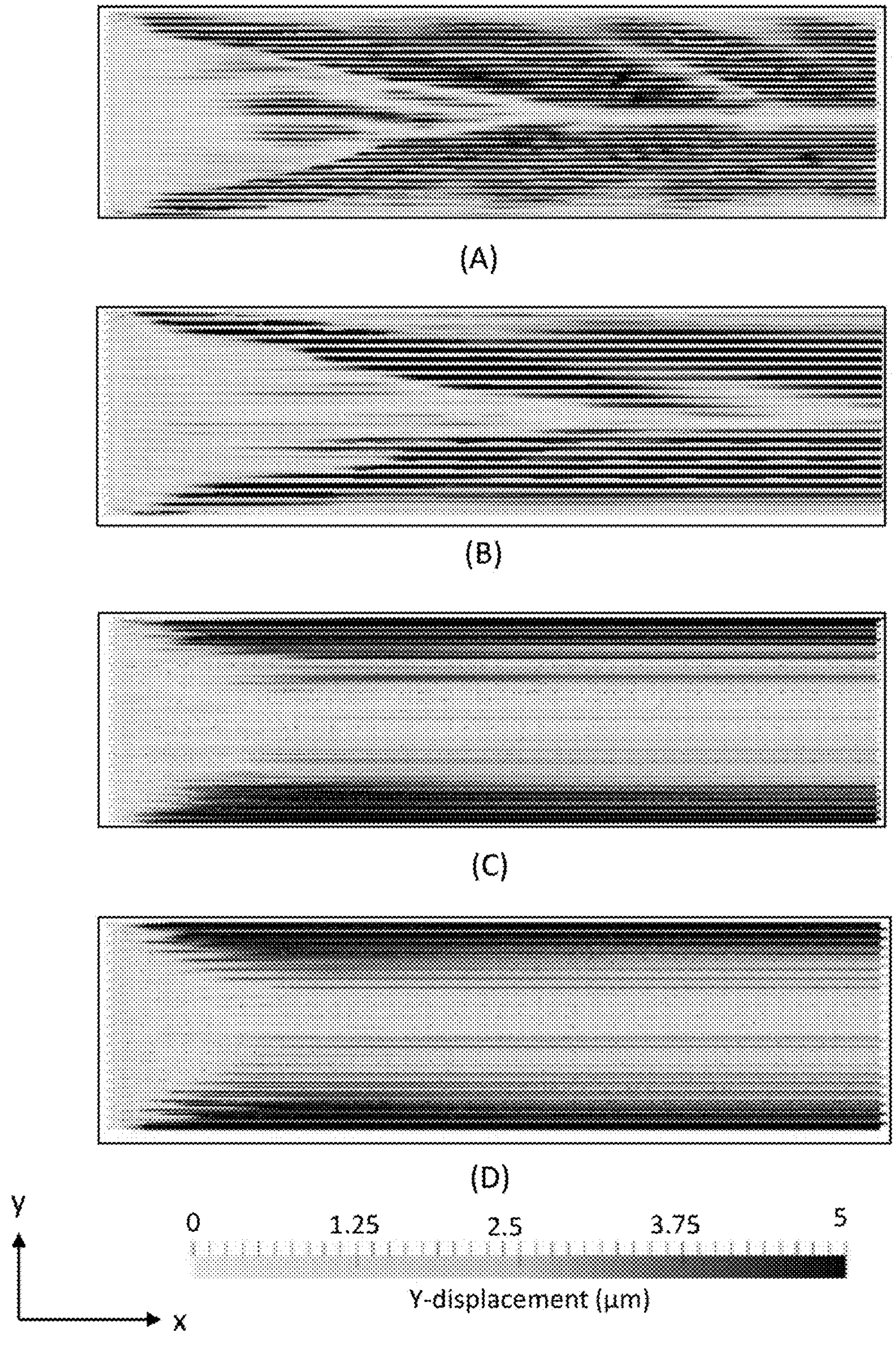
FIGS. 6A and 6B are printed image simulations for a 4 mm gap for 6×6 and 8×8 nozzle clusters respectively and printing at 20 kHz.
FIGS. 6C and 6D are printed image simulations for a 4 mm gap for 6×6 and 8×8 nozzle clusters respectively and printing at 60 kHz.

FIGS. 5 and 6 are droplet deviation images resulting from the simulations, showing the magnitude of displacement in the y-directions for all nozzles printing, and are representative results from the test runs listed in Tables 1 and 2 indicated by * (6×6 and 8×8 having the largest subrow spacing). The three nozzle cluster types "4×4", "6×6", and "8×8" correspond to identical nozzle cluster sizes in both subrows 22, defined by 4 nozzles in each nozzle cluster for the "4×4" clusters, by 6 nozzles in each nozzle cluster for the "6×6" clusters, and by 8 nozzles in each nozzle cluster for the "8×8" clusters. The following nozzle cluster spacings and lengths apply:

4×4 cluster: a=423.34 μm and c=254.00 μm;

6×6 cluster: a=592.67 μm and c=423.34 μm;

8×8 cluster: a=762.00 μm and c=592.67 μm.

Each cluster type was tested at four different subrow spacings b which were multiples of the nozzle distance ns: 2, 4, 6, 8 times, i.e. 169.33 μm, 338.67 μm, 508.00 μm and 677.34 μm.

TABLE 1A

| 3 mm gap, 20 kHz | | | |
|---|---|---|---|
| Test No. | Cluster Type | b (μm) | DE removed? |
| 5(□) | 4 × 4 | 169.33 | No |
| 6 | 4 × 4 | 338.67 | No |
| 7(□) | 4 × 4 | 508 | No |
| 8(□) | 4 × 4 | 677.34 | Almost |
| 21 | 6 × 6 | 169.33 | No |
| 22 | 6 × 6 | 338.67 | Almost |
| 23 | 6 × 6 | 508 | Much reduced |
| 24(*) | 6 × 6 | 677.34 | Yes |
| 37(o) | 8 × 8 | 169.33 | No |
| 38(o) | 8 × 8 | 338.67 | Almost |
| 39 | 8 × 8 | 508 | Yes |
| 40(*, o) | 8 × 8 | 677.34 | Yes |

TABLE 1B

| 3 mm gap, 60 kHz | | | |
|---|---|---|---|
| Test No. | Cluster Type | b (μm) | DE removed? |
| 9(Δ) | 4 × 4 | 169.33 | Almost |
| 10(Δ) | 4 × 4 | 338.67 | Yes |
| 11 | 4 × 4 | 508 | Yes |
| 12 | 4 × 4 | 677.34 | Yes |
| 25 | 6 × 6 | 169.33 | Almost |
| 26 | 6 × 6 | 338.67 | Yes |
| 27 | 6 × 6 | 508 | Yes |
| 28(*) | 6 × 6 | 677.34 | Yes |
| 41(Δ) | 8 × 8 | 169.33 | Almost |
| 42(Δ) | 8 × 8 | 338.67 | Yes |
| 43 | 8 × 8 | 508 | Yes |
| 44(*) | 8 × 8 | 677.34 | Yes |

TABLE 2A

| 4 mm gap, 20 kHz | | | |
|---|---|---|---|
| Test No. | Cluster Type | b (μm) | DE removed? |
| 13 | 4 × 4 | 169.33 | No |
| 14 | 4 × 4 | 338.67 | No |
| 15 | 4 × 4 | 508 | No |
| 16 | 4 × 4 | 677.34 | Much reduced |
| 29(+) | 6 × 6 | 169.33 | No |
| 30(+) | 6 × 6 | 338.67 | No |
| 31(+) | 6 × 6 | 508 | No |
| 32(*, +) | 6 × 6 | 677.34 | Much reduced |
| 45 | 8 × 8 | 169.33 | No |
| 46 | 8 × 8 | 338.67 | No |
| 47 | 8 × 8 | 508 | No |
| 48(*) | 8 × 8 | 677.34 | Much reduced |

TABLE 2B

| 4 mm gap, 60 kHz | | | |
|---|---|---|---|
| Test No. | Cluster Type | b (μm) | DE removed? |
| 17 | 4 × 4 | 169.33 | No |
| 18 | 4 × 4 | 338.67 | No |
| 19 | 4 × 4 | 508 | No |
| 20 | 4 × 4 | 677.34 | No |
| 33 | 6 × 6 | 169.33 | No |
| 34 | 6 × 6 | 338.67 | Almost |
| 35 | 6 × 6 | 508 | Almost |
| 36(*) | 6 × 6 | 677.34 | Yes |
| 49 | 8 × 8 | 169.33 | No |
| 50 | 8 × 8 | 338.67 | Almost |
| 51 | 8 × 8 | 508 | Yes |
| 52(*) | 8 × 8 | 677.34 | Yes |

The tables include an image quality indicator DE for the visual perception of the dynamic element (DE) of the woodgrain effect. The analysis is with respect to the same gap, cluster arrangement and frequency, essentially comparing the visual quality of the smallest subrow spacing to the next largest subrow spacing, and so on, up to the largest subrow spacing. 'DE Removed' means that for visual absence of the dynamic element of the woodgrain effect, 'Yes' is entered in the column. Increasing appearance of the dynamic element DE is indicated by 'almost', 'significantly reduced' and 'No', where 'No' indicates a strong presence of the DE.

For a selection of the simulated images indicated by (*) in Tables 1A, 1B and 2A, 2B (6×6 and 8×8 having the largest subrow spacing), FIGS. 5A-5D and 6A-6D show the droplet displacement for each nozzle 12 along the print direction (along the x-direction). The displacement of each droplet is represented by a graded scale, with black being the largest displacement and white being no displacement, and was calculated as the difference between intended nozzle coordinate and actual (simulated) droplet landing coordinate. FIGS. 5 and 6 only show the absolute value of displacement along the y-direction for the purpose of assessing the dynamic change in woodgrain pattern. For FIG. 5, the maximum displacement in the y-direction was a modulus of 2.5 μm, and for FIG. 6 is was a modulus of 5 μm, as indicated in the scale below the Figures.

For the 3 mm gap tests and a subrow spacing b=677.34 μm, FIGS. 5A-5D show images for 6×6 clusters at 20 kH (FIG. 5A, Test No. 24) and 8×8 clusters at 20 kH (FIG. 5B, Test No. 40), and for 6×6 clusters at 60 kH (FIG. 5C, Test No. 28) and 8×8 clusters at 60 kH (FIG. 5D, Test No. 44). As can be seen from FIG. 5A for 6×6 clusters operated at 20 kHz, some irregular deviation of droplets over time can be seen along the y-direction, particularly at start up towards the left of the image, representing a weak 'woodgrain' pattern. The other three figures, FIGS. 5B-5D, show a more regular pattern. In all images the patterns are caused by forced air flow. Where the deviations along the y-direction remain constant over time (after a start up time at the left of the plots), this signifies that only the non-dynamic element of the woodgrain pattern is present while the dynamic element is prevented. The resulting pattern is that of 'bands' due to droplets deviated by a constant amount. Such 'banding' may be mitigated by adjusting the droplet size of corresponding nozzles appropriately so as to deposit lower droplet volumes into darker banded areas and higher droplet volumes into lighter banded areas. Adjustment of the droplet volume is also referred to as 'trimming' of droplets to achieve different drop volumes and hence pigment densities at the deposition media surface. For the simulations of FIGS. 5A-5D therefore, after a start up time, the DE of the woodgrain effect is removed (indicated by 'Yes' in the table column for DE).

Comparing FIG. 5A with 5C and FIG. 5B with 5D, the patterns suggest that better control may be achieved by using 8×8 clusters rather than 6×6 clusters. Furthermore, Table 1A suggests that at 20 kHz the DE is removed early on for the larger subrow spacing of 677.34 μm for both the 6×6 and 8×8 clusters. For the 6×6 case, b>a and b>c. DE is also early on removed (8×8) or significantly reduced (6×6) for the second largest subrow spacing tested, b=508 μm.

At 60 kHz, the 6×6 clusters (FIG. 5C) and 8×8 clusters (FIG. 5D) each show a stronger but constant deviation pattern over time, after a start up period to the left of the image. The simulations suggest that, depending on the application conditions, a good reduction in woodgrain effect may be achieved by choosing a sufficiently high subrow spacing. For example for the 6×6 or the 8×8 clusters, the subrow spacing may be greater than 300 μm. At 20 kHz or 60 kHz and a 3 mm gap, the subrow spacing may be greater than the cluster length, b>c.

For the 4 mm gap, FIGS. 6A-6D show simulation results for droplet deviation against time for 6×6 and 8×8 clusters at the largest subrow spacing, b=677.34 μm. FIG. 6A relates to Test No 32 (6×6 cluster, 20 kHz), FIG. 6B to Test No 48 (8×8 cluster, 20 kHz), FIG. 6C to Test No 36 (6×6 cluster, 60 kHz), and FIG. 6D to Test No 52 (8×8 cluster, 60 kHz).

At 20 kHz, both the 6×6 and 8×8 clusters show a typical undulating woodgrain effect (DE not removed). While it is not entirely removed for any of the subrow spacings b tested, the DE of the woodgrain effect is less visible for the 8×8 cluster with a subrow spacing b of 677.34 μm than for the 6×6 cluster at the same subrow spacing b. However, it should be noted that, while the DE is more visible for the 6×6 arrangement than for the 8×8 arrangement, for the 6×6 arrangement the largest subrow spacing of b=677 μm still has a significantly reduced DE compared to the smallest subrow spacing (b=169 μm) for that arrangement, which is shown in FIG. 7A tested for the same conditions. A large proportion of the printed image in the case of FIG. 6B may therefore be adjusted by trimming droplet volumes. For the case in FIG. 6B, the subrow spacing is larger than the cluster length, b>c. A longer subrow spacing may further reduce the woodgrain effect, or additionally or instead a longer cluster length, for example a 10×10 type cluster such that c=762 μm and/or b>677.34 μm or equal to or greater than 762 μm. It will be appreciated that a cluster length significantly longer than the ones described herein will eventually present a significant length of droplet curtain to the incoming forced air flow that cannot controllably pass through, and may cause woodgrain effects.

At 60 kHz droplet frequency and a gap of 4 mm, as listed in Table 2B, the DE of the woodgrain effect appears less dominant compared to 20 kHz droplet frequency. Tables 2A and 2B suggest that the smallest, 4×4 type, cluster, while providing a reduction in DE, is less beneficial than the 6×6 and 8×8 clusters, and the 6×6 and 8×8 clusters may provide a suitable degree of reduction of the DE at any subrow spacing b higher than b=169 μm. At higher droplet frequencies therefore the cluster length c and/or the cluster spacing a may have a more significant effect on reducing the DE of the woodgrain effect than the subrow spacing b.

The reduction of the dynamic element DE of the woodgrain effect with increasing subrow spacing b may be clearly seen in FIGS. 7A-7D. In these Figures, simulated images are showing the dynamic development of droplet placement for a 4 mm gap G at 20 kHz for a 6×6 cluster arrangement according to the same dimensions and process of the 6×6 clusters tested in FIGS. 5A-5D and 6A-6D. The Figures correspond to Test Nos 33 to 36 of Table 2A (indicated by symbol +), for an initial subrow spacing of 169.33 μm, increasing to 338.67 μm (FIG. 7B), then to 508.00 μm (FIG. 7C) and finally to 677.34 μm (FIG. 7D). The smallest subrow spacing of FIG. 7A leads to a strong DE showing a rapidly changing 'mackerel skin' pattern due to dynamic effects. In FIG. 7B the droplet deviations start to stabilise and DE decreases. The 508 μm subrow spacing (FIG. 7C) shows a marked reduction in DE over the 169 μm subrow spacing, and b=677.33 μm provides an even better reduction for DE (FIG. 7D). While b=677.33 μm still allows a degree of DE (indicated as 'much reduced' over the other subrow spacings), FIGS. 7A-7D clearly show a progressive reduction in DE as the subrow spacing b is increased.

The simulations shown in FIGS. 5A-5D, FIGS. 6A-6D and FIGS. 7A-7D suggest that an improved reduction or even prevention of DE depends on the specific combination of media speed, droplet frequency, droplet volume (mass) and gap G of a specific application. Thus, a suitable nozzle cluster arrangement for a given application may be identified by varying the cluster length c, cluster spacing a and subrow spacing b.

Figure 20:
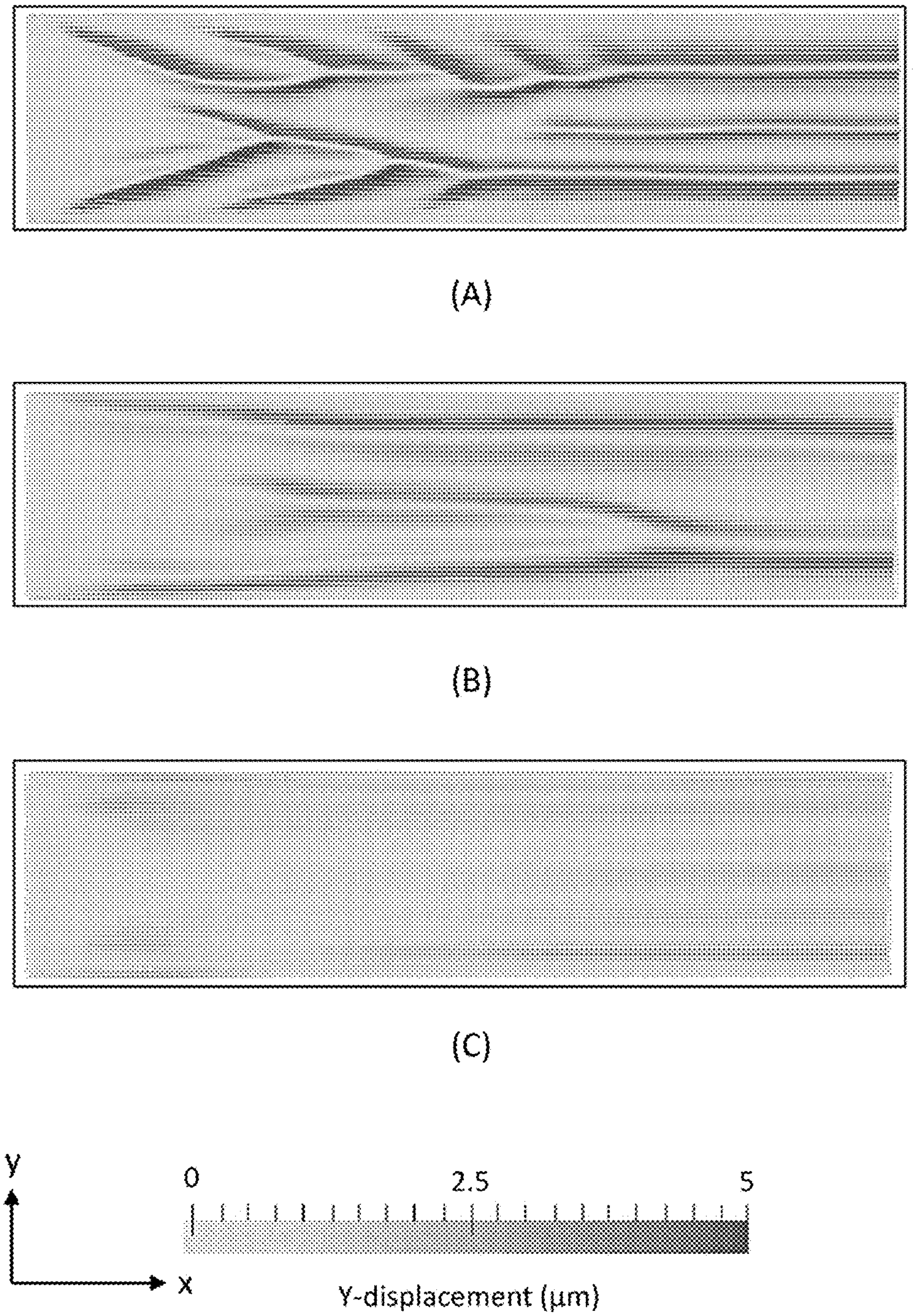
FIGS. 20A to 20C are printed image simulations for a 3 mm gap for 4×4 nozzle clusters and different subrow spacings printed at 20 kHz.
Figure 21:
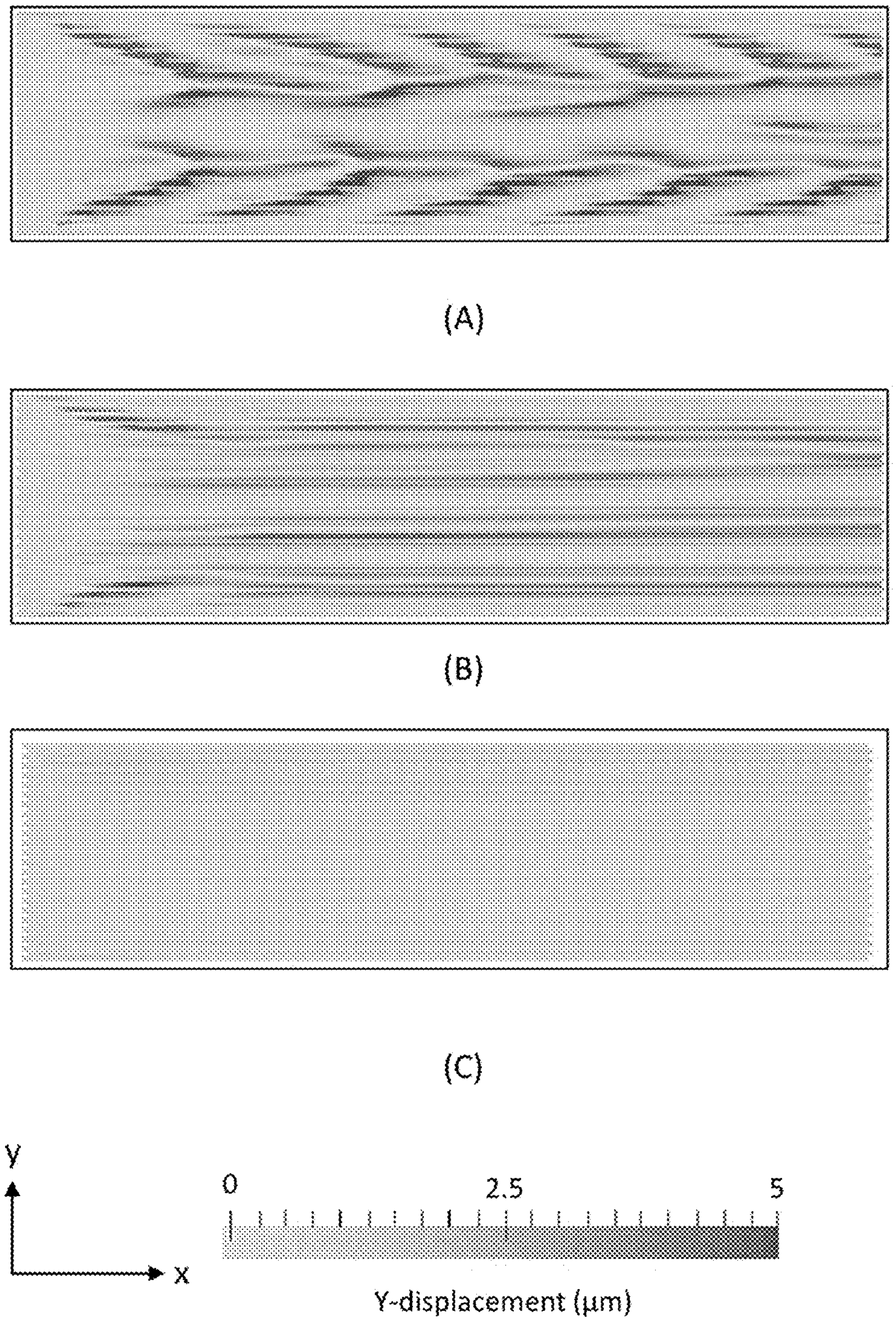
FIGS. 21A to 21C are printed image simulations for a 3 mm gap for 8×8 nozzle clusters and different subrow spacings printed at 20 kHz.
Figure 22:
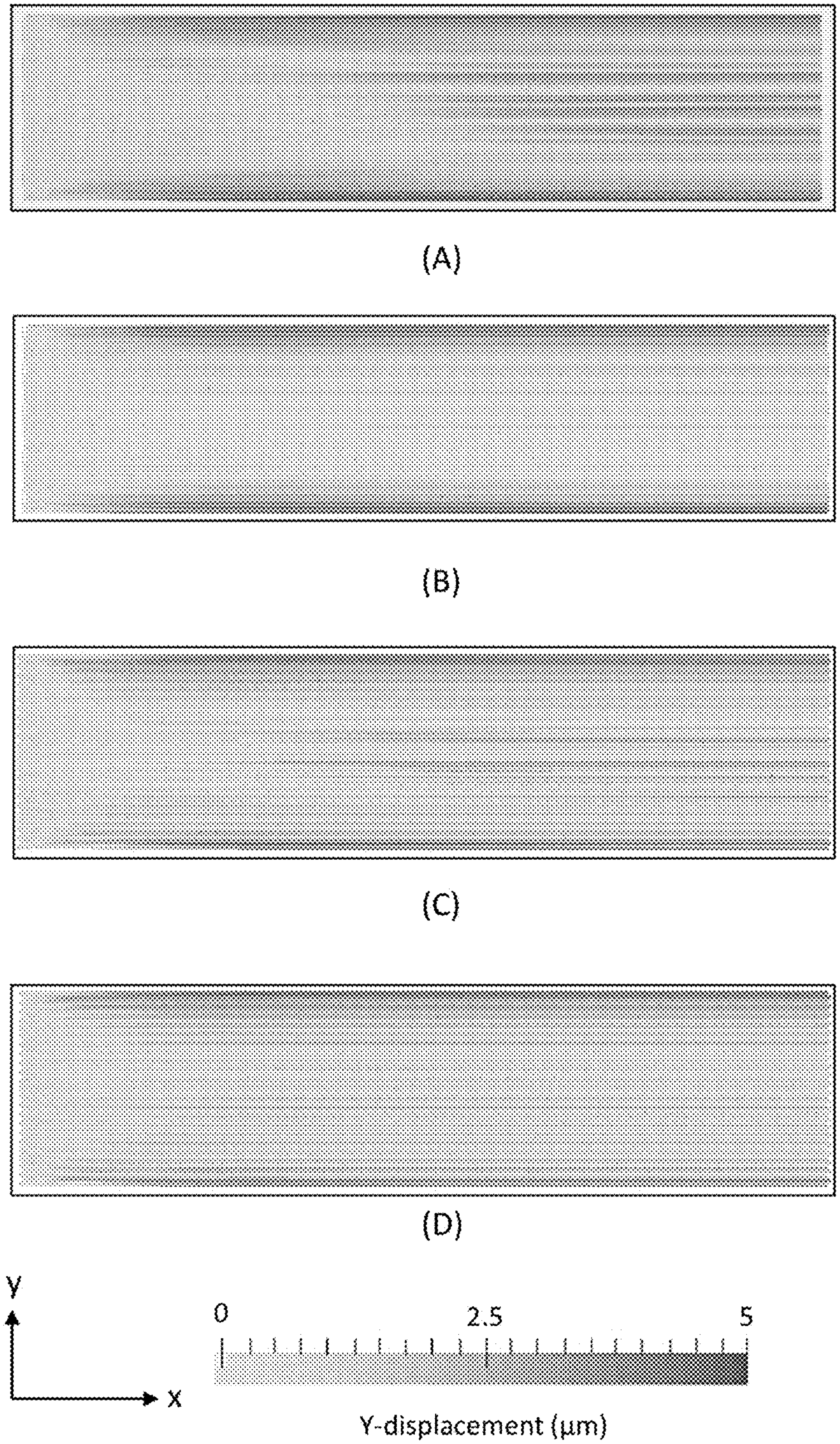
FIGS. 22A and 22B are printed image simulations for a 3 mm gap for 4×4 nozzle clusters and small subrow spacings printed at 60 kHz.
FIGS. 22C and 22D are printed image simulations for a 3 mm gap for 8×8 nozzle clusters and small subrow spacings printed at 60 kHz.

To illustrate the visual impact the provision of a flow path through the clusters might have if suitable cluster dimension and spacings (cluster and subrow) are chosen, further simulation results for the dynamic development of droplet placement for low frequency/small gap (20 kHz, 3 mm) are shown in FIGS. 20 and 21, and for the 4×4 cluster in FIG. 22 for a high frequency/small gap (60 kHz, 3 mm). In these Figures, the effect of increasing the subrow spacing is further illustrated.

FIGS. 20A-20C (test Nos 5, 7 and 8 of Table 1A, as indicated by symbol □) shows images simulated at 20 kHz, 3 mm gap, for the 4×4 cluster arrangement of test Nos. 5, 7 and 8 of Table 1A, i.e. with a subrow spacing b=169.33 μm (A), b=508 μm (B) and b=677.34 μm (C). While this cluster arrangement, for the range tested, does not completely remove the dynamic element DE of the woodgrain effect, the images clearly show a significant reduction in DE as the subrow spacing is increased from 169.33 μm to 677.34 μm. For the largest subrow spacing tested (677.34 μm), the DE component of the woodgrain effect is almost entirely removed so that mainly only the banding effect can be seen.

Similarly, FIGS. 21A-21C (test Nos 37, 38 and 40 of Table 1A as indicated by symbol o) shows images simulated at 20 kHz, 3 mm gap, for the 8×8 cluster arrangement having a subrow spacing b=169.33 μm (A), b=338.67 μm (B) and b=677.34 μm (C). DE is very dominant for the smallest subrow spacing b=169.33 μm (FIG. 21A), but is almost removed by a small increase in subrow spacing to b=338.67 μm (FIG. 21B). DE seems entirely removed for the largest subrow spacing tested, b=677.34 μm (FIG. 21C). Thus it may be envisaged that for some applications printing lower resolution images, a subrow spacing b of around 338 μm may be sufficient, for example a subrow spacing of at least 300 μm, while for more demanding applications, a subrow spacing b of around 677 μm is required, for example of at least 600 μm.

FIGS. 22A-22D shows images simulated at 60 kHz, 3 mm gap, for test Nos. 9, 10 and 41, 42 of Table 1B (as indicated by symbol Δ) for the smallest subrow spacing b=169.33 μm for the 4×4 cluster arrangement (A) and the 8×8 cluster arrangement (C), and the next spacing size up of b=338.67 μm for the 4×4 arrangement (B), and the 8×8 arrangement (D). It can be seen that for a higher frequency of droplet ejection, the droplets are less prone to dynamic deviations (DE) due to the woodgrain effect. In these cases, the smallest subrow spacing b=169.33 μm gave a good reduction in DE over having no clusters (b=0, not shown). DE is completely removed for the next subrow spacing of b=338.67 μm. Therefore, for higher frequency applications and less demanding resolution requirements, a subrow spacing as small as at least 150 μm may lead to acceptable image quality. For the more demanding applications, the subrow spacing may have to be greater than 170 μm, and preferable greater than 250 μm, and more preferably greater than 300 μm.

Figure 8A:
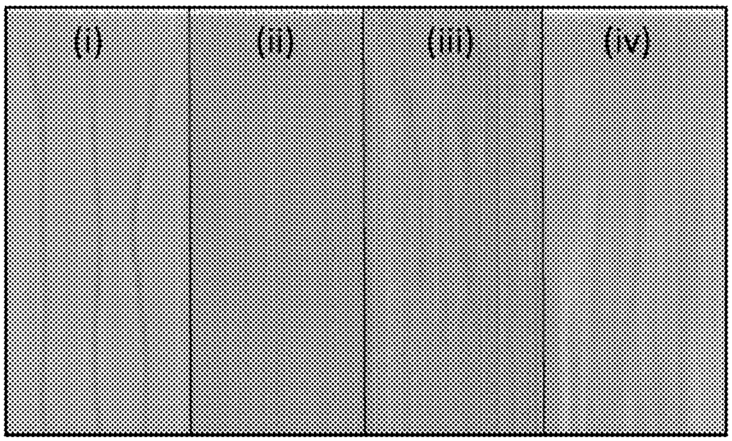
FIGS. 8A to 8C are printed images at different print frequencies for a 3 mm gap and 6×6 nozzle clusters for (i) a test nozzle plate, (ii) the nozzle plate of FIG. 3A, (iii) the nozzle plate of FIG. 14A, and (iv) the nozzle plate of FIG. 14B.
Figure 8B:
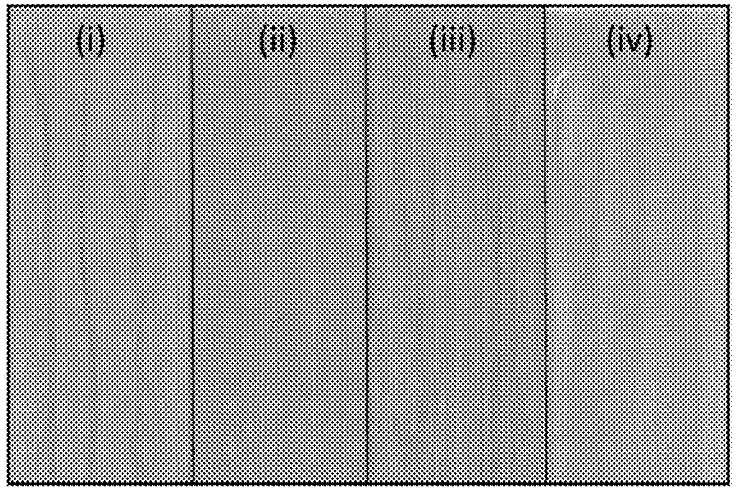
Figure 8C:
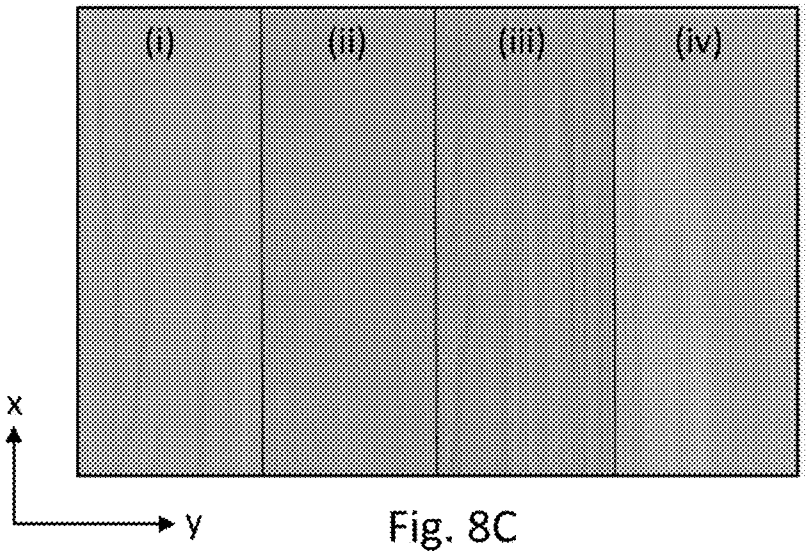

The simulation results described above were tested by experiments using a nozzle plate arrangement similar to, but having a subrow spacing intermediate to, the 6×6 nozzle arrangements of Test Nos 23 and 24: For a nozzle spacing ns/2=84.67 μm, the 6×6 experimental nozzle cluster arrangement had a cluster length c=423.3 μm, a cluster spacing a=592.7 μm and a subrow spacing b=592.7 μm, so that in this case a=b. These nozzle plates were built into a droplet ejection head and compared to a conventional droplet ejection head of same ns/2 but without nozzle clusters (i.e. using the arrangement of FIG. 2). FIGS. 8A to 8C show print test samples printed with a 3 mm gap for (i) the conventional nozzle plate, and (ii) for the experimental nozzle plate having 6×6 clusters, both achieving a resolution of 1200 dpi in the print direction at 20 kHz (FIG. 8A), 30 kHz (FIG. 8B) and 47 kHz (FIG. 8C) by varying the media speed accordingly: 0.416 m/s at 20 kHz, 0.635 m/s at 30 kHz and 0.995 m/s at 47 kHz. At all frequencies tested, the print samples (i) using the conventional nozzle plate show a typical woodgrain pattern with clearly visible dynamic element. The corresponding print sample using the nozzle plate with 6×6 clusters show only regular 'banding' with the DE removed.

The experimental tests therefore show how 6×6 clusters arranged in two subrows spaced apart by a subrow spacing b may be used to achieve a reduction in the dynamic element DE of the visible woodgrain effect, leaving a static effect of 'banding' only, and which may be mitigated further by adjusting the droplet volume (trimming) to remove the banding effect also. This will be described further below.

Returning to the example embodiment of FIG. 3, the cluster spacing a, the cluster length c and the subrow spacing b are constant for all nozzle clusters 24 of the row of subrows. In other words, in some implementations, the subrow spacing b may be substantially equal between the two subrows. Additionally, or instead, the cluster spacing a may be substantially equal for each subrow.

Optionally, the first subrow spacing b between a first subrow and a second subrow may be equal to the cluster spacing a between nozzle clusters of the first subrow. Additionally, or instead, the subrow spacing b may be substantially equal to the cluster length c; for example the first subrow spacing b between a first subrow and a second subrow may be equal to the cluster length c of the first subrow.

Additionally, or instead, the cluster spacing a may be substantially equal to the cluster length c within the same subrow and/or to the cluster length c of a different subrow.

Figure 9:
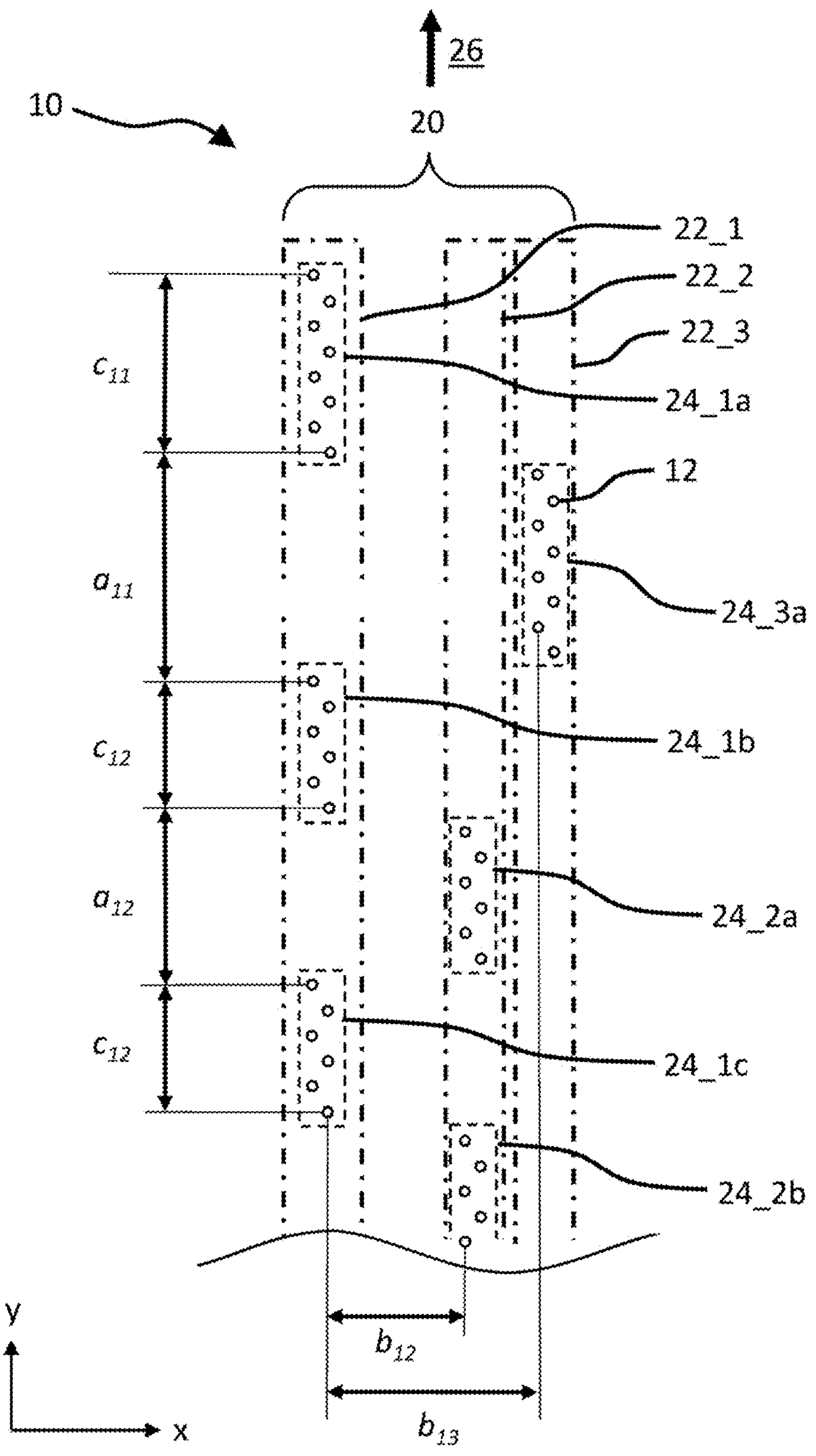
FIG. 9 is a schematic plan view of a nozzle plate showing nozzle clusters for three subrows.

Alternatively, FIG. 9 shows an implementation for which at least a first nozzle cluster 24_1*a* of a first subrow 22_1 of nozzles 12 may have a first cluster length $c_{11}$ that is different to a second cluster length $c_{12}$ of a second nozzle cluster 24_1*b* of the first subrow. In other words, the first subrow comprises first and second subsets of nozzle clusters, and the cluster length of the first subset of nozzle clusters is different to the cluster length of the second subset of nozzle clusters. Additionally, or instead, at least a first nozzle cluster 24_1*a* of a first of the subrows of nozzles may have a first cluster spacing $a_{11}$ to an adjacent second nozzle cluster 24_1*b* that is different to a second cluster spacing $a_{12}$ of the second nozzle cluster 24_1*b* to an adjacent third nozzle cluster 24_1*c* of the first subrow. In some implementations, the spacing between nozzle clusters from different subrows may be different, for example by defining at least three subrows of a row of nozzles 22_1, 22_2, 22_3, where the first subrow 22_1 is spaced apart from a second subrow 22_2 by a subrow spacing $b_{12}$, and the first subrow is spaced apart from a third subrow 22_3 by a subrow spacing $b_{13}$. In other words, one or more nozzle clusters of each of the first, second and third subrows define a first subrow spacing between the first and second subrows and a second subrow spacing between the first and third subrows. The first subrow spacing may be different to the second subrow spacing. This may be beneficial so as to vary the flow of air along the print direction (x-direction), in relation to the front of the droplet curtain of the nozzle plate 10 of droplet ejection head 2 (with respect to the y-direction). For example, the forced air flow around the sides of the droplet ejection head 2 may cause deviation of droplets ejected from nozzles 12 nearer the sides of the printhead or nearer the ends of the nozzle row more strongly than droplets ejected from nozzles 12 near the centre of the droplet ejection head 2, or near the centre of the row of nozzles.

For example, the nozzle clusters 24 nearer the sides of the droplet ejection head 2 may be arranged to provide a wider flow path for the forced air to pass through the droplet curtain.

Turning now to FIG. 9, this shows an illustrative implementation providing different cluster lengths c and different subrow spacings b within an end region of a row of nozzles. A row 20 of nozzles 12 comprises nozzle clusters 24. The nozzles are spaced apart from one another by a constant nozzle spacing ns. The nozzle clusters define three subrows 22_1, 22_2 and 22_3: Subrow 22_1 has nozzle clusters 24_1*a*, 24_1*b*, 24_1*c*, . . . ; subrow 22_2 has nozzle clusters 24_2*a*, 24_2*b*, 24_2*c*, . . . ; and subrow 22_3 has nozzle clusters 24_3*a* and 24_3*b*. Nozzle cluster 24_3*b* is not shown as it is located at the other end of the row of nozzles. The three subrows define two subrow spacings: subrows 22_1 and 22_2 are spaced apart by a subrow spacing $b_{12}$, and subrows 22_1 and 22_3 are spaced apart by a subrow spacing $b_{13}$. The first nozzle cluster 24_1*a* of subrow 22_1 and the first nozzle cluster 24_3*a* of subrow 22_3 are an example of an “8×8” cluster, each nozzle cluster having 8 nozzles. In this implementation, $c_{11}=a_{11}=b_{12}$, i.e. the cluster spacing $a_{11}$ between the first and second nozzle clusters 24_1*a* and 24_1*b* of the first subrow 22_1 is defined by the cluster length $c_{31}$ (not shown) of the first nozzle cluster 24_3*a* of the third subrow 22_3, which is the same as the cluster length $c_{11}$ of the first nozzle cluster 24_1*a* of the first subrow 22_1. In addition, the spacing between nozzles located at adjacent ends of nozzle clusters, e.g. between nozzle clusters 24_1*a* and 24_3*a*, when viewed along the projection direction of the set of subrows onto the row direction, is the same as the nozzle spacing ns within the same nozzle cluster 24. This means that, when viewed along the projection direction of the set of subrows onto the row direction, the nozzles 12 of the first nozzle cluster 24_1*a* of the first subrow 22_1 and of the first nozzle cluster 24_3*a* of the third subrow 22_3 form a continuous row of nozzles 12 of constant nozzle spacing ns. In this implementation, a similar pair of nozzle clusters, 24_1*n* and 24_3*b*, are located at the opposite end of the row 20 (not shown) and having the same configuration as nozzle cluster pair 24_1*a* and 24_3*a*.

The second and third nozzle clusters 24_1*b*, 24_1*c* of the first subrow 22_1 and the first and second nozzle clusters 24_2*a* and 24_2*b* of the second subrow 22_2 are an example of a “6×6” cluster, each nozzle cluster having 6 nozzles. In this implementation, $c_{12}=c_{12}=b_{12}$, i.e. the cluster spacing $a_{12}$ between the second and third nozzle 24_1*b* and 24_1*c* clusters of the first subrow 22_1 is defined by the cluster length of the first cluster 24_2*a* of the second subrow 22_2, which is the same as the cluster length $c_{12}$ of the second nozzle cluster 24_1*b* of the first subrow 22_1.

In addition, when viewed along the transverse projection direction of the set of subrows onto the row direction 26, the spacing between nozzles 12 located at adjacent ends of nozzle clusters, e.g. between nozzle clusters 24_1*b* and 24_2*a*, is the same as the nozzle spacing ns within the same nozzle cluster 24. This means that, when viewed along the projection direction of the set of subrows onto the row direction, the nozzles 12 of the nozzle clusters of the first subrow, the second subrow and the third subrow form a continuous row of nozzles 12 of projected constant nozzle spacing.

With the arrangement of FIG. 9, there is a wider path near the ends of the row for forced air flow to pass through the air curtain caused by the droplets ejected from the nozzles 12. The path between nozzle clusters 24_1*a* and 24_1*b* and 24_3*a* poses less resistance for air to pass through than the path between, for example, nozzle clusters 24_1*b*, 24_1*c* and 24_2*a*, 24_2*b*.

In an alternative implementation, more than one pair of nozzle clusters may have longer lengths and subrow spacings near the end of the row. The nozzle clusters near the end of the row may have a gradually widening path for forced air flow to pass through, by nozzle clusters that are gradually longer and comprise more nozzles 12 nearer to the end of the row than they do near the centre of the row.

Alternatively to the implementation of the FIG. 9, the cluster length may decrease, having shorter lengths and subrow spacings near the end of the row. The nozzle clusters near the end of the row may have a gradually narrowing path to provide more frequent and smaller flow paths for the forced air flow to pass through the air curtain created by droplets nearer the ends of the row compared to the centre of the row. In this alternative implementation, the subrow spacing may remain constant, so that all nozzle clusters are comprised within two subrows.

Figure 10:
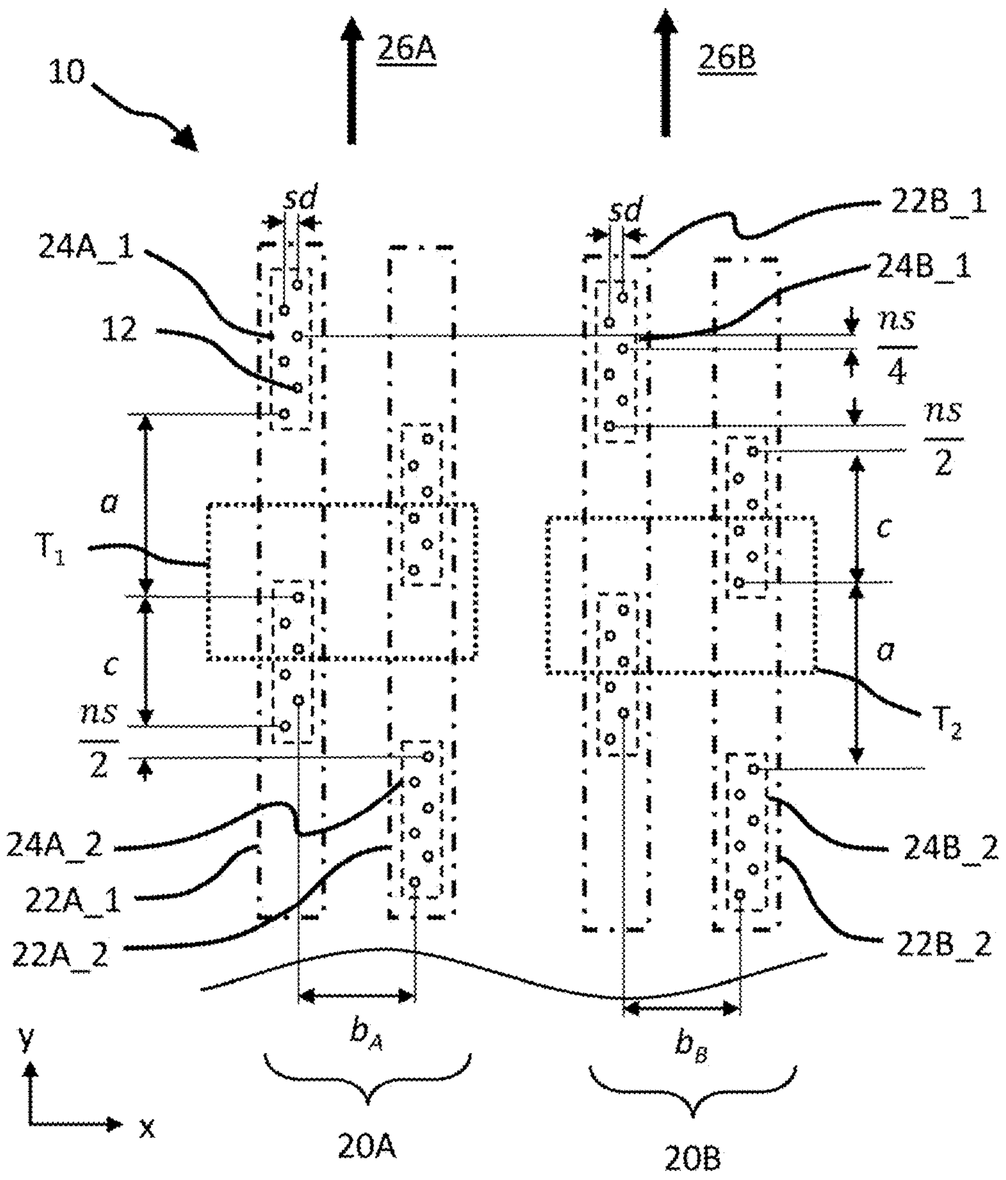
FIG. 10 is a schematic plan view of a nozzle plate showing nozzle clusters for two rows.

To address the demands of many applications in the field of printing, the resolution of a droplet ejection head may need to be higher than can be provided with one row as shown in the above embodiment and its various implementations. This may be achieved by providing further row(s) of nozzles 12, with the nozzles 12 of the further row(s) spaced at intermediate positions with respect to the nozzles 12 of the first row, when viewed along the projection direction of the set of subrows onto the row direction. An example of a nozzle configuration for two rows of nozzles 12 to double the resolution of one row is shown in FIG. 10. Two rows 20A and 20B extend parallel to one another in the row direction (along the y-direction). Each row comprises nozzle clusters 24A and 24B, respectively. The nozzle clusters for row 20A each extend in the respective row direction 26A, and define two parallel subrows 22A_1 and 22A_2 separated by a subrow distance $b_A$. The nozzle clusters for row 20B also extend in the respective row direction 26B, and define two parallel subrows 22B_1 and 22B_2 separated by a subrow distance $b_B$.

In the implementation of FIG. 10, each row comprises nozzles 12 spaced apart from an adjacent nozzle 12 of the same stagger offset group, which may also be referred to as subcluster group, by a nozzle spacing ns. In addition, when viewed along the projection direction of the two stagger offset groups (or subcluster group) of a nozzle cluster onto the row direction (y-direction), the projected nozzle spacing between adjacent nozzles from different stagger offset groups is equal to ns/2. Row 20A and row 20B are further arranged along the row direction so that, when viewing the rows along the projection direction onto the row direction, the projected nozzles of row 20B are spaced apart from an adjacent projected nozzle of row 20A by a nozzle spacing ns/4, i.e. by a quarter of the nozzle spacing. This means that nozzles from the second row are projected at intermediate locations between the projected nozzles of the first row. Thus the effective nozzle spacing for the combination of the two rows, if used as one row to print into the same line pixel, is ns/2, providing double the resolution of a single row 20A or 20B. This condition may not persist over the entire length of the first and second row—for example, near the extreme ends of the row, the nozzle spacing may not be the same as the nozzle spacing near the centre of the row, for example so as to allow accurate alignment between rows of different nozzle plates. It might be expected however that in a transition region between two or more nozzles each of adjacent projected nozzle clusters the projected nozzle spacing is constant, i.e. the nozzles in the transition region are equidistant. In FIG. 10 this is indicated by the transition region $T_1$ between adjacent ends of nozzle clusters 24A_1 and 24A_2, and by the transition region $T_2$ between adjacent ends of nozzle clusters 24B_1 and 24B_2. In this example the transition regions $T_1$ and $T_2$ overlap when projected onto the row direction, and an overlap region is the same as the transition regions.

Further, the nozzle clusters of row 20A each extend for a cluster length $c_A$ and are spaced apart from an adjacent nozzle cluster of the same subrow 22A_1, 22A_2 by a cluster spacing $a_A$. Similarly, the nozzle clusters of row 20B each extend for a cluster length $c_B$ and are spaced apart from an adjacent nozzle cluster of the same subrow 22B_1, 22B_2 by a cluster spacing $a_B$. While in the implementation of FIG. 10, the nozzle clusters are arranged so that within each row, the cluster length c, cluster spacing a and subrow spacing b are constant, this is not essential. Furthermore, the nozzle clusters in row 20B are arranged similarly to the nozzle clusters in row 20A, so that the subrow spacings are the same, $b_A=b_B$, and the cluster length and cluster spacing are the same, $c_A=c_B$ and $a_A=a_B$. This is however not essential, and in other implementations, there may be more than two subrows per row, so that the subrow distance varies along the row direction; additionally or instead, the cluster length c may vary within the same row and/or the cluster spacing a may vary within the same row. Furthermore, it is not essential that the two rows comprise a similar arrangement of nozzle clusters. For example, the subrow spacings may not be the same, $b_A \neq b_B$, and/or the cluster length c and/or cluster spacing may not be the same, $c_A \neq c_B$ and $a_A \neq a_B$, for example by having different numbers of nozzles 12 in different nozzle clusters.

Therefore the nozzle plate 10 may comprise a second row of nozzles 12 comprising a second set of two or more subrows extending alongside one another in the respective subrow directions. At least two subrows (i.e. first and second subrows) of the second set of subrows are spaced apart by a third subrow spacing in a transverse direction, perpendicular to the row direction. Each subrow 22 of the second set of subrows is comprised of one or more nozzle clusters 24 each comprising a plurality of nozzles 12. Furthermore, each nozzle cluster 24 extends along the respective subrow direction for a cluster length c, and is spaced apart from a neighbouring cluster 24 by a cluster spacing a. Preferably the third subrow spacing is greater than 300 um.

For some applications, the subrow spacing between a first and second subrow of a set of subrows may be greater than 400 um, or greater than 500 um. In some implementations, the subrow spacing may be smaller than 900 um.

The second set of subrows may comprise more than two subrows. For example, one or more nozzle clusters of each of a first, second and third subrow of the second set of subrows may define the third subrow spacing $b_3$ between the first and second subrow of the second set of subrows and a fourth subrow spacing $b_4$ between the first and third subrow of the second set of subrows, wherein the third subrow spacing is different to the fourth subrow spacing.

Figure 11:
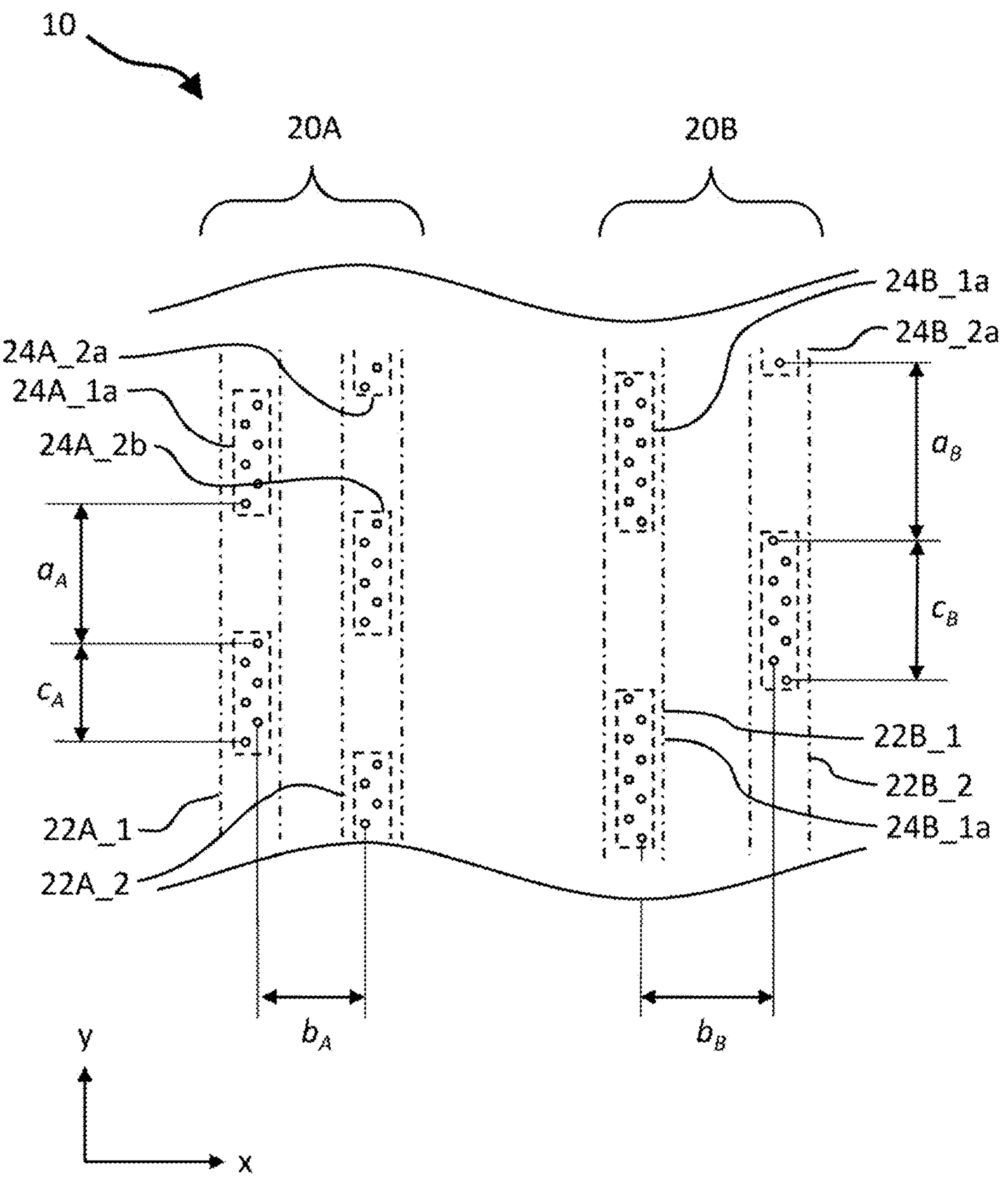
FIG. 11 is a schematic plan view of another nozzle plate showing nozzle clusters for two rows.

An implementation for which a row 20A has a different arrangement of nozzle clusters 24A to a second row 20B having nozzle clusters 24B is shown in FIG. 11. The nozzle clusters 24A_1 and 24A_2 of row 20A are located to define two subrows 22A_1 and 22A2 spaced apart by a subrow distance $b_A$. The nozzle clusters 24A_1*a,b* . . . and 24A_2*a,b* . . . are arranged according to a “6×6” scheme, each nozzle cluster comprising 6 nozzles, having a cluster length $c_A$ and a cluster spacing $a_A$. The nozzle clusters 24B_1*a, b* . . . and 24B_2*a,b* . . . of row 20B are located to define two subrows 22B_1 and 22B_2 spaced apart by a subrow distance $b_B$. The nozzle clusters 24B_1*a,b* and 24B_2*a,b* are arranged according to an “8×8” scheme, each nozzle cluster 24B comprising 8 nozzles, having a cluster length $c_B$ and a cluster spacing $a_B$. In this implementation, the subrow spacing between rows is not the same, $b_A \neq b_B$, and the cluster length and cluster spacing are also not the same, $c_A \neq c_B$ and $a_A \neq a_B$.

The specific arrangement of nozzle clusters may vary depending on the requirement of the application, such as the gap G, the print frequency, and/or the droplet velocity and mass. For example, it is believed that the first subrow or first row of nozzles 12 to experience the forced air flow may require an arrangement allowing more frequent or specifically tailored air escape routes than the second row of nozzles 12.

Within a row, this may be achieved by spacing nozzle clusters 24 of short length $c_1$ and at short cluster spacings $a_1$ to an adjacent nozzle cluster in the first subrow of the row of nozzles, and a similar arrangement of nozzle clusters of short length $c_2$ spaced apart by a cluster spacings $a_2$ to an adjacent nozzle cluster in a second subrow of the row of nozzles, so that $c_1=a_2$ and $a_1=c_2$. For example, the nozzle clusters may each comprise only 4, 6 or 8 nozzles. In addition, a third subrow comprising some of the nozzle clusters may provide a second subrow spacing $b_2$ to the first subrow, for example near the ends of the row, to reduce any side flow effects due to forced air flow passing the sides of the printhead. In this case, the first and second subrows comprise nozzle clusters near the centre of the row, and the first and third subrow comprise nozzle clusters near the ends of the row.

Figure 12A:
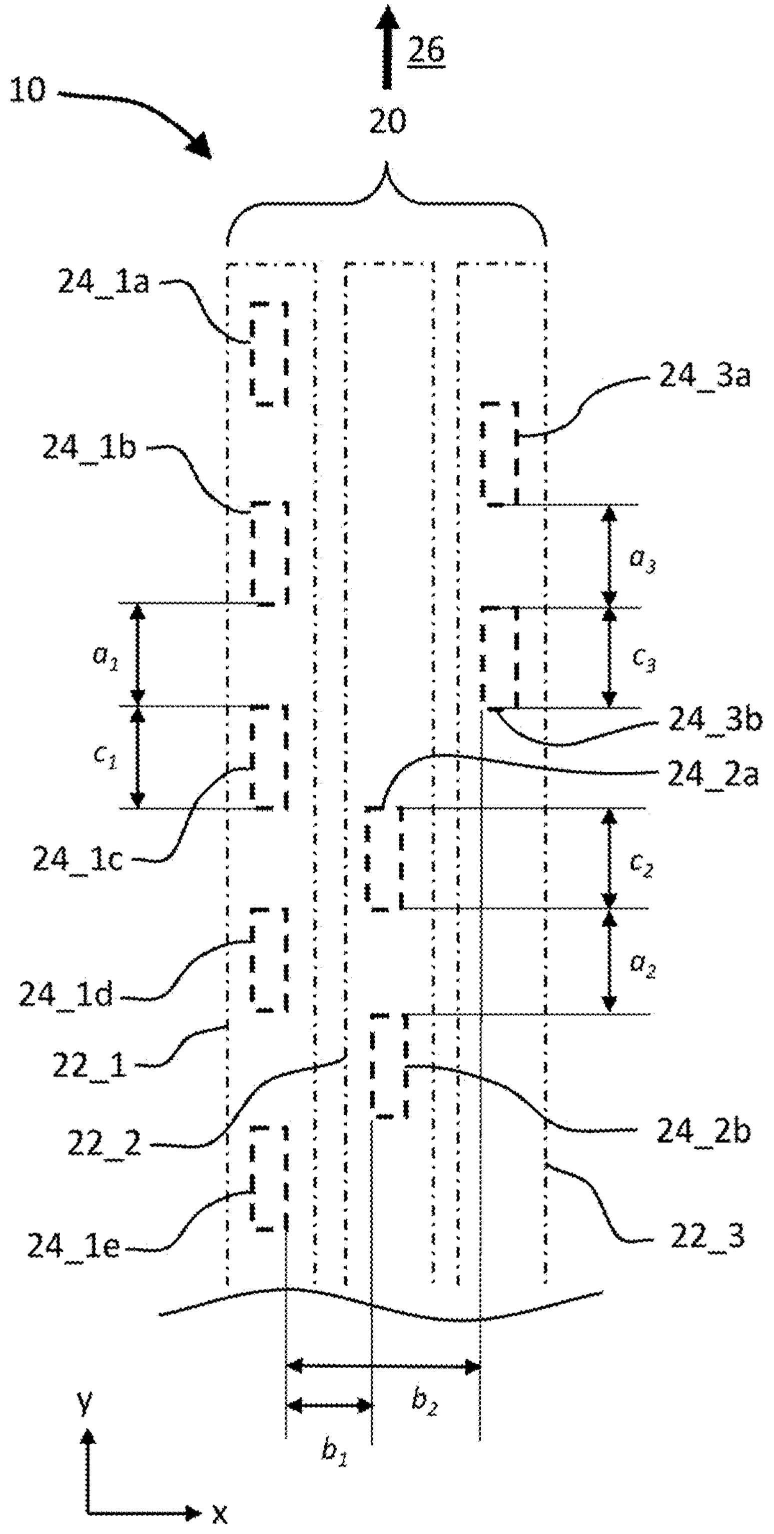
FIGS. 12A and 12B are schematic plan views of nozzle plates showing various nozzle cluster arrangements over two and three subrows.

An implementation of such an arrangement is schematically shown in FIG. 12A, where a row 20 has three subrows 22_1, 22_2, 22_3 providing two subrow spacings, a first subrow spacing $b_1$ defined by nozzle clusters 24_1 and 24_2, and a second subrow spacing $b_2$ defined by nozzle clusters 24_1 and 24_3. In this implementation, the nozzle clusters of subrow 22_2 near the end of the row 20 are missing, and for subrow 22_3 nozzle clusters are only provided near the end of the row. When viewed along a projection direction (along the x-direction) of the three subrows onto the row direction (along the y-direction), the nozzles of all clusters form one continuous row, with each nozzle spaced at a constant nozzle spacing ns from an adjacent (projected) nozzle. The cluster length for all three subrows is the same, $c_1=c_2=c_3$, and as a result also the cluster spacings are the same, $a_1=a_2=a_3$. Due to the nozzle cluster arrangement, the two subrow spacings are such that the first subrow spacing $b_1$ between the first and the second subrow is smaller than the second subrow spacing $b_2$ between the first and third subrow, and $b_2>b_1$. It is however not necessary for the second and third subrow to be spaced at the same distance as the first and second subrow. FIG. 12A is merely an illustrative arrangement.

The aim of the implementation of FIG. 12A is that the subrow spacing between nozzle clusters near and/or at the ends of the row is larger compared to that near the middle of the row, so as to create a larger distance between nozzle clusters of different subrows near and/or at the ends of the row. In this implementation, there exists a greater subrow distance, and this a wider flow path for the forced air to pass, between nozzle clusters 24_1*a*, 24_3*a*, 24_1*b* and 24_3*b*, compared to the distance between nozzle clusters 24 of different subrows near the middle of the row, in this implementation at least between adjacent nozzle clusters from different rows 24_1*c* and 24_2*a*, 24_2*a* and 24_1*d*, 24_1*d* and 24_2*b*, 24_2*b* and 24_1*e*. Meanwhile the specific dimensions of cluster length $a_1$ and cluster spacing $c_1$ in at least the first subrow create sufficiently wide and frequent breaks in the droplet curtain to allow forced air flows to pass without creating cross flows introduced by eddies to such an extent as to visibly deviate droplets in the y-direction. To tune the design to a specific application, if needed, the subrow spacing may be adjusted to vary the difference between $b_1$ and $b_2$ so as to increase the space available for forced air to pass between the nozzle clusters. Additionally, or instead, the cluster length and/or spacings for each subrow may be adjusted.

As an alternative to the implementation of FIG. 12A, the first row of nozzle clusters of a first row may comprise nozzle clusters of short length $c_1$ and at relatively longer cluster spacings $a_1$ to an adjacent nozzle cluster, where $c_1<a_1$, and the second subrow of the first row may comprise relatively longer nozzle clusters of length $c_2$ at short cluster spacings $a_2$ to an adjacent nozzle cluster, where $c_2>a_2$. Since the nozzles 12 of the two subrows, when viewed along a projection direction of the subrows onto the first row, forms a continuous row of equally spaced nozzles, this means that the nozzle cluster length $c_1$ of the first subrow equals the nozzle cluster spacing $a_2$ of the second row, $c_1=a_2$. Similarly, the nozzle cluster length $c_2$ of the second subrow equals the nozzle cluster spacing $a_1$ of the first row, $c_2=a_1$. An example implementation is schematically shown in FIG. 12B.

Figure 12B:
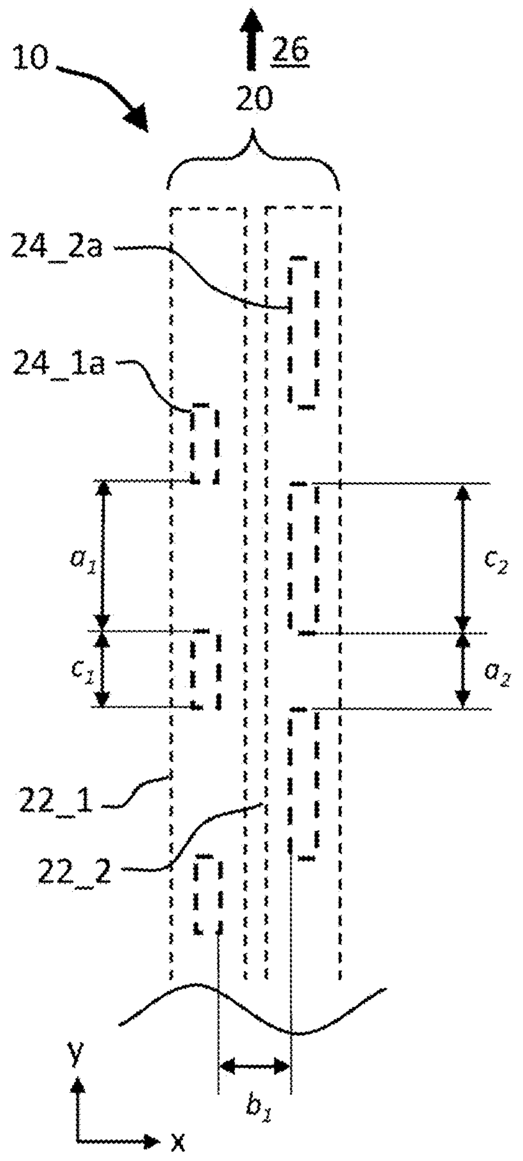

As may be seen from FIG. 12B, row 20 of nozzles (not specifically shown) has two parallel subrows 22_1, 22_2 spaced apart by a first subrow spacing $b_1$ defined by nozzle clusters 24_1 of subrow 22_1 and nozzle clusters 24_2 of subrow 22_2. The nozzle clusters 24_1 of the first subrow 22_1 are of shorter length than the nozzle clusters 24_2 of the second subrow 22_2, i.e. $c_1<c_2$. As a result, the cluster spacing of the first subrow is larger than the cluster spacing of the second subrow, i.e. $a_1>a_2$. In other words, the cluster length of the first subrow equals the cluster spacing of the second subrow, and vice versa, i.e. $c_1=a_2$ and $c_2=a_1$. In this implementation, the nozzle clusters and spacings of the first subrow remain constant, and the nozzle clusters and spacings of the second subrow remain constant, although this is not strictly necessary. For example, the lengths and spacings might vary towards the ends of the row in other implementations. When viewed along a transverse projection direction (the x-direction) of the two subrows onto the row direction (the y-direction), the nozzles of all nozzle clusters form one continuous row, with each nozzle spaced at a constant nozzle spacing ns from an adjacent (projected) nozzle.

Due to the nozzle cluster arrangement of the implementation of FIG. 12B, the first subrow poses less resistance to the forced air flow and the second subrow poses a greater resistance to forced air flow. Once the forced air flow has pass the first subrow it will have dissipated some energy and therefore the second subrow meets a slightly weakened forced air flow. The subrow spacing $b_1$ may be chosen such that it is at least as large as the smallest cluster length, for example $b_1=c_1$. More preferably, it may be chosen so that it is no larger than the largest cluster spacing, i.e. $c_{min}\leq b_1\leq a_{max}$.

In some nozzle plates 10, arrangements according to implementations of FIG. 12A and FIG. 12B may exist within the same row. Additionally, in some droplet ejection heads comprising nozzle plates 10 with multiple rows of nozzles 12, arrangements according to implementations of FIGS. 12A and 12B may apply for different rows.

The nozzle clusters of the nozzle plates according to the above embodiment and its various implementations may further be arranged as follows.

Additionally, or instead, the first subrow spacing $b_1$ may be substantially equal to the cluster spacing a. Additionally, or instead, the first subrow spacing $b_1$ may be substantially equal to the cluster length c.

Furthermore, a first group comprising one or more nozzle clusters of a first of the subrows of the row of nozzles may have a cluster length $c_{11}$ that is different to a cluster length $c_{12}$ of a second group of one or more nozzle clusters of the first subrow.

Furthermore, or instead, the first group comprising one or more nozzle clusters of a first of the subrows of the row of nozzles may have a cluster length $c_{11}$ different to a cluster length $c_{21}$ of a first group of one or more nozzle clusters of a second subrow.

Additionally, or instead, the nozzle cluster length c of one or more clusters of the one or more subrows may be defined by comprising four or more nozzles 12.

Additionally, or instead, the nozzle cluster length c of one or more clusters of the one or more subrows may be defined by comprising six nozzles 12.

For nozzle plates 10 having more than one row, and where a second row comprises a second set of subrows, the cluster length of the nozzle clusters of the first set of subrows may be the same as the cluster length of the nozzle clusters of the second set of subrows, and wherein the cluster spacing for the nozzle clusters of the first set of subrows is the same as the cluster spacing for the nozzle clusters of the second set of subrows. In alternative implementations meanwhile, the cluster spacing between the nozzle clusters of the first set of subrows is different to the cluster spacing between the nozzle clusters of the second set of subrows.

In addition, each nozzle 12 of each of the rows, when projected onto the row direction, may be directly adjacent another nozzle 12 of another row. In other words, all nozzles 12 of all rows contribute to the resolution of the droplet ejection head 2 and may be used to print into the same pixel line. Furthermore, more than 50% (i.e. a majority), or at least 75%, of the projected nozzles are equidistant from the adjacent projected nozzles so as to allow for different distances between nozzles near each end of the row, in order to allow alignment between multiple nozzle plates 10, for example. When viewed along the projection direction of the first and second sets of subrows onto the row direction, the nozzles 12 of all nozzle clusters 24 of the first set and the second set of subrows form a continuous row of nozzles 12 of modified projected constant nozzle spacing. For example, the projected nozzle spacing may be half that of the projected nozzle spacing between adjacent projected nozzles of the first set of subrows. The two sets of subrows may thus be used to double the resolution of the nozzle plate. The ends of the first and second sets of subrows may in some cases have a different projected nozzle spacing, for example so as to enable accurate alignment between rows of nozzles of two partially overlapping nozzle plates. The number of nozzles of each row that have a different projected nozzle spacing may be 25% or even approaching 50% of the total number of nozzles of the row, for example.

In any of the above implementations, the nozzles of each nozzle cluster may be arranged in parallel subclusters that extend along the row direction, wherein the subclusters are spaced apart from one another in a direction perpendicular to the row direction by a subcluster spacing sd. In FIG. 3A for example, the nozzle clusters 24 of six nozzles 12 each may be described as comprising two subclusters of three nozzles each, whereby the nozzles in the same subcluster have the same stagger offset along the x-direction.

Nozzle Shift Considerations

Returning to FIG. 3A, the nozzle clusters in this implementation are achieved by providing a nozzle 12 in a specific location with respect to a side of a corresponding pressure chamber 14, where the pressure chambers 14 are shown elongate in a direction orthogonal to the row direction (i.e. along the x-direction). The side of the pressure chamber 14 comprising the nozzle 12 is planar to the surface of the nozzle plate 10. The pressure chambers are arranged parallel to one another along the row direction (the y-direction). It has been found that with this type of 'side shooter' pressure chamber 14, that droplet ejection properties remain within acceptable levels if the nozzle 12 is moved from a central position with respect to the elongate side of the pressure chamber 14 to an offset position towards one of the ends of the pressure chamber 14. This shift may be several hundred micrometers from the central position, up to around 400 μm for a specific pressure chamber design comprising a 1 mm length along its elongate side. It has therefore been found that it is possible to create nozzle clusters 24 without providing clusters of pressure chambers 14 in some implementations, e.g. it may be possible to stagger the nozzles 12 to create nozzle clusters 24 without having to stagger the pressure chambers 14. For example, a 6×6 cluster arrangement over two subrows may have 6 nozzles with a nozzle spacing ns/2 of 84.67 μm, so that the cluster length equals 5×84.67 μm=423.35 μm. The distance between nozzle clusters may equal the subrow spacing, i.e. a=b=7×84.67 μm=592.69 μm. To create this subrow spacing b, the nozzle clusters may be shifted by 296.35 μm in opposite directions from the centre-line $C_L$ of the array of pressure chambers 14, and for a pressure chamber length of around 1 mm as modelled this subrow spacing is close to 50% of the total pressure chamber length.

Therefore, in the above embodiment and its various implementations, the subrow spacing b of each of the subrows may be larger than 300 μm and less than 900 μm. In some implementations, the subrow spacing b of each of the subrows may be more than 500 μm, or more than 600 μm. In some instances, the subrow spacing may be up to 75% of the total pressure chamber length.

While the total range over which subrow spacings may be created is limited by the length of the pressure chamber 14, where the pressure chamber 14 is elongate and extends along the plane of the nozzle plate 10 (i.e. in the x-direction), staggering the nozzles with respect to the centre-line $C_L$ to create nozzle clusters 24, but not staggering the pressure chambers 14, allows for simpler fluid supply paths compared to those required for a design comprising clusters of staggered pressure chambers 14 where the nozzles 12 remain in a central or near central position with respect to the elongate side of the pressure chamber 14.

Figure 13:
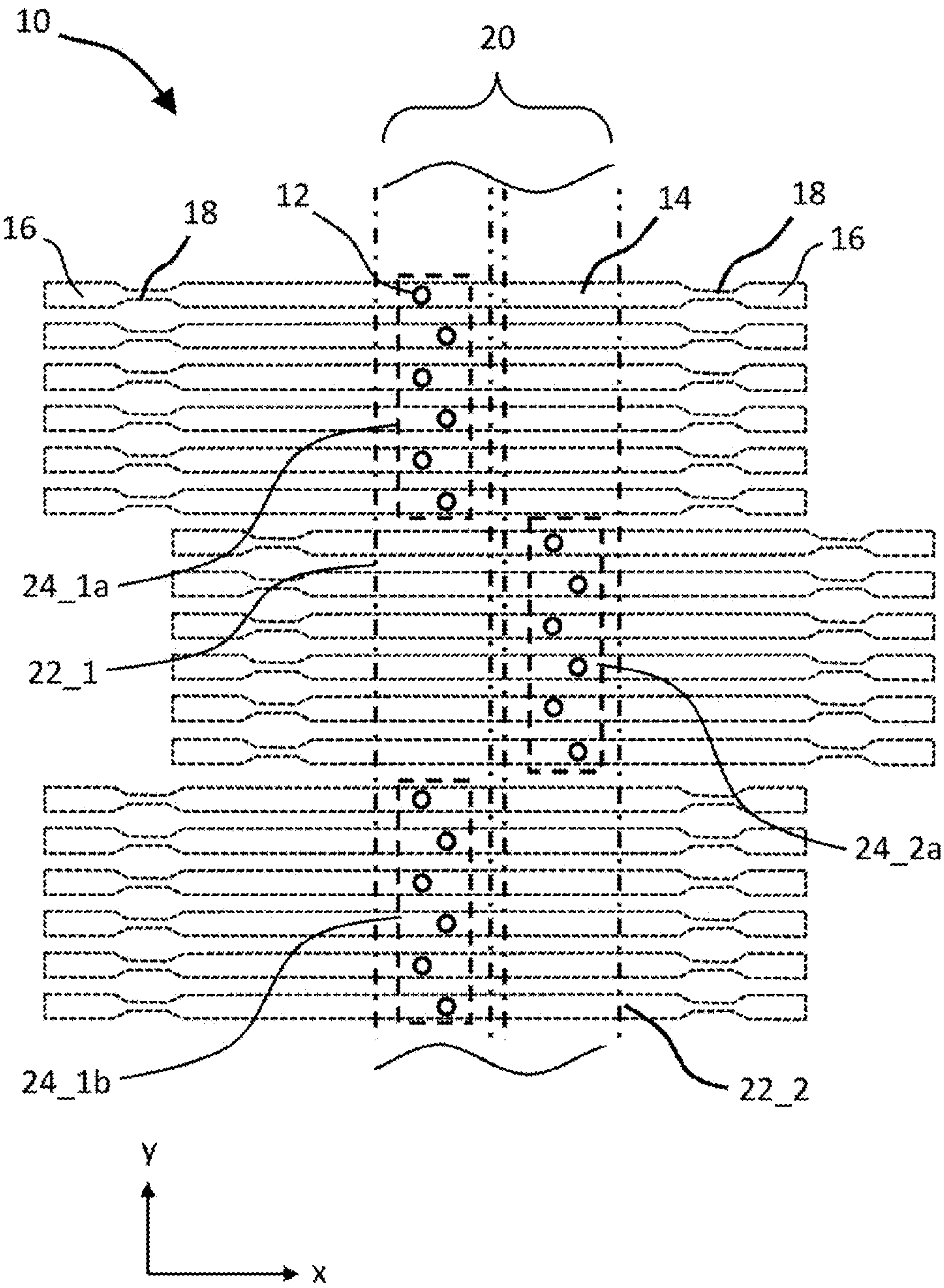
FIG. 13 is a schematic plan view of the nozzle plate according the FIG. 3A showing an alternative arrangement of pressure chambers.

FIG. 13 illustrates such an alternative implementation in which the pressure chambers 14 are clustered so as to maintain an at least near central nozzle position with respect to the chamber length. In FIG. 13, nozzle clusters 24_1 of a first subrow 22_1 of nozzles 12 and nozzle clusters 24_2 of a second subrow 22_2 of nozzles 12 and a row 20 in a nozzle plate 10 are formed centrally along the elongate faces of pressure chambers 14. It can be seen how the pressure chambers 14 themselves are clustered according to the nozzle clusters 24_1*a*, 24_2*a*, and 24_1*b*. The nozzle plate configuration may therefore remain the same for different fluidic arrangements supporting the nozzle plate 10 within the printhead 2.

The nozzle clusters of the implementations shown in FIGS. 3 to 13 are not limited to an even number of nozzles per nozzle cluster. Instead, any number of nozzles may be suitable, for example five or seven nozzles per nozzle cluster. In nozzle clusters with uneven numbers of nozzles that are arranged in staggered (or 'subcluster') configurations as those shown, the flow paths from one subrow to the next may be made more equal. As can be seen for example from FIG. 3B, the flow path for forced air to pass as formed around the 6×6 cluster 24_1*b* and past/around clusters 24_2*a,b*, the narrowest portions of the flow path are indicated by P1 and P2. Due to the stagger offset of an even number of nozzles per nozzle cluster, in this arrangement the flow path is slightly asymmetric which may be significant for smaller subrow spacings. An uneven number of nozzles per nozzle cluster would mitigate this effect and make the flow path symmetric.

Second Embodiment of the Nozzle Plate

Creating controlled paths through the droplet curtain is not limited to nozzle plates having nozzle arrangements as described above. In some nozzle plates, according to a second embodiment, the nozzle clusters may comprise a plurality of nozzles arranged in an array that extends along the row direction and over several nozzles along a cluster depth direction, where the cluster depth direction is perpendicular to the row direction. Each nozzle cluster is arranged at a cluster spacing from its nearest neighbour along the row direction. The nozzle plate may comprise one or more rows of such nozzle clusters, and the nozzle clusters in each row may be further offset from one another in a direction perpendicular to the row direction. The arrangement of nozzle clusters of embodiments of this type, as for the previous embodiment and its various implementations, also define a path between nozzle clusters through which forced air may pass in a controller manner. Nozzle clusters of the second embodiment may for example have shapes with sides that extend along an angle with respect to the cluster depth direction. For example, the nozzle clusters may be trapezoidal, triangular or parallelogram shaped. Each nozzle cluster may be defined by a plurality of subrows each having one or more nozzles 12. When viewed along the projection direction, which in this case is the cluster depth direction, of the subrows onto the row direction, the pluralities of nozzles of all nozzle clusters form a continuous row of nozzles such that each projected nozzles is equidistantly spaced apart from its nearest projected neighbour by a projected nozzle spacing. In other words, the projected nozzles do not overlap so that in use, each nozzle of the row of nozzle clusters deposits one or more droplets into a corresponding pixel in the same pixel line.

Figure 14A:
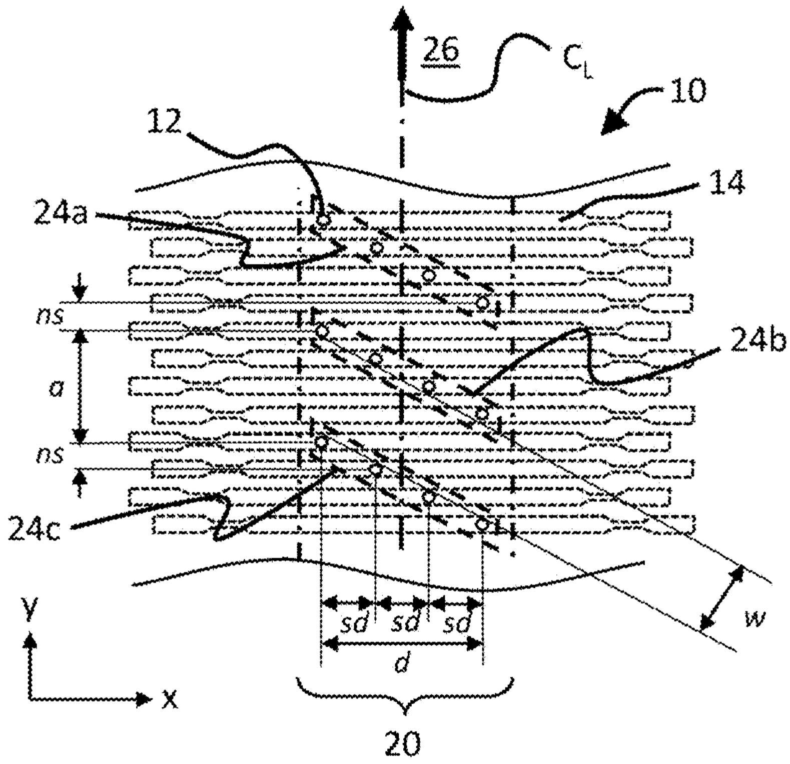
FIGS. 14A and 14B are schematic plan views of nozzle plates according to a second embodiment, and a variant thereof.
Figure 14B:
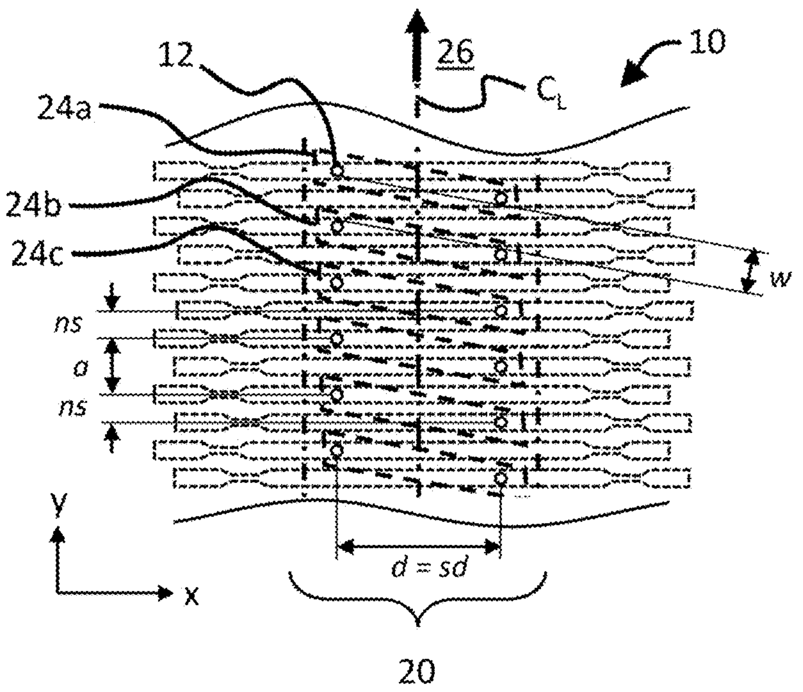
Figure 15:
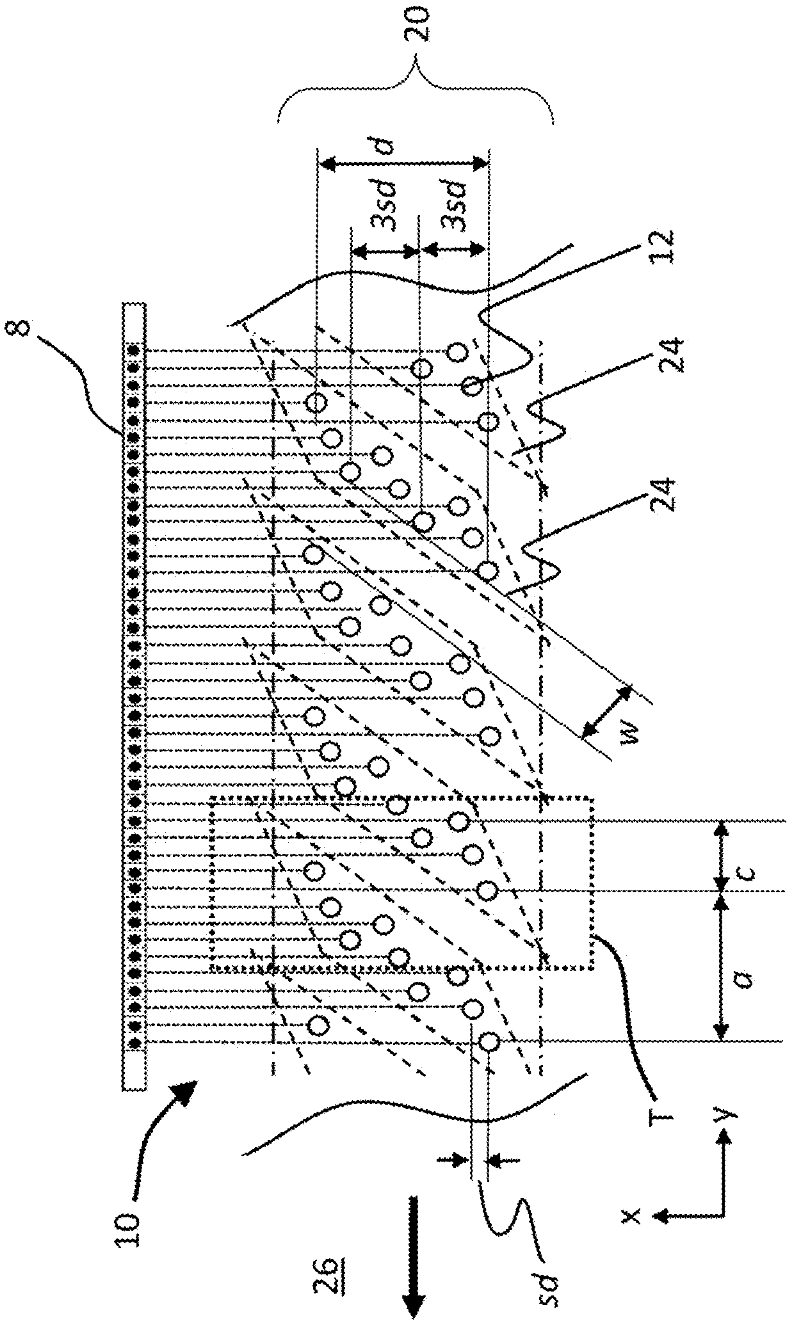
FIG. 15 is a schematic plan view of a nozzle plate having clusters arranged in a matrix according to the second embodiment.

Implementations according to an embodiment of a nozzle arrangement suitable for mitigating or preventing woodgrain effects are shown in FIGS. 14A-14B and 15.

FIGS. 14A-14B illustrates part of a row 20 of nozzles 12. In FIG. 14A, every four nozzles along the row are arranged in a nozzle cluster 24, and successive nozzle clusters 24*a*, 24*b* and 24*c* are shown. The nozzle clusters are arranged along a row direction 26 and extend over a cluster depth d, which is measured along a direction perpendicular to the row direction 26. The pressure chambers 14 that supply the nozzles 12 may be elongate along the cluster depth direction, along the x-direction, and extend parallel to one another, and the group of four nozzles defining a nozzle cluster 24 is supplied by four adjacent pressure chambers 14. The nozzle clusters 24 in this implementation are angled at an acute angle towards the row direction by spacing each nozzle within the nozzle cluster apart by a constant nozzle spacing, indicated by ns, along the row direction, and by a constant spacing sd between successive nozzles along the cluster depth direction. This arrangement provides a linear path of width w for the air to pass through the clusters of nozzles.

It is however not essential that the nozzles within each nozzle cluster are spaced apart by a constant spacing sd; instead, sd may vary between successive nozzles. This would create a non-linear path for the air to pass between the nozzle clusters.

FIG. 14B shows a similar nozzle arrangement, this time with only two nozzles per nozzle cluster. Three nozzle clusters 24*a*, 24*b*, 24*c* are indicated of a plurality of nozzle clusters comprised in row 20. The two nozzles in each nozzle cluster 24 define a cluster depth d by being spaced apart by a spacing sd in a direction perpendicular to the row direction 26. Along the row direction 26, the nozzle clusters are spaced apart by a cluster spacing a. When projected onto the row direction 26, all nozzles are spaced apart by a constant nozzle spacing ns. In other words, all nozzles of row 20, when projected onto the row direction 26, form a continuous row of projected nozzles equidistantly spaced from one another by a projected nozzle spacing in which none of the nozzles overlap with any other nozzles of the same row, so that in use, each nozzle of the row of nozzle clusters deposits one or more droplets into a corresponding pixel in the same pixel line. This arrangement also provides a linear path of width w for the air to pass through the clusters of nozzles, while also providing a larger distance between nozzles in each nozzle cluster along the cluster depth direction, along x.

In both FIGS. 14A and 14B, the cluster spacing a provides a path of width w for forced air to flow between the nozzle clusters 24 of the row 20. In these implementations, the flow path is linear and angled at an acute angle towards the row direction 26. The angle formed between the sides of the nozzle cluster along the depth direction and the row direction 26 is defined by the nozzle spacing ns and the cluster depth d for n nozzles arranged linearly as tan (angle)=d/(n−1)×ns.

Figure 7:
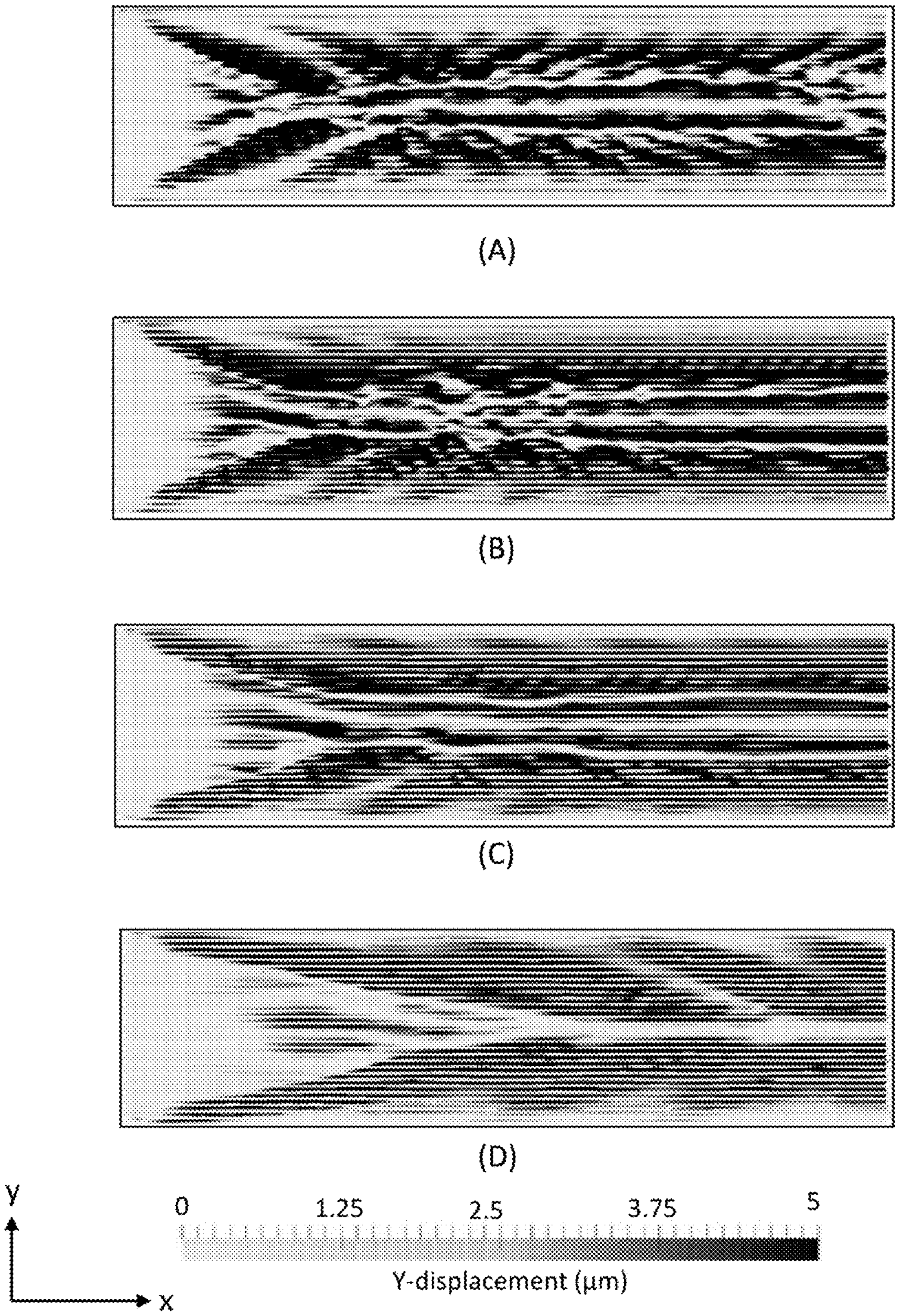
FIGS. 7A to 7D are printed image simulations for a 4 mm gap for 6×6 nozzle clusters and different subrow spacings printing at 20 kHz.

The nozzle arrangements shown in FIGS. 14A and 14B were provided in a nozzle plate and assembled in printheads identical to that for the experiments (i) and (ii) of FIG. 7. The printheads were tested under the same conditions: using a 3 mm gap, and achieving a resolution of 1200 dpi in the print direction for 20 kHz (FIG. 8A), 30 kHz (FIG. 8B) and 47 kHz (FIG. 8C) by varying the media speed accordingly: 0.416 m/s at 20 kHz, 0.635 m/s at 30 kHz and 0.995 m/s at 47 kHz.

The nozzle arrangement according to FIG. 14A was provided in a nozzle plate 10 such that ns=84.67 μm; a=338.7 μm; sd=254 μm and hence d=762 μm.

The nozzle arrangement according to FIG. 14B was provided in a nozzle plate 10 such that ns=84.67 μm; a=169.3 μm; sd=677.3 μm and hence d=677.3 μm.

It can be seen that for either implementation, a significant reduction in the woodgrain effect can be achieved, that for some applications be provide an acceptable image quality, or an image quality that may further be improved by other measures in combination with the present implementations.

It is therefore apparent that the provision of flow paths through a row of nozzles according to implementations of the present embodiment may reduce or prevent the visible occurrence of woodgrain patterns by controlling the passage of air through the row of nozzles, and thereby reducing or preventing at least the dynamic element of the woodgrain effect.

In the variants shown in FIGS. 14A and 14B, the cluster length is that of one nozzle, or c=ns. The cluster length may be envisaged as the width of the droplet curtain the forced air will meet as it first reaches the cluster.

Next, an alternative implementation comprising more than one nozzle per nozzle cluster along the cluster length c will be described with reference to FIG. 15. FIG. 15 shows a row of identical nozzle clusters 24. Each nozzle cluster has a plurality of nozzles, in this case arranged in a matrix of nine nozzles 12.

Each nozzle cluster 24 takes the shape of a parallelogram, for which both the short and long edges form an acute angle towards the row direction 26. In some implementations of this nozzle arrangement, the nozzle plate 10 itself may be parallelogram shaped to follow the long edges of the nozzle clusters, for example to aid abutting of nozzle plates side by side; however the nozzle plate may take different shapes.

The row 20 is indicated to follow the general direction of the row of nozzle clusters, along the y-direction. The nozzle clusters are spaced apart by a cluster spacing a as measured along the row direction so as to define parallel flow paths of width w for air to pass between the nozzle clusters. As in FIGS. 14A and 14B, the paths are linear and extend at an acute angle to the row direction 26.

Each nozzle cluster 24 may be defined as comprising subclusters of nozzles arranged along the cluster depth direction and defining a cluster depth d, whereby each subcluster is spaced from a subsequent subrow by a sub cluster spacing sd. The nozzles within each sub cluster are spaced from is nearest neighbour along the row direction by a nozzle spacing ns. Each subcluster extends at an acute angle to the row direction 26. The cluster depth direction, as before, extends in a direction perpendicular to the row direction 26.

The nozzles 12 within the nozzle clusters 24 of the row 20 are arranged such that, when all nozzles of all nozzle clusters are projected onto the row direction 26, the nozzles of the row 20 form a continuous row of equidistant nozzles 12 spaced apart by a constant spacing smaller than ns. This is indicated by the pixel line 8, in which each pixel corresponds to one nozzle of the row, so that the nozzles 12 of row 20 are in a 1:1 correspondence to the pixels in the pixel line 8.

In this way, nozzles arranged in an n×m matrix within each nozzle cluster of a row 20 can be used to deposit one or more droplets each into the same pixel line on the deposition media, such that each nozzle deposits one or more droplets into one pixel each. The nozzle cluster arrangement of Figure may be used to create parallel flow paths through nozzles arranged in an n×m matrix within each nozzle cluster of a row 20 for forced air to pass so that the woodgrain effect can be reduced to a non-dynamic element that can be further reduced by trimming droplet volumes.

In some implementations, the short edge of the nozzle clusters may not form an acute angle with the row direction; for example the subrows of three nozzle each may be aligned in parallel to the row direction. The specific location of the nozzle along the nozzle cluster depth direction determines the timing at which each nozzle needs to eject a droplet so that all droplets land in the pixel line 8 on the deposition media. Furthermore, each nozzle cluster is not limited to having nine nozzles each; nozzle clusters of different nozzle numbers arranged in n×m matrices may be envisaged that fulfil the same purpose of creating flow paths for forced air to pass through the row of nozzles.

The flow paths of any of the implementations of FIGS. 14 and 15 may be further altered by offsetting alternate nozzle clusters along the cluster depth direction. For example, they may be offset to far as to create to distinct subrows 22_1 and 22_2 analogous to those in previous Figures, which provides a subrow spacing b in addition to doubling the cluster spacing between nozzle clusters of the same subrow.

Next, variants will be described that share the concepts of the first and second embodiment and may be thought of as hybrids having the same aim of creating flow paths for forced air to pass through the row of nozzles so as to prevent or reduce the dynamic element of the woodgrain effect.

Figure 16A:
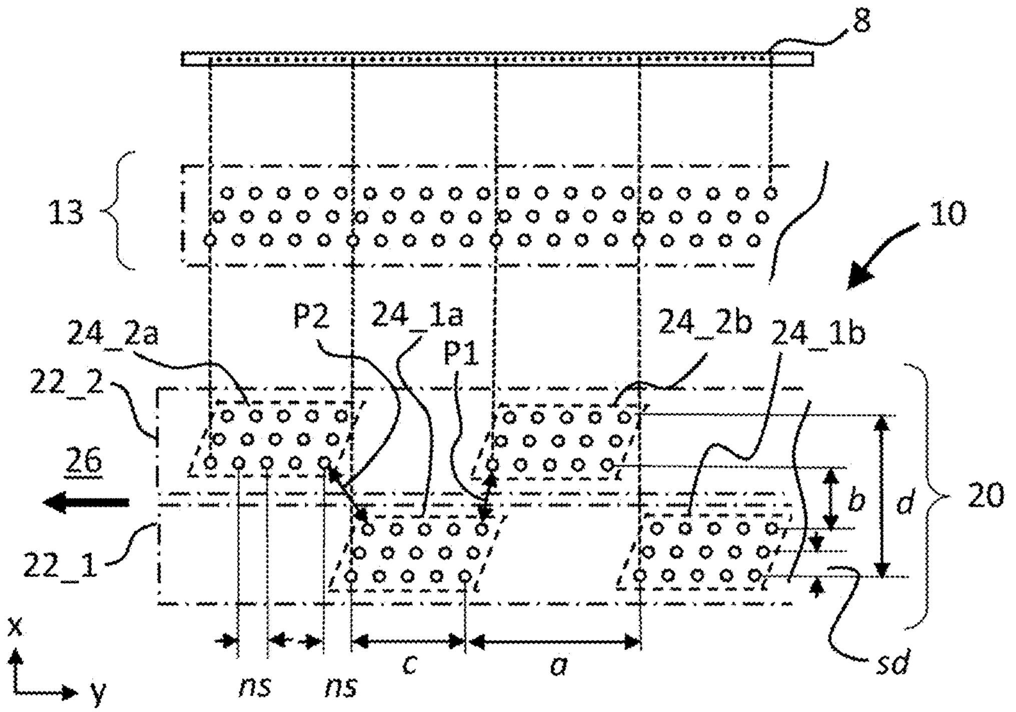
FIGS. 16A and 16B are schematic plan views of nozzle plates having nozzle clusters of parallelogram shape arranged according to elements of the first and second embodiments.

FIG. 16A shows a portion of a conventional row 13 having a plurality of nozzles 12 arranged in a m×n matrix, m being three, whereby n is the number of nozzles along the x-direction and m is the number of nozzles along the y-direction. In other words, the row 13 is three nozzles deep. Each nozzle of the conventional row 13 is offset along the row direction with respect to all other nozzles such that each nozzle may be used to deposit one or more droplets into a corresponding pixel of a pixel line 8. This conventional row 13 may be rearranged to form a row 20 having two subrows 22_1, 22_2 comprising nozzle clusters 24_1*a,b* and 24_2*a,b* respectively. The position along the row direction for each nozzle is maintained with respect to conventional row 13, so as to, in turn, maintain the 1:1 correspondence of nozzles and pixels of the pixel line 8. This is indicated by the dashed leading lines between pixels and the first nozzle of each nozzle cluster.

To achieve the arrangement of nozzles of row 20, the row 13 is divided into equal submatrices having a 5×3 nozzle array each, and alternate 5×3 matrices are translated along a direction perpendicular to the row direction to form nozzle clusters 24 that create a flow path through the row 20 that allows forced air to pass. In this implementation, each nozzle cluster 24 takes the shape of a parallelogram, and has a length c as defined by five nozzles spaced apart by a nozzle spacing ns along the row direction 26, and by three nozzles along the cluster depth direction spaced apart by an offset spacing sd. In addition to the linear paths between nozzle clusters of the same subrow, the subrow spacing b between the subrows defines a flow path for air to pass around the nozzle clusters 24_2 of the second subrow 22_2. This nozzle arrangement may be comprised in nozzle plates that are parallelogram shaped, although the shape of the nozzle plate is not essential to generating the nozzle arrangement of row 20.

Figure 16B:
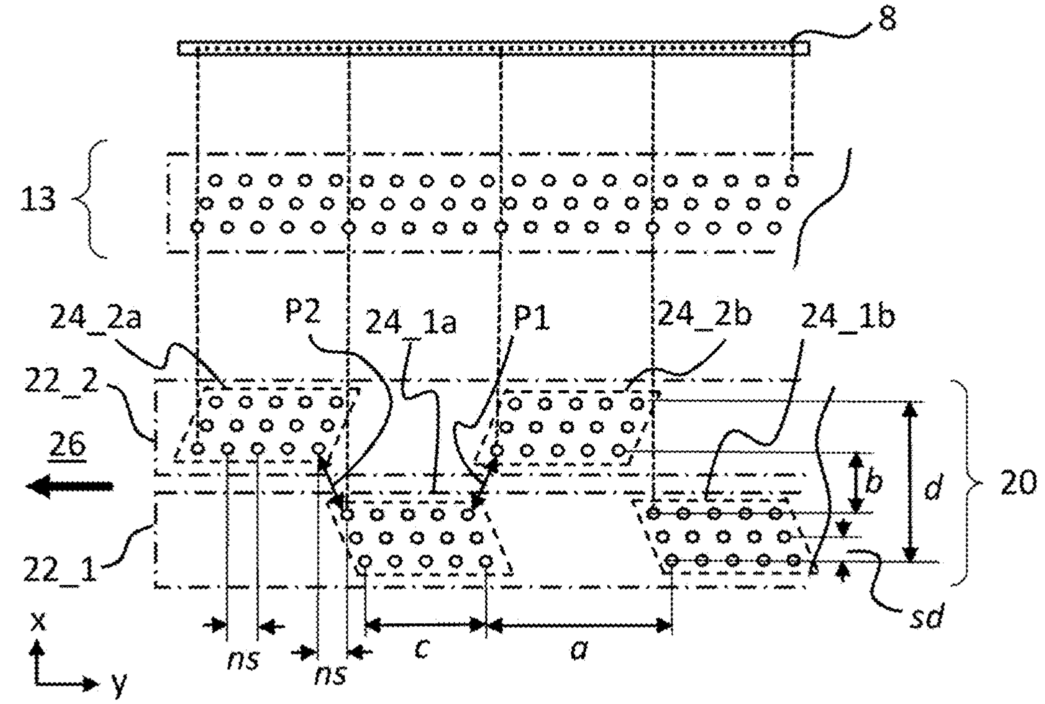

Using a similar approach as the one in FIG. 16A, FIG. 16B shows conventional row 13 translated into row 26. The Figures are identical apart from the nozzle clusters 24_1*a,b* of subrow 22_1, which are inverted in shape about their centre line parallel to the row direction compared to those in FIG. 16A. While the cluster lengths c and cluster spacings a are maintained, the flow paths between the subrows and between nozzle clusters of the first subrow and of the second subrow may have more similar flow properties, since the spacings P1, P2 between the inner cluster corners between the two subrows are similar.

Figure 17A:
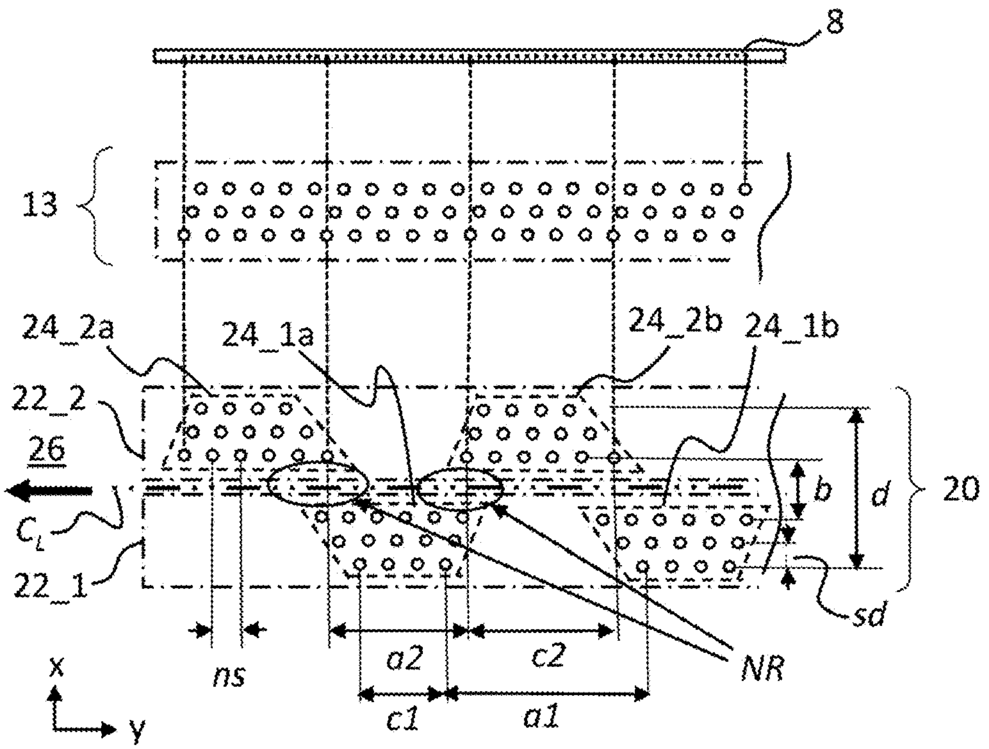
FIGS. 17A and 17B are schematic plan views of nozzle plates having nozzle clusters of trapezoidal shape arranged according to elements of the first and second embodiments.

In a further implementation shown in FIG. 17A, the nozzles of conventional row 13 are assigned into trapezoidal shapes, and alternate trapezoidal areas are offset in the direction perpendicular to the row direction to form nozzle clusters 24 arranged in two subrows 22_1 and 22_1 of row 20. The two subrows are spaced apart by a subrow distance b which is the flow path width defined by the inner nozzles of clusters from different subrows.

Each nozzle cluster comprises subclusters of nozzles arranged along a cluster depth direction, whereby each subcluster is spaced from a subsequent subcluster by a subcluster spacing sd. Each nozzle within each subcluster is spaced from its nearest neighbour along the row direction 26 by a nozzle spacing ns. The nozzles of each subcluster are offset with respect to their neighbours in an adjacent, parallel subcluster, such that, when all nozzles of all nozzle clusters are projected onto the row direction 26, the nozzles of the entire row 20 form a continuous row of equidistant nozzles 12.

In this way, all nozzles of the row 20 can be used to deposit one or more droplets each into the same pixel line on the deposition media. When viewed along the direction of printing (along the x-direction), which is the same direction over which the cluster depth extends, the first subcluster of nozzles for nozzle clusters 24_1*a,b* has a cluster length of $c_1$, while the first subclusters of nozzle cluster 24_2*a,b* have a cluster length of $c_2$. For nozzle clusters 24_1*a,b* the cluster length gradually increases along the cluster depth direction up to a cluster length $c_2$, and for nozzle clusters 24_2*a,b* the cluster length gradually decreases along the cluster depth direction down to a cluster length $c_1$.

Nozzle cluster arrangements of a trapezoidal shape may be used in nozzle plates of parallelogram shape, or in trapezoidally shaped nozzle plates such as shown in FIG. 16B, to create flow paths for forced air so that the woodgrain effect can be reduced to a non-dynamic element that can be further improved by trimming droplet volumes. In FIG. 17A, the flow paths created between nozzle clusters of the same subrow are converging or diverging flow paths. In alternative implementations, the nozzle clusters of the first (or second) subrow may be inverted about their centre line, similar to the nozzle clusters of the first subrow of FIG. 16B, such that the flow paths are either diverging or converging between all nozzle clusters of the row 20 so as to create equal flow path resistances. In addition, this would alter the flow path between the inner corners of nozzle cluster of different subrows, specifically the length of any narrow passages of the flow path along the row direction 26. The arrangement of FIG. 17A may present narrow flow path regions NR between the nozzle clusters of the first and second subrows, as indicated by arrows in FIG. 17A. In other words, the overlap of the cluster length as measured adjacent the centre line CL between the two subrows when projected onto the row direction 26 may have a length that poses a significant flow resistance to the forced air as it passes the row 20.

Figure 17B:
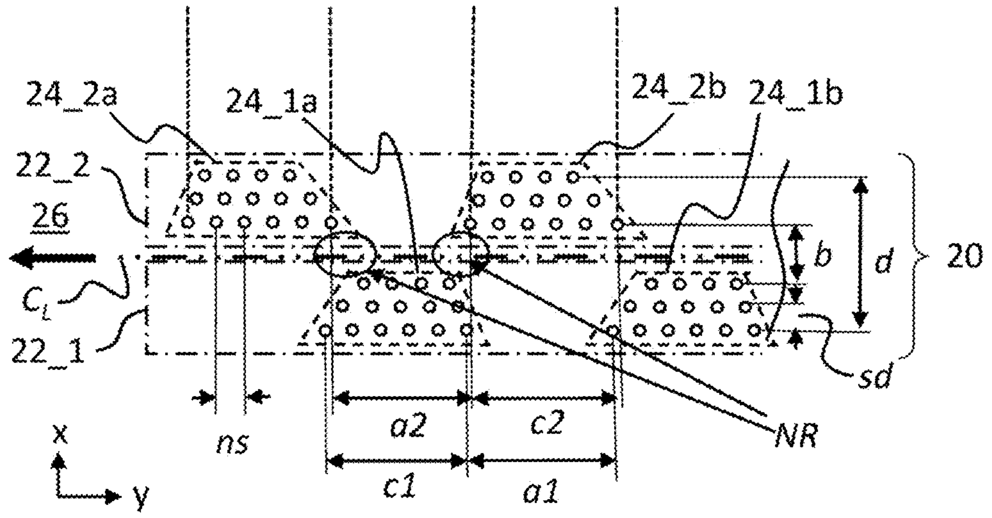

The narrow flow path regions NR between the nozzle clusters may be reduced or prevented by increasing the subrow spacing b, and/or by inverting the nozzle clusters of one of the subrows, such that the trapezoidal shapes face each other with the short length from one subrow and the long length from the other subrow. An inversion of nozzle clusters is shown in FIG. 17B. In this case the oncoming forced air passes through the nozzle clusters of the first and second subrow via diverging flow paths between nozzle clusters of the same subrow. As a result, the length of the flow path between nozzle clusters of different subrows is reduced compared to the flow path NR of FIG. 17A. In addition, the initial length of the nozzle clusters, $c_1$ and $c_2$, of the two subrows as met by the forced air on meeting the row of nozzles 20 is the same, and the cluster spacing $a_1$, $a_2$ met by the forced air on passing the flow path between the nozzle clusters for either subrow is the same. In other words, the overlap of the cluster length as measured adjacent the centre line $C_L$ between the two subrows when projected onto the row direction 26 is reduced in the arrangement of FIG. 17B compared to the arrangement of FIG. 17A.

In all implementations of FIGS. 15 and 16, the flow path properties may be varied by changing the cluster length and/or spacing and the subrow spacing b to suit a particular application and so as to reduce or even prevent the dynamic element of the woodgrain effect.

Optionally, the number of subrows is not limited to two subrows. Instead, the nozzle clusters may be arranged in more than two subrows, for example in three or four subrows, to further increase the width of, and/or reduce the length of narrow flow passages so as to reduce the flow resistance of the flow path through the nozzle clusters.

According to the second embodiment and its implementations, therefore, a nozzle plate 10 for a droplet ejection head is provided, comprising at least a first row 20 of nozzles 12 arranged to deposit droplets onto a deposition media, the first row 20 of nozzles extending in a row direction 26, and comprising one or more nozzle clusters 24. Each nozzle cluster 24 is arranged along the row direction 26 for a cluster length c and extends along a cluster depth direction perpendicular to the row direction by a cluster depth d. Each nozzle cluster 24 comprises a plurality of nozzles 12 of which one or more nozzles within each nozzle cluster define the cluster length c and two or more nozzles within each nozzle cluster define the cluster depth d, and each nozzle cluster 24 is spaced apart from an adjacent nozzle cluster along the row direction 26 by a cluster spacing a greater than a nozzle spacing ns between adjacent nozzles of the same nozzle cluster. Furthermore, the nozzles of the first row, when projected onto the row direction 26, are equidistantly spaced apart from adjacent projected nozzles by a projected nozzle spacing.

Optionally, each projected nozzle cluster of the first row may be spaced apart from an adjacent projected nozzle cluster by the projected nozzle spacing. For example, this is the case for the nozzle clusters 24 of FIGS. 13 and 14. The nozzle clusters in these Figures do not mesh with one another when projected onto the row direction. Meanwhile the nozzle clusters of FIGS. 16 and 17 mesh with one another when projected onto the row direction.

In some implementations, the cluster spacing a may be greater than the spacing between four adjacent nozzles.

Additionally, or instead, the plurality of nozzle clusters of the row 20 may comprise two or more subclusters of nozzles. The subclusters extend substantially along the row direction, and are arranged parallel to one another so as to form a matrix of nozzles. An example of such subclusters is shown in FIGS. 15 to 17, where the nozzle clusters take the form of a matrix of nozzles. It can be seen in FIG. 15 that the subclusters are angled at an acute angle towards the row direction, 'substantially extending along the row direction' by an angle less than 45° to the row direction 26.

In some implementations, the nozzle clusters may be arranged in one or more of a parallelogram, trapezoidal or triangular shape. Parallelogram or trapezoidal cluster shapes are illustrated in FIGS. 15 to 17, the tilted sides of the nozzle clusters serving to overlap or mesh the nozzle clusters along the row direction.

Additionally, the nozzle clusters adjacent one another along the row direction may be offset from one another along the cluster depth direction, such as shown in FIGS. 16 and 17. For example, the nozzle clusters may be arranged in two subrows 22_1 and 22_2, and the flow path created between the two subrows has a width defined by the subrow spacing b, where the subrow spacing b is the distance along the depth direction between the inner nozzles, nearest the centre line $C_L$ of the row, of nozzle clusters from different subrows. This is shown in FIG. 17A and FIG. 17B, for example.

In the clusters shown in FIG. 15 to FIG. 17B, the clusters 24 are arranged to overlap with a neighbouring cluster in both the row direction (along y) and in the direction perpendicular to the row direction (along x).

In all of the above embodiments and their various implementations, an air flow path is created by the cluster spacing a so as to create a flow path for forced air to pass through the row of nozzles in a controlled manner. 'In a controlled manner' may be understood to mean a reduction or prevention of the dynamic element of the woodgrain effect, reducing the effect to banding only, for example, which is not a dynamic effect.

Generally therefore, a nozzle plate 10 is provided for a droplet ejection head 2 comprising at least a first row 20 of nozzles 12 arranged to deposit droplets onto a deposition media, wherein the first row of nozzles extends in a row direction 26, and comprises one or more nozzle clusters 24. Each nozzle cluster 24 is arranged along the row direction 26 for a cluster length c, and each nozzle cluster is spaced apart from an adjacent nozzle cluster along the row direction 26 by a cluster spacing a so as to create a flow path for forced air to pass through the row of nozzles in a controlled manner. When viewed along a projection direction of the nozzle clusters 24 onto the row direction 26, the plurality of nozzles 12 of row 20 forms a continuous row of nozzles in which the projected nozzles are equidistantly spaced apart from one another by a projected nozzle spacing. In other words, none of the projected nozzles overlap fully with any other nozzles of the same row, so that in use, each nozzle of the row of nozzle clusters may be used to deposit one or more droplets into a corresponding pixel in the same pixel line on the deposition media.

In some implementations, the cluster spacing may vary along the row direction. For example, the nozzle cluster spacing between a first pair of adjacent nozzle clusters may be different to the cluster spacing between a second pair of adjacent nozzle clusters of the row.

Additionally, or instead, the nozzle cluster spacing may vary along a cluster depth direction, where the cluster depth direction is perpendicular to the nozzle row direction.

The nozzle clusters may be arranged in two or more subrows, where the subrows extend along the row direction and are parallel to one another, so as to create flow paths of a width according to a subrow spacing b between adjacent subrows for forced air to pass from one subrow to the next. The subrow spacing between a first and second subrow may be the same or may be different to the subrow spacing between a second and third subrow.

The nozzle clusters may additionally, or instead of being arranged in subrows, comprise two or more subclusters, where each subcluster within a nozzle cluster substantially extends along the row direction, and the subclusters within each nozzle cluster are arranged in parallel to one another and spaced apart by a subcluster spacing sd.

The subclusters may be arranged to extend at an acute angle to the row direction, such that 'substantially extends along the row direction' may mean at an acute angle of up to 45° to the row direction.

The clusters of the second embodiment are shown to comprise a matrix of up to 15 nozzles each. The modelled results of variants of the first embodiment suggest that it is the combination of the cluster length c and the air gap formed by the cluster spacing a/subrow spacing b for forced air to pass through the row of nozzles in a controlled manner, that determines the reduction in the woodgrain effect. Similar results may be expected for the second embodiment with respect to the first subrow of nozzles met by the forced air, or by the first sub cluster of the first subrow, for example for a cluster length of up to 10 nozzles wide and a cluster length c less than or equal to 800 μm.

Method

Figure 18:
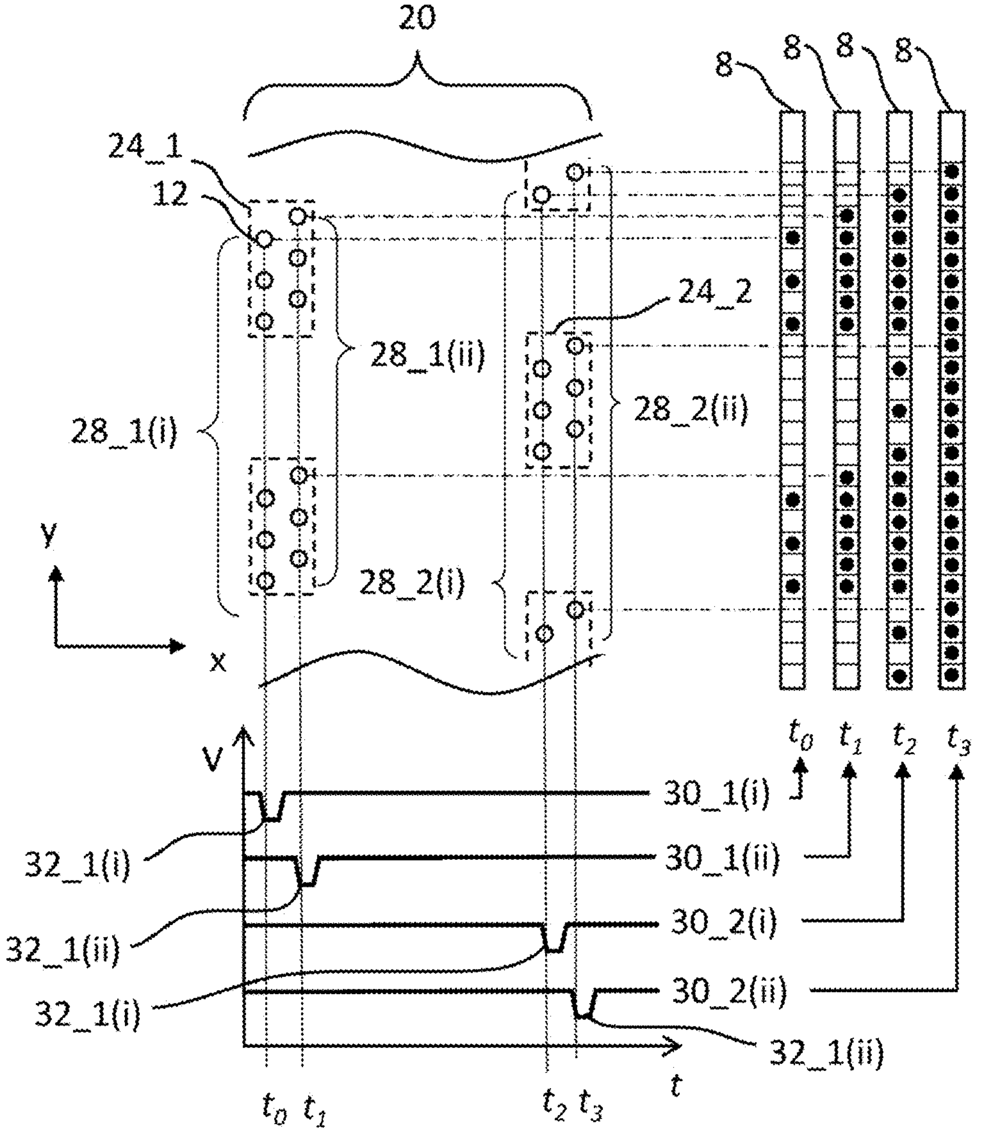
FIG. 18 is a diagrammatical representation of how the nozzles of the nozzle plate of FIG. 3A are timed to deposit droplets into a pixel line.

FIG. 18 is a schematic of the timing events t of drive pulses 32 that may be applied to the implementation of one row 20 comprising two subrows having nozzle clusters 24_1 in a first subrow, and nozzle clusters 24_2 in a second subrow. The nozzles 12 in each nozzle cluster 24 are staggered in stagger groups 28 along the direction perpendicular to the row direction. All nozzles in row 20 may be controlled individually to deposit one or more droplets each into a corresponding pixel of the pixel line 8 on the deposition media as the deposition media comprising the pixel locations of pixel line 8 passes underneath the nozzles of row 20.

Alongside the nozzle clusters 24 and the drive pulses 32, the effect on the pixel line 8 on the deposition media is illustrated at the different timings t for the drive pulse 32.

A method for controlling actuators corresponding to the nozzles 12 to cause each nozzle 12 to eject one or more droplets per line pixel is based on stagger groups 28 of nozzles 12 within the same subrow arranged at the same stagger offset distance in a direction orthogonal to the row direction (along the y-direction). The stagger groups 28_1(*i*) and 28_1(*ii*) are comprised within the nozzle clusters 24_1 of the first subrow, and stagger groups 28_2(*i*) and 28_2(*ii*) are comprised within the nozzle clusters 24_2 of the second subrow. Cluster group 28_1(*i*) of nozzle clusters 24_1 are the first to have to eject droplets as the deposition media passes underneath in the printing direction (along the x-direction), followed by cluster group 28_1(*ii*), cluster group 28_2(*i*), and finally cluster group 28_2(*ii*).

The actuator signals 30 applied to the actuators of the corresponding nozzles 12 comprise drive pulses 32 and are offset along the amplitude (V) axis for visual simplicity. Each stagger group 28 is arranged to eject a droplet in response to the application of a corresponding drive pulse 32 within an actuating signal 30 The respective drive pulses are linked to each stagger group by a dotted line.

For simplicity, only one drive pulse for ejecting one droplet is shown; in practice, several droplets may be ejected from the same nozzle to be deposited into the same pixel.

For visual simplicity, FIG. 18 illustrates full duty printing where all nozzles eject a droplet into the pixel line. In practice, only one or more nozzles may deposit droplets into the pixel line, depending on image data.

As the position of the pixel line 8 to be printed passes underneath the droplet ejection head 2, the actuation of droplets from the four stagger groups 28 is timed such that as the pixel line 8 passes underneath the first stagger offset group (subcluster group) 28_1(*i*) of row 20, the first stagger offset group 28_1(*i*) receives a drive pulse 32_1(*i*) first, at time to, to eject a droplet from each of the nozzles 12 of stagger offset group 28_1(*i*) into corresponding pixels on the pixel line 8.

As the pixel line 8 moves further to pass underneath the second stagger group 28_1(*ii*), stagger group 28_1(*ii*) receives its drive pulse 32_1(*ii*) at a time $t_1$ to eject a droplet from each of the nozzles 12 of the stagger offset group 28_1(*ii*) into corresponding pixels on the pixel line 8.

Next, as the position of the pixel line on the deposition media moves underneath the third stagger group 28_2(*i*) of the row 20, which is the first stagger offset group of the second subrow, a drive pulse 32_2(*i*) is applied at time $t_2$ to eject a droplet from each of the nozzles 12 of stagger offset group 28_2(*i*) into corresponding pixels on the pixel line, and finally as the pixel line passes underneath the fourth stagger offset group 28_2(*ii*) of the row 20, which is the second stagger offset group of the second subrow, a drive pulse 32_2(*ii*) is applied at a time $t_3$ to eject a droplet from each of the nozzles 12 of stagger offset group 28_2(*ii*) into corresponding pixels on the pixel line. The pixel line 8 is now complete.

FIG. 18 illustrates a fully printed pixel line where each nozzle 12 ejects a droplet into its corresponding pixel on the pixel line. In most images this is of course not the case, and at certain times in the print process, in accordance with the image data, some or all of the nozzles 12 will not receive a drive pulse. The nozzles 12, however, all remain a member of the same stagger group at all times.

A similar principle applies for printing into the same pixel line from more than two subrows of a row 20, or from more than one row 20 having one or more subrows each.

While FIG. 18 is based on nozzle arrangements according to the first embodiment, where nozzle clusters are generated within subrows of a row 20, the same principle of printing into one pixel line with all nozzle of a row 20 using arrangements according to the second embodiment, in which nozzle clusters are not arranged in two subrows but angled flow paths are generated between nozzle clusters by staggering nozzles within the same nozzle cluster along the cluster depth direction, while the nozzle clusters overlap when viewed along the row direction. In the arrangements of FIGS. 14 and 15, the subclusters are suitable timed such that all nozzles in those subclusters having the same location along the print direction (along the x-direction) are actuated with the same timing t. The subclusters are thus treated in a manner analogous to the stagger offset groups 28 in FIG. 18.

The hybrid arrangements of FIGS. 16 and 17 comprise subclusters as well as subrows. From a timing perspective, successive subclusters located at increasing distances from the row front along the print direction are actuated with increased timing delays so as to eject droplets into the same pixel line 8.

A method of using the nozzle plates 10 according to the above embodiments and their implementations is provided, comprising the step of: depositing one or more droplets from one or more nozzles of the nozzle clusters of the row into a pixel line, wherein each nozzle of the row corresponds to one pixel of the pixel line.

In some implementations in which the row 20 comprises a first subrow and a second subrow, each subrow extending in the row direction and parallel to one another, the first subrow comprises a first group of nozzle clusters and the second subrow comprises a second group of nozzle clusters, the method may comprise the further step of: depositing droplets from the nozzles of the first group of nozzle clusters into the pixel line at a time t1, and depositing droplets from the nozzles of the second group of nozzle clusters into the pixel line at a time t2.

In nozzle plates with two rows, the method may further comprise the steps of: depositing droplets from the nozzles of the nozzle clusters of the first subrow of the second row into the pixel line at a time t3; and depositing droplets from the nozzles of the nozzle clusters of the second subrow of the second row into the pixel line at a time t4.

Alternatively, where one or more of the nozzle clusters comprise a plurality of subclusters, the subclusters generally extending along the row direction and parallel to one another, the method may instead comprise the further step of: depositing droplets from the nozzles of a first subcluster into the pixel line at a time t1, and depositing droplets from the nozzles of a second subcluster into the pixel line at a time t2.

The method as carried out for example by a control system may comprise the steps of receiving image data for the pixel line; receiving media encoder signals; and determining, based on the image data and the media encoder signals, drive data 33, wherein the drive data defines the timing t for actuating one or more nozzle within one or more of the nozzle clusters to deposit a droplet into a corresponding pixel in the pixel line.

Furthermore, the step of determining the drive data 33 further may comprise determining the drive data for a second set of subrows of a second row, wherein the drive data for second set of subrows defines the timing t for nozzles of each subrow of the second set of subrows for depositing droplets into the pixel line.

The method may further comprise the step of: generating actuating signals 30 based on the drive data 33 for causing one or more nozzles of one or more of the subrows to deposit a droplet into the pixel line, and providing the actuating signals 30 to actuators 11 corresponding to the nozzles, so as to cause the one or more nozzles to deposit a droplet into the pixel line. This step may in some implementations be carried out of a droplet ejection head 2 by a droplet ejection head controller provided on the droplet ejection head 2.

Optionally, the method may comprise the step of adjusting the droplet volume of each nozzle in response to printed image data so as to reduce or prevent banding due to forced air flows. This step may be used to mitigate the non-dynamic element of banding of the woodgrain effect. This is achieved by generating test print data for darker and lighter bands and adjusting the droplet volume deposited into the bands so as to reduce or prevent the visual variations in pigment density along the pixel line. For example, test print data 40 may be generated from test prints by measuring the pixel densities across a pixel line achieved with specific process settings (e.g. gap distance, pixel frequency, media speed), for a range of measured print pixel densities, and by determining adjustment values 42 to achieve target densities required to prevent banding. This may for example be done by using a look-up table that converts perceived pigment densities into target pigment densities per pixel and per nozzle by applying an adjustment value to each nozzle. This adjustment value may for example be an adjustment value for the nominal drive voltage of the actuation pulse that causes the ejection of a droplet from a nozzle. The peak to peak actuation pulse voltage may for example be reduced to reduce the droplet volume for nozzles contributing to the darker bands of the printed image. Additionally, or instead, it may be increased to increase the droplet volume for nozzles contributing to the lighter bands of the printed image. The adjustment values 42 may be identified empirically, by a series of experimental print tests, for modified droplet volumes per nozzle across the row 20 and stored in a look-up table and used during printing to increase or decrease droplet volumes per nozzle so as to reduce or prevent visual banding effects. For example, nozzles contributing to dark bands may be caused to eject smaller droplet volumes leading to a lower pixel density, while nozzles contributing to lighter bands may be caused to eject larger droplet volumes leading to higher pixel densities, as a result of the adjustment values 42 identified and used to modify the drive pulses 32. The adjustment values may be provided as adjustment signals to the droplet ejection head controller as part of the drive data 33.

Therefore, where the drive data 33 is further determined based on adjustment values and comprises adjustment signals based on adjustment values, the adjustment signals may cause the droplet volumes of one or more nozzles of the row to be modified to reduce the effect of banding.

Controller

Figure 19:
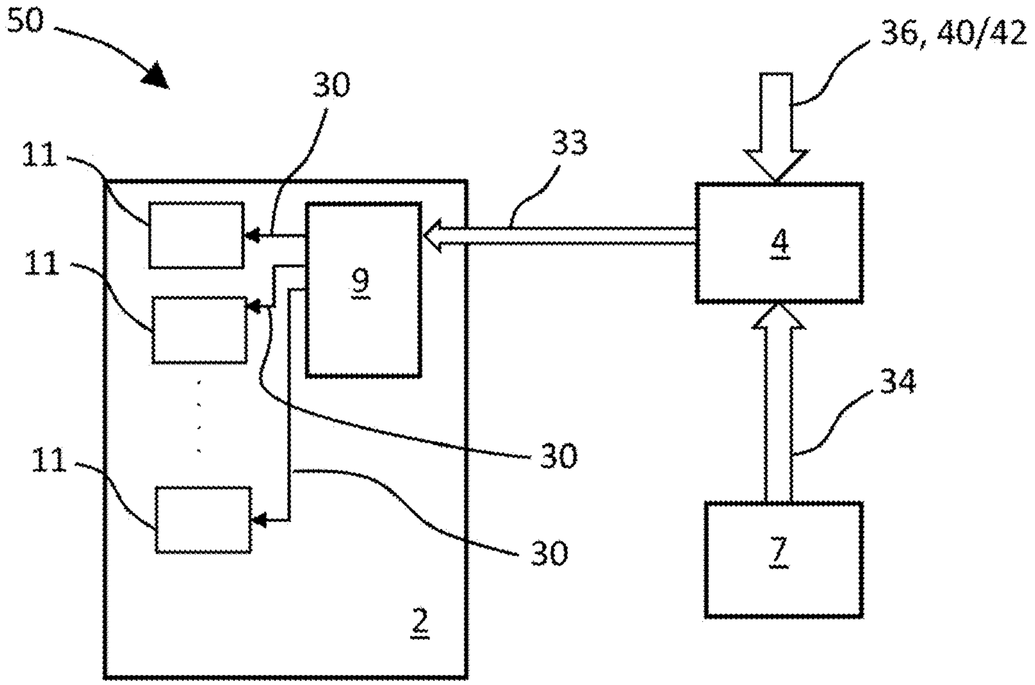
FIG. 19 is a block diagram for a control system for actuating the droplet ejection from nozzle plates according to the embodiments.

FIG. 19 is a block diagram of a control system 50 to carry out the method of printing using the nozzle arrangements described above and having the aim to reduce or prevent at least the dynamic element of woodgrain effects due to forced air passing the through the droplet curtain.

The timing of actuating the actuators of the stagger offset groups 24 may be controlled by a drive signal controller 4 as shown as part of the droplet ejection apparatus 1 of FIG. 1A. The drive signal controller 4 is part of the control system 50 of the droplet ejection apparatus, as indicated in FIG. 19.

The control system 50 of FIG. 19 further comprises a media encoder circuitry 7. The media encoder circuitry 7 receives input from the media transport system 5 that relates to the position of the media on the media transport system 5. The media encoder circuitry 7 provides media encoder signals 34 to the drive signal controller 4 that allow the controller to determine the position of the pixel line 8 on the deposition media.

The drive signal controller 4 is configured to receive the media encoder signals 34 and is further configured to receive image data 36, for example from a PC comprised within or associated with the droplet ejection apparatus 1. The drive signal controller 4 is configured to determine drive signals from the media encoder signals 34 and the image data 36 and to provide the drive signals to the droplet ejection head controller 9 of the droplet ejection head 2.

The droplet ejection head 2 comprises actuators 11, and each actuator 11 is configured to cause at least one nozzle 12 each to eject a droplet based on an actuation signal 30. The actuation signals 30 are provided by the droplet ejection head controller 9 to the actuators 11 based on the drive data 33 received from the controller 4, such that droplets for each stagger group are deposited into the pixel line at correct timings t. Therefore the timings of $t_0$ to $t_3$ of FIG. 18 are based on the dynamic media position (and thus the media speed) and may be dynamically adjusted for successive line pixels or even for successive stagger offset (subcluster) groups, for example for changes in media speed such as during acceleration and deceleration at the start and end of printing an image.

A drive signal controller 4 is therefore provided to carry out the methods described using the nozzle arrangements of the above embodiments and their various implementations. The drive signal controller is configured to receive image data and media encoder signals, and to determine drive data 33 based on the image data and based on the media encoder signals. The drive signal controller is further configured to provide the drive data 33 to a droplet ejection head controller for causing one or more of the nozzles 12 of the one or more nozzle clusters 24 comprised within a nozzle row 20 to eject one or more droplets each into a pixel of a pixel line 8, each pixel of the pixel line corresponding to a different nozzle of the row 20.

In some implementations, the drive signal controller is further configured to provide timing signals as part of the drive data 33 to the droplet ejection head controller for causing the nozzles 12 of a first group of nozzle clusters 24_1 of the nozzle clusters 24 to eject droplets into the pixel line at a time $t_1$, and for causing the nozzles 12 of a second group of nozzle clusters 24_2 of the nozzle clusters 24 to eject droplets into the pixel line at a time $t_2$. The first group of nozzle clusters may be comprised within a first subrow 22_1 and the second group of nozzle clusters may be comprised within a second subrow 22_2 of the row 20.

Additionally, or instead, the drive signal controller may be further configured to provide the drive data 33 to the droplet ejection head controller for causing the nozzles 12 of one or more subclusters comprised within at least one of the nozzle clusters 24 to eject droplets into the pixel line at a time $t_1$, and for causing the nozzles 12 of one or more nozzle clusters 24_2 of the second subrow 22_2 to eject droplets into the pixel line at a time $t_2$.

Optionally, the drive signal controller may be configured to receive data based on printed test images.

This data may comprise adjustment values 42 to mitigate the effect of banding due to the non-dynamic element of the woodgrain effect as caused by forced air passing around the nozzle clusters 24. Alternatively, the data may be in the form of test print pixel densities achieved with the process settings (e.g. gap distance, pixel frequency, media speed) for a particular application, and the test print pixel densities may be used by the drive signal controller to determine adjustment values 42 for each nozzle from a look-up table accessible by the drive signal controller. The look-up table may for example comprise pixel density data for a range of measured print pixel densities, as determined prior to printing, and adjustment values to achieve the required target densities.

Optionally therefore, the drive signal controller circuitry may be further configured to: receive printed image data, and determine, based on the printed image data, adjustment values for droplet volumes to reduce or prevent banding due to forced air flows, and to provide adjustment signals based on the adjustment values to the printhead controller so as to adjust the droplet volume ejected from the nozzles.

The drive signal controller 4 in both cases may be configured to provide adjustment signals 44 based on the adjustment values 42 and provide the adjustment signals 44 as part of the drive data 33, wherein the adjustment signals 44 cause the actuation signals 30 to eject droplets of increased or decreased the droplet volume so as to achieve an adjusted density across the pixel line that mitigates the banding effect due to the non-dynamic element of the woodgrain effect. For example, nozzles contributing to dark bands may be caused to eject smaller droplet volumes, while nozzles contributing to lighter bands may be caused to eject larger droplet volumes as a result of the adjustment signals 44 provided by the drive signal controller 4.

In some implementations, the drive signal controller 4 may be located externally to the droplet ejection head as indicated in FIG. 19.

In other implementations, the drive signal controller 4 may be located within the droplet ejection head 2, and may comprise the droplet ejection head controller 9.

Additionally to any of the implementations above, the drive signal controller 4 may be configured to generate drive data 33 that comprises image signals based on image data 36 and common to more than one of the actuators 11, and timing signals based on media encoder signals 34 individual to each actuator, and provide the drive data 33 in the form of a synchronised stream of common image signals and individual timing signals to the droplet ejection head controller.

The individual timing signals may additionally comprise adjustment signals 44 for each actuator so as to adjust (trim) the droplet volume ejected from the corresponding nozzle so as to mitigate the effect of banding.

In implementations where the drive controller is located onboard the droplet ejection head 2, the drive signal controller and the droplet ejection head controller may be comprised within a control system.

The droplet ejection head controller may be configured to: generate the actuating signals 30 based on the timing signals and image data, and provide the actuating signals 30 to actuators 11 corresponding to the nozzles, so as to cause one or more nozzles of at least one of the nozzle clusters 24 to deposit one or more droplets into the pixel line 8.

In some control systems, the drive signal controller 4 may comprise the droplet ejection head controller 9, and be located onboard the droplet ejection head 2.

General Considerations

In some implementations, it may be beneficial to arrange the nozzle clusters 24 so as to create a balanced flow of forced air through the nozzle clusters. To achieve this, the nozzle clusters 24 may be of the same length and the same spacing, and further arranged between the subrows such that the length of clusters 24 of one subrow equals the cluster spacing of the other subrow. This means that the forced air flow meeting the first row of nozzles 12 is split in equal and evenly spaced parts and recombines in equal and evenly spaced parts. This is thought to avoid or reduce significant differences in pressure between different regions along the row length.

In the above implementations, the nozzles 12 within the nozzle clusters of each row may be arranged such that, when viewed along the projection direction of the row onto the row direction, the nozzles 12 of all nozzle clusters 24 of the row form a continuous row of equidistant nozzles 12 spaced apart from another by a projected constant nozzle spacing. In other words, all nozzles of row 20, when projected onto the row direction, form a continuous row of projected nozzles equidistantly spaced from one another by a projected nozzle spacing in which none of the nozzles overlap with any other nozzles of the same row, so that in use, each nozzle of the row of nozzle clusters deposits one or more droplets into a corresponding pixel in the same pixel line.

In addition, the spacing between nozzles 12 located at adjacent ends of nozzle clusters 24, when viewed along the projection direction of the row onto the row direction, may be the same as the projected nozzle spacing. On other implementations, when projected onto the row direction, some nozzles of adjacent nozzle clusters may mesh, such that more than one projected nozzle of one nozzle cluster is adjacent a projected nozzle of a neighbouring nozzle cluster.

In some implementations, the start and end of the row of nozzles 12 may have a different nozzle spacing compared to nozzle clusters nearer the centre of the row. For example, the nozzle spacing in one or more nozzle clusters near the ends of the row of nozzles may be larger compared to the nominal nozzle spacing ns at one end, and smaller compared to the nominal nozzle spacing ns at the opposite end of the row.

Alternatively, the nozzle spacing in one or more nozzle clusters near the ends of the row of nozzles 12 may vary gradually from the nominal nozzle spacing ns nearer the centre or the row to a smaller or larger nozzle spacing towards the ends of the row. This may provide for accurate alignment between rows of nozzles 12 of different nozzle plates 10 within the same printhead 2.

Therefore, some or all of the rows of nozzles 12 of the nozzle plates 10 described according to the various embodiments and implementations may be arranged so that each nozzle 12 of each of the subrows, when projected onto the row direction, is directly adjacent another nozzle 12, and more than 50% (i.e. a majority) or even 75% of the nozzles 12 are spaced apart from the adjacent nozzle 12 by a constant distance. Preferably none of the projected nozzles overlap fully, such that, in use, each printed pixel is addressed by a corresponding nozzle.

In other words, for at least two adjacent clusters, the nozzles 12 for each subrow are arranged such that, when the nozzles 12 are projected onto the row direction, at least in a transition region comprising a plurality of nozzles 12 from a first cluster to a plurality of nozzles 12 from an adjacent cluster, each nozzle 12 is directly adjacent another nozzle 12, and each nozzle 12 is spaced apart from an adjacent nozzle 12 by a constant distance. The transition region represents a region comprising nozzles from adjacent sub row ends (adjacent when projected onto the row direction).

The above embodiments and their various implementations provide nozzle clusters of nozzles that are arranged to provide flow paths for forced air to pass through the row of nozzles so as to provide a reduction or even prevention of at least the dynamic element of the woodgrain effect. The degree of reduction depends on the specific combination of media speed, droplet frequency, droplet volume (mass) and gap G of a specific application, and may be further reduced by varying the cluster length c and the cluster spacing a and, where applicable, the subrow spacing b. The non-dynamic element of the woodgrain effect, called banding, may be further mitigated by adjusting the droplet volume of the relevant nozzles.

The pressure chambers 14 that supply the nozzles 12 may be elongate along the cluster depth direction, along the x-direction, and extend parallel to one another, as shown in FIG. 3A and FIG. 13. The pressure chambers are further arranged side by side in the row direction, along y, and the row of nozzles may extend along the majority of the length of an actuator unit. In other words, the row of pressure chambers may be formed within a single piece of silicon or within a single piece of piezoelectric material or the like. The clusters may therefore be formed within a single actuator unit, in contrast to arrangements where clusters may be created arranging a plurality of actuator units in a clustered arrangement. However, clustering of entire actuator units may limit the cluster size, since arranging a large number of small clusters (say 8 nozzles long, or even 10 nozzles long) would mean carefully mounting and aligning a large number of units, adding to manufacturing complexity, time, cost and compromising yield. Instead, the clusters may be formed in one single actuator unit without additional challenges of alignment and manufacturing time and yield.

The above examples of droplet ejection devices comprising nozzle clusters show a recirculation path behind the nozzle 12 in some of the implementations of the nozzle plate 10 within an inkjet droplet ejection head 2. The nozzle plate 10 may equally be utilised in a droplet ejection head not having recirculation or supply from both ends of the pressure chamber 14. In some droplet ejection heads, the pressure chamber 14 may be elongate in a direction other than perpendicular to the row direction or extending along the plane of the nozzle plate 10. In some droplet ejection heads, the pressure chamber 14 may extend in the direction orthogonal to the plane of the nozzle plate 10 according to the implementations described herein. In other droplet ejection heads, the pressure chambers extend along the plane of the nozzle plate 10 but not perpendicular to the row direction; for example they may be angled at less than 90° to the perpendicular to the row direction.

In other nozzle plates 10, a pixel line may be printed so that more than one nozzle 12 of the one or more rows of the nozzle plate 10 eject one or more droplets into the same pixel of the pixel line. In some droplet ejection heads the pressure chamber may be round or square with maximum dimensions less than a pixel width. Such droplet ejection heads may still employ the nozzle plates 10 or variants thereof described in the implementations herein, providing suitably sized clusters to mitigate the forced air effect.

In some variants, the nozzle clusters 24 of nozzles 12 defining the subrows may not be aligned along the row direction. Instead, they may be angled with respect to the row direction while being parallel to adjacent nozzle clusters 24 of the same subrow. In this case, the subrow direction is the average direction described by the subrow of nozzle clusters, and the row direction is the average direction of the subrow(s).

Finally, the nozzle plates 10 according to the above embodiments and their various implementations may be provided within a droplet ejection apparatus 1. The droplet ejection apparatus 1 may comprise a droplet ejection device such as a droplet ejection head 2.

The droplet ejection device may be configured such that the first row of nozzles 12 is arranged to be in fluidic communication with a corresponding first row of pressure chambers 14.

Furthermore, the pressure chambers 14 of the first row of pressure chambers 14 may be elongate in a direction non-parallel to the row direction, and may extend side by side; the nozzles 12 being arranged in an elongate side wall of respective pressure chambers 14, the side wall being formed by the nozzle plate, wherein at least a group of the nozzles 12 are arranged off-centre with respect to pressure chambers 14 in the direction of elongation such that the nozzle positions in the first row of pressure chambers 14 define nozzle clusters 24 and air flow paths for forced gas to pass through the first row of nozzles.

The nozzles in this case are offset from the centre of the pressure chamber such that the Helmholtz frequency of the chamber is substantially maintained at the same value for all chambers, and such that the drive voltage to achieve a target droplet velocity is substantially maintained at the same value for all nozzles.

The nozzles of one cluster of the first row may be arranged at a first distance from the centre of the pressure chambers in the direction of elongation, and the nozzles of the adjacent cluster along the row direction may be arranged at a second distance from the centre of the pressure chambers in the direction of elongation, so that the first cluster is spaced apart from the adjacent cluster along the row direction by the cluster spacing a to create the air flow path.

Furthermore, the first distance and the second distance may thus define the spacing of the first and second subrows, wherein the first row of nozzles may comprise the first set of subrows comprising first and second subrows that extend alongside one another in respective subrow directions, wherein the first and second subrows extend parallel to the row direction. The first and second subrows are thus spaced apart by the first subrow spacing b in the transverse direction, perpendicular to the row direction; and the first and second distance define the subrow spacing b.

Such an arrangement may be beneficial in droplet ejection heads that may not be easily manufactured in such a way that allows clustering of the pressure chambers themselves, so that the nozzles may be maintained at or close to the centre of the elongate pressure chamber. An example of such a droplet ejection head is a shared wall head, in which opposing walls are formed from a sheet of piezoelectric material into which parallel grooves have been sawn that form the pressure chambers. In such a device, the pressure chambers are arranged in parallel side by side, with a 100% overlap in the row direction, and clustering may only be achieved by providing nozzles according to the required cluster length and subrow spacing. As described, it has been found that the nozzles may be offset from a central position midway along the length direction of the pressure chamber without significant change in performance. Thus the required clusters may be formed simply at the nozzle ablation stage. This type of device is not made by MEMS fabrication and therefore the proposed embodiments may be readily applied to an existing design of ejection head within a short timeframe and without major modification of the process.

In other droplet ejection heads, the fluid path within the head may be defined by a small number of layers only, for example by the nozzle plate, the pressure chamber layer and an actuator layer, capped by a cap wafer that may provide a common fluid path to the pressure chambers. Such a head may be made by a MEMS fabrication method which allows greater flexibility in arrangement of the fluid path. In a compact device however the nozzle is still directly provided within the pressure chamber, rather than at the end of a supply path leading from the pressure chamber. Such a pressure chamber may cause the ejection of droplets by making use of reflection of pressure waves from each end of the elongate chamber and their subsequent interference to an enhanced pressure profile near the centre of the chamber. While it may be possible to create a clustering of pressure chambers by a MEMS method, some pressure chambers provide recirculation past the nozzle by having an ink supply at one end and an ink return at the other. Clustering of the chambers may make the ink supply from a common manifold more complex or time intensive to manufacture. Thus in such a device it may therefore be beneficial to create clustering only via the nozzle plate, at the nozzle formation stage, leading to an offset of the nozzles within at least some of the clusters from the centre of each longitudinal chamber to define the clusters.

Alternatively, in some ejection heads the pressure chambers 14 of the first row of pressure chambers 14 may be elongate in a direction non-parallel to the row direction, and may extend side by side, the nozzles 12 being arranged centrally, with respect to the direction of elongation, in an elongate side wall of respective pressure chambers 14, and wherein the pressure chambers 14 are arranged so as to define nozzle clusters 24 and air flow paths for forced gas to pass through the first row 20 of nozzles.

Additionally or instead, the first row of nozzles 12 may be supplied via the corresponding first row of pressure chambers 14 from a common manifold.

The droplet ejection apparatus 1 and/or the droplet ejection device may be configured to provide a pixel line frequency of 50 kHz or more.

Each nozzle 12 may be configured to eject droplets independently from all other nozzles 12.

References above and herein to "air" around the printhead 2, or in the gap G between the printhead and the substrate (deposition media), should be understood to equally apply to any gas that forms the environment around the printhead and/or between the printhead and the substrate (deposition media). The environment may be the ambient air atmosphere, or may be an imposed/controlled gas environment, provided, for example, by encasing the droplet ejection apparatus 1 in a chamber that, in use, contains a desired gas (e.g. an inert gas such as helium or argon) or mixtures of gases.

The nozzle arrangements of FIG. 3 and FIGS. 7 to 12 and of FIGS. 13 to 14 provide flow paths for forced air entering the gap between the nozzle plate and the deposition media to pass in a controlled manner through the droplet curtain, such that the generation of eddies for example is prevented or reduced to such an extent that their effect on drop placement not visible to the eye in the printed image. These arrangements, when matched to the specific application requirements, may achieve a reduction in, or prevent the occurrence of, the woodgrain effect.

It is thus not essential in order to achieve this effect that the nozzle arrangements of the embodiments according to FIG. 3 and FIGS. 7 to 12 are supplied by a fluid path configured as shown in FIG. 3A, for example, in which the pressure chambers are elongate along a direction within the plane of the nozzle plate.

Nor is it essential that the fluid path provides recirculation at the back of the nozzles 12 in order to achieve a reduction or to prevent the occurrence of the woodgrain effect. For example, in some implementations of the nozzle arrangements shown in FIG. 3 and FIGS. 7 to 12, the fluid path may be arranged such that the fluid is supplied to the nozzle along a path that is parallel to the nozzle axis. This path may be the pressure chamber itself, or it may be a supply path linking the pressure chamber (provided elsewhere) to the nozzle. In such an arrangement, the fluid may optionally be recirculated by providing a return path next to the nozzle. In another example, the pressure chambers of FIG. 3 and FIGS. 7 to 12 may be arranged behind the nozzle plate so that the pressure chamber is closed just after the nozzle position, i.e. the return is omitted.

The invention claimed is:

1. A nozzle plate for a droplet ejection head, the nozzle plate comprising a first row of nozzles arranged to deposit droplets onto a deposition media;

wherein the first row of nozzles extends in a row direction and comprises two or more nozzle clusters, each nozzle cluster being arranged along the row direction for a cluster length c, and extending along a cluster depth direction perpendicular to the row direction by a cluster depth d;

wherein each nozzle cluster comprises a plurality of nozzles of which one or more nozzles within each nozzle cluster define the cluster length c and two or more nozzles within each nozzle cluster define the cluster depth d;

wherein each nozzle cluster is spaced apart from an adjacent nozzle cluster along the row direction by a cluster spacing a such that an air flow path is created for forced air to pass through the row of nozzles in a controlled manner;

wherein the cluster spacing a is greater than a nozzle spacing ns between adjacent nozzles of a nozzle cluster;

wherein, when the first row is projected in a transverse direction onto the row direction, a first transition region between adjacent nozzle clusters comprises two or more nozzles from a first cluster and two or more nozzles from a second cluster, the second cluster being adjacent to the first cluster, and the nozzles in the first transition region being equidistantly spaced from one another by a first projected nozzle spacing;

wherein the first row of nozzles comprises a first set of subrows comprising first and second subrows that extend alongside one another in respective subrow directions, the first and second subrows extending parallel to the row direction;

wherein the first and second subrows are spaced apart by a first subrow spacing b in the transverse direction, perpendicular to the row direction; and wherein each of the first and second subrows comprises the one or more nozzle clusters;

wherein each nozzle cluster within a subrow is spaced apart from a neighbouring nozzle cluster by the cluster spacing a;

wherein the cluster spacing a is the distance between the outermost nozzles of adjacent clusters in the same subrow measured along the respective subrow direction; and wherein the two or more nozzles from the first cluster and two or more nozzles from the second cluster comprised within the first transition region are comprised within the first and second subrows, respectively.

2. The nozzle plate according to claim 1, wherein the first set of subrows further comprises a third subrow;

wherein one or more nozzle clusters of each of the first, second and third subrows define the first subrow spacing between the first and second subrows and a second subrow spacing between the first and third subrows.

3. The nozzle plate according to claim 1, further comprising a second row of nozzles extending in a second row direction, the second row direction being parallel to the first row direction;

wherein the second row of nozzles comprises a second set of subrows comprising first and second subrows that extend alongside one another in respective subrow directions, the first and second subrows of the second set of subrows extending parallel to the second row direction;

wherein the first and second subrows of the second set of subrows are spaced apart by a third subrow spacing b in a transverse direction, perpendicular to the second row direction;

wherein each of the first and second subrows of the second set of subrows comprises one or more nozzle clusters, each nozzle cluster comprising a plurality of nozzles extending along the respective subrow direction for a cluster length c, wherein each nozzle cluster within a subrow of the second set of subrows is spaced apart from a neighbouring nozzle cluster by a cluster spacing a;

wherein a second transition region between adjacent nozzle clusters of the first and second subrow of the second set of subrows comprises two or more nozzles from the first subrow and two or more nozzles from the second subrow of the second set of subrows, and the nozzles in the second transition region are equidistantly spaced from one another by a second projected nozzle spacing, and each projected nozzle cluster of the first and second subrows of the second set of subrows is spaced apart from an adjacent projected nozzle cluster by the second projected nozzle spacing.

4. The nozzle plate according to claim 3, wherein when projected in the transverse direction onto the row direction, in an overlap region of the first and second transition regions, the projected consecutive nozzles are equidistantly spaced from one another by a third projected nozzle spacing, the third projected nozzle spacing being less than the first projected nozzle spacing.

5. The nozzle plate according to claim 1, wherein one or more nozzle clusters of the first subrow of the first set of subrows has a cluster length different from the cluster length of one or more nozzle clusters of the second subrow of the first set of subrows.

6. The nozzle plate according to claim 1, wherein one of said subrows comprises first and second subsets of nozzle clusters, the cluster length of the first subset of nozzle clusters being different to the cluster length of the second subset of nozzle clusters.

7. The nozzle plate according to claim 1, wherein the first subrow spacing b is greater than 150 μm and less than 900 μm.

8. The nozzle plate according to claim 1, wherein each cluster comprises, at most, from four to ten nozzles.

9. The nozzle plate according to claim 1, wherein each projected nozzle cluster of the first row is spaced apart from an adjacent projected nozzle cluster by the projected nozzle spacing.

10. The nozzle plate according to claim 1, wherein one or more of the plurality of nozzle clusters comprises two or more subclusters of nozzles extending substantially along the row direction, the subclusters being arranged parallel to one another so as to form a matrix of nozzles, and wherein each nozzle cluster is arranged so as to overlap with an adjacent nozzle cluster along the row direction and along a direction perpendicular to the row direction.

11. The nozzle plate according to claim 1, wherein the cluster length c is less than or equal to 800 μm.

12. A droplet ejection device comprising the nozzle plate of claim 1.

13. The droplet ejection device of claim 12, wherein the first row of nozzles is arranged in fluidic communication with a corresponding first row of pressure chambers, and wherein the pressure chambers of the first row of pressure chambers are elongate in a direction non parallel to the row direction, and extend side by side, each at least partially overlapping an adjacent pressure chamber, the nozzles being arranged in an elongate side wall of respective pressure chambers, the side wall being formed by the nozzle plate, wherein at least a group of the nozzles are arranged off-centre with respect to pressure chambers in the direction of elongation such that the nozzle positions in the first row of pressure chambers define the nozzle clusters of the first row and the air flow paths for forced gas to pass through the first row of nozzles.

14. The droplet ejection device of claim 13, wherein the nozzles of one cluster of the first row are arranged at a first distance from the centre of the pressure chambers in the direction of elongation, and the nozzles of the adjacent cluster along the row direction are arranged at a second distance from the centre of the pressure chambers in the direction of elongation, so that the first cluster is spaced apart from the adjacent cluster along the row direction by the cluster spacing a to create the air flow path.

15. The droplet ejection device of claim 14, wherein the first distance and the second distance define the first and second subrows, wherein the first row of nozzles comprises the first set of subrows comprising first and second subrows that extend alongside one another in respective subrow directions, the first and second subrows extending parallel to the row direction;

wherein the first and second subrows are spaced apart by the first subrow spacing b in the transverse direction, perpendicular to the row direction; and wherein the first and second distance define the subrow spacing b.

16. The droplet ejection device of claim 12, wherein the first row of nozzles is arranged in fluidic communication with a corresponding first row of pressure chambers, and wherein the pressure chambers of the first row of pressure chambers are elongate in a direction non parallel to the row direction, and extend side by side, the nozzles being arranged centrally, with respect to the direction of elongation, in an elongate side wall of respective pressure chambers, and wherein the pressure chambers are arranged so as to define nozzle clusters and air flow paths for forced gas to pass through the first row of nozzles.

17. A method of depositing droplets using the droplet ejection device of claim 12, comprising depositing one or more droplets from one or more nozzles of the nozzle clusters of the first row into a respective pixel line, wherein each nozzle of the first row corresponds to a respective pixel of the pixel line.

18. The method according to claim 17, wherein the first row comprises a first subrow and a second subrow each extending in the row direction and parallel to one another, the first subrow comprising a first group of nozzle clusters and the second subrow comprising a second group of nozzle clusters, and wherein the method further comprises:

depositing droplets from the nozzles of the first group of nozzle clusters into the pixel line at a time $t_1$, and subsequently depositing droplets from the nozzles of the second group of nozzle clusters into the pixel line at a time $t_2$.

19. A nozzle plate for a droplet ejection head, the nozzle plate comprising:

a first row of nozzles arranged to deposit droplets onto a deposition media;

the first row of nozzles extends in a row direction and includes first and second subrows of nozzles, the first and second subrows being non-overlapping in the row direction and spaced apart transversely by a subrow spacing b, the first and second subrows of nozzles each comprising two or more nozzle clusters, each nozzle cluster being arranged along the row direction for a cluster length c, and extending along a cluster depth direction perpendicular to the row direction by a cluster depth d;

each nozzle cluster including a plurality of nozzles of which one or more nozzles within each nozzle cluster define the cluster length c and two or more nozzles within each nozzle cluster define the cluster depth d;

wherein each nozzle cluster of a subrow is spaced apart from an adjacent nozzle cluster in the same subrow by a cluster spacing a such that an air flow path is created for forced air to pass through the row of nozzles in a controlled manner;

wherein the cluster spacing a is greater than a nozzle spacing ns between adjacent nozzles of a nozzle cluster in the row direction; and wherein, when the first row is projected in a transverse direction onto the row direction, a first transition region between adjacent nozzle clusters comprises two or more nozzles from a first cluster and two or more nozzles from a second cluster, the second cluster being adjacent to the first cluster, and the nozzles in the first transition region being equidistantly spaced from one another by a first projected nozzle spacing, the first projected nozzle spacing being less than the nozzle spacing nc.

* * * * *